United States Patent
Kouznetsov et al.

(10) Patent No.: US 7,171,690 B2
(45) Date of Patent: Jan. 30, 2007

(54) WIRELESS MALWARE SCANNING BACK-END SYSTEM AND METHOD

(75) Inventors: Victor Kouznetsov, Aloha, OR (US); Davide Libenzi, Hillsboro, OR (US); Martin Fallenstedt, Beaverton, OR (US); David W. Palmer, Portland, OR (US); Michael C. Pak, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 1049 days.

(21) Appl. No.: 10/121,374

(22) Filed: Apr. 12, 2002

(65) Prior Publication Data
US 2003/0229801 A1 Dec. 11, 2003

Related U.S. Application Data

(63) Continuation of application No. 10/121,087, filed on Apr. 10, 2002, which is a continuation-in-part of application No. 10/006,413, filed on Nov. 30, 2001, now Pat. No. 6,792,534, which is a continuation-in-part of application No. 09/920,065, filed on Aug. 1, 2001, now Pat. No. 6,718,469.

(51) Int. Cl.
G06F 21/00 (2006.01)
G06F 21/22 (2006.01)

(52) U.S. Cl. ...................................... 726/22
(58) Field of Classification Search ............... 726/22, 726/24, 23, 25; 380/277
See application file for complete search history.

(56) References Cited

U.S. PATENT DOCUMENTS

| 6,301,668 | B1 * | 10/2001 | Gleichauf et al. | 726/25 |
| 6,711,686 | B1 * | 3/2004 | Barrett | 709/221 |
| 2003/0074581 | A1 * | 4/2003 | Hursey et al. | 713/201 |
| 2004/0083384 | A1 * | 4/2004 | Hypponen | 713/200 |

* cited by examiner

Primary Examiner—Matthew Smithers
(74) Attorney, Agent, or Firm—Zilka-Kotab, PC; Christopher J. Hamety

(57) ABSTRACT

A system, method and computer program product are provided for scanning a plurality of mobile wireless devices for malware. A request is received to update an anti-malware scanner installed on a mobile wireless device over a wireless network. Further, an update tailored for the mobile wireless device is prepared using a back-end infrastructure. Such tailored update is then transmitted from the back-end infrastructure to the mobile wireless device over the wireless network.

32 Claims, 22 Drawing Sheets

WIRELESS MALWARE SCANNING BACK-END SYSTEM AND METHOD

RELATED APPLICATION(S)

The present application is a continuation of an application entitled "SYSTEM, METHOD AND COMPUTER PROGRAM PRODUCT FOR EQUIPPING WIRELESS DEVICES WITH MALWARE SCANNING CAPABILITIES" naming the same inventors and filed Apr. 10, 2002 under Ser. No. 10/121,087 under Ser. No. 10/121,087; which, in turn, is a continuation-in-part of an application filed Nov. 30, 2001 under Ser. No. 10/006,413 , now U.S. Pat. No. 6,792,534, which, in turn, is a continuation-in-part of an application filed Aug. 01, 2001 under Ser. No. 09/920, 065 now U.S. Pat. No. 6,718,469, which are each incorporated herein by reference in their entirety.

FIELD OF THE INVENTION

The present invention relates to wireless device security, and more particularly to scanning wireless devices for malware.

BACKGROUND OF THE INVENTION

The last decade has seen a rapid growth in the number and use of mobile cellular telephones. More recently, wireless devices have been introduced which combine the functionality of mobile telephones and Personal Digital Assistants (PDAs). It is expected that this area will undergo massive growth in the near future as new cellular telecommunication standards (e.g. GPRS, UMTS, and WAP) make possible the high speed transfer of data across the wireless interface.

It can be expected that such platforms will be susceptible to attack from so-called "malware" such as viruses, Trojan horses, and worms (referred to collectively hereinafter as "viruses") in much the same way as present day personal computers and workstations are susceptible to malware attack. A number of mobile telephone viruses have already been identified.

In order to resist virus attacks, anti-virus software must be deployed into mobile platforms in much the same way as it has been deployed in the desktop environment. A number of different desktop anti-virus applications are currently available. The majority of these applications rely upon a basic scanning engine which searches suspect files for the presence of predetermined virus signatures. These signatures are held in a database which must be constantly updated to reflect the most recently identified viruses.

Typically, users download replacement databases every so often, either over the Internet, from a received e-mail, or from a CDROM or floppy disk. Users are also expected to update there software engines every so often in order to take advantage of new virus detection techniques (e.g. which may be required when a new strain of virus is detected).

Mobile wireless platforms present a series of problems for software developers (including developers of anti-virus software). Chief among these are the limited memory and processing power of mobile platforms, and the limited input/output capabilities which they possess (i.e. no CDROM or floppy drive, and no high bandwidth fixed line network or Internet connectivity).

Moreover, mobile wireless platforms are traditionally not standardized like conventional desktops. For example, instead of running Microsoft™ Windows™, such mobile wireless platforms may have installed thereon a variety of types of operating systems. This complicates the act of designing an anti-virus scanner that is capable of operating on any one of a plurality of mobile wireless platforms.

DISCLOSURE OF THE INVENTION

A system, method and computer program product are provided for scanning a plurality of mobile wireless devices for malware. A request is received to update an anti-malware scanner installed on a mobile wireless device over a wireless network. Further, an update tailored for the mobile wireless device is prepared using a back-end infrastructure. Such tailored update is then transmitted from the back-end infrastructure to the mobile wireless device over the wireless network.

In one embodiment, the request may include data specific to the mobile wireless device. Further, the update may be tailored for the mobile wireless device based on the data. Such data may include a media access control (MAC) address.

In another embodiment, a plurality of updates may be pre-fabricated for a plurality of types of the mobile wireless devices. As an option, the back-end infrastructure selects the updates based on the data. The updates may include different malware signatures pertinent to the associated mobile wireless device.

As an option, the back-end infrastructure may include components such as a hypertext transfer protocol (HTTP) server, a database transaction server, a client information storage database, and a web-based provisioning and reporting system.

DETAILED DESCRIPTION

Figure 1:
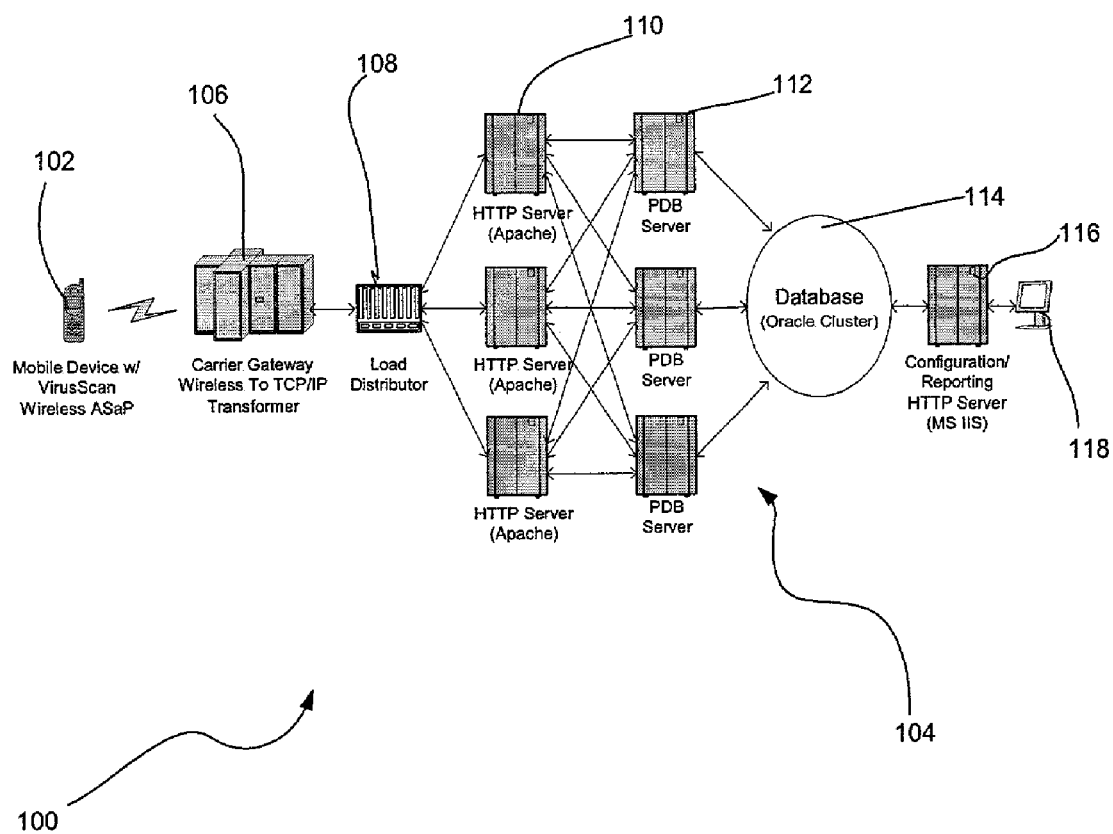
FIG. 1 illustrates an exemplary architecture for scanning a mobile wireless device for malware, in accordance with one embodiment.

FIG. 1 illustrates an exemplary architecture 100 for scanning a mobile wireless device for malware, in accordance with one embodiment. As shown, the architecture 100 includes a mobile wireless device 102. Such mobile wireless device 102 may include, but is not limited to a cellular phone, personal digital assistant (PDA), a palm computer, or any combination thereof. Further, such mobile wireless device 102 may rely on any desired operating system. It should be noted that the vast variety of mobile wireless devices 102 operate different operating systems, unlike traditional desktop and laptop environments which typically run Microsoft™ Windows™ operating systems.

As may soon become apparent, the mobile wireless device 102 is associated with an application service provider and is equipped with an anti-malware scanner for providing active content security service. In the context of the present description, such anti-malware scanner may include any program adapted to scan or detect malware (i.e. virus, Trojan horse, worm and other forms of data or program that may result in an unexpected and/or unwanted outcome).

In use, the application service provider is initiated utilizing the mobile wireless device 102. Next, the anti-malware scanner installed on the mobile wireless device 102 is updated over a wireless network utilizing the application service provider. The mobile wireless device 102 is then scanned utilizing the updated anti-malware scanner.

In communication with the mobile wireless device 102 are server-side systems, or a back-end architecture 104. Such back-end architecture 104 is located at a service-provider site and provides centrally managed provisioning, component updates and usage reporting for serviced mobile wireless devices 102.

As shown in FIG. 1, the back-end architecture 104 may, in one embodiment, include a carrier gateway 106 for communicating with the mobile wireless device 102. A load distributor 108 may be coupled between the carrier gateway 106 and a plurality of hypertext transfer protocol (HTTP) servers 110 which, in turn, are coupled to a plurality of transaction servers 112. Further included is a database 114 coupled between the transaction servers 112 and a configuration/reporting server 116.

In use, the back-end architecture 104 receives device requests, and sends and receives client-specific data to and from the mobile wireless devices 102. The transaction servers 112 make database queries to store and retrieve information to/from the database 114. Client configuration information, usage information and component update packages are stored in the database 114. Configuration and reporting may be accomplished via Web interfaces 118. More information regarding such back-end architecture 104 will be set forth hereinafter in greater detail.

More information will now be set forth regarding an exemplary design of the mobile wireless devices 102. As wireless devices have limited resources, the anti-malware scanner on the mobile wireless devices 102 may be specifically designed with the following objects set forth in Table 1A in mind.

TABLE 1A

Maintain a low memory footprint.
Consume as little CPU resources as possible, yet maintain active monitoring for malicious software on the device.
Minimize bandwidth requirements to the back-end server.
Use the back-end server to minimize the work the device is required to perform.
Maximize the flexibility of the scanner to address new threats.

The anti-malware scanner may evolve over time as new computer viruses and other malicious code are discovered.

The anti-malware scanner is designed to protect wireless devices 102 from malicious code. The scope of this protection includes, but is not limited to the following set forth in Table 1B.

TABLE 1B

Identify malicious code in persistent data stored on the device. This includes native executables as well as scripting languages embedded in documents.
Prevent malicious code from being executed by actively intervening when the data is accessed.
Potentially monitor network activity to detect and intervene against external threats on the device.
Provide a means for cleaning programs and documents that have been infected by malicious software.
Report the necessary information to track active, threats on the network of wireless devices.

A glossary of terms that will be used in the present description is set forth in Table 1C.

TABLE 1C

| Term | Description |
| --- | --- |
| Virus | A piece of executable binary or script that replicates by modifying and attaching to programs or executable/automation scripts. Viruses may damage data, cause the computer to crash, display messages, or lie dormant. |
| Trojan Horse | A program that either pretends to have, or is described as having, a set of useful or desirable features, but actually contains a damaging payload. Most frequently the usage is shortened to "Trojan". Trojan Horses are not technically viruses, since they do not replicate. |
| Worm | A malware that replicates itself using computer networks, such as via email or IRC (Internet Relay Chat). |
| Malware | Virus, Trojan horse, worm and other forms of data or program that result in unexpected and/or unwanted outcome. |
| Storage | Disk, flash-memory or other forms of non-volatile memory device. |
| File | Single storage object entity such as a program or a data file. |

TABLE 1C-continued

| Term | Description |
| --- | --- |
| Directory | A storage index that contains a list of files or sub-directories. |
| Archive File | Single file containing multiple files organized by a directory structure. Example: ZIP, CAB, JRE, SIS |
| File Scanning | The process used for detecting, identifying and removing malware on a storage. |
| Process Scanning | The process used for detecting, identifying and removing malware in execution. |
| Application-specific Scanning | Malware scanning process for a particular application. Example: hostile SMS/MMS scanning, Email attachment scanning, hostile Java Applet scanning |
| On-demand Scanning | Malware scanning process initiated by the user or another application. Usually involves a complete system-wide scanning, and the process is terminated when scanning is completed. |
| On-access Scanning | Scanning process triggered by an OS or an application event. The on-access scanner stays resident in the system. |

Anti-Malware Scanner Architecture

The anti-malware scanner architecture is based on a collection of components. These components are further analysed to expose properties and interfaces. This design helps isolate defects to specific components as well as providing a framework for porting the design to other devices with different hardware requirements.

Figure 2:
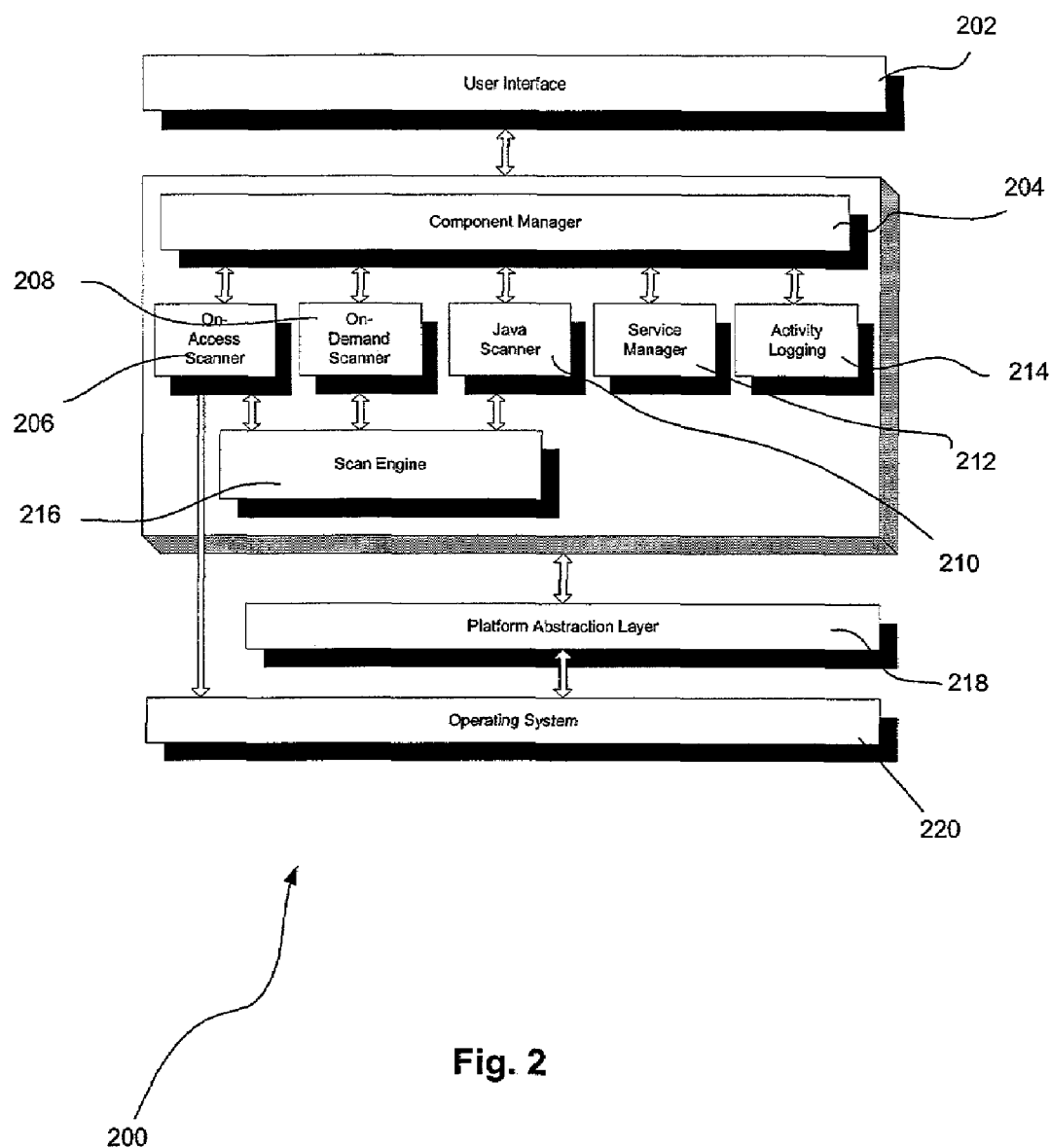
FIG. 2 illustrates an overview of the component architecture associated with the anti-malware scanner running on the mobile wireless devices.

FIG. 2 illustrates an overview of the component architecture 200 associated with the anti-malware scanner running on the mobile wireless devices. As shown, a user interface 202 is provided which communicates with a component manager 204. Such component manager 204 is responsible for controlling and managing an on-access scanner module 206, on-demand scanner module 208, Java-scanner module 210, service manager module 212, and activity logging module 214. As shown, the on-access scanner module 206, on-demand scanner module 208, and the Java-scanner module 210 utilize a common scan engine 216.

For reasons that will soon become apparent, the anti-malware scanner component architecture 200 further includes a platform abstraction layer 218 that provides an interface between an operating system 220 of the mobile wireless device and the component manager 204 and the components associated therewith. Each of the foregoing components will be discussed subsequently in greater detail.

User Interface Design (202 of FIG. 2)

Figure 3:
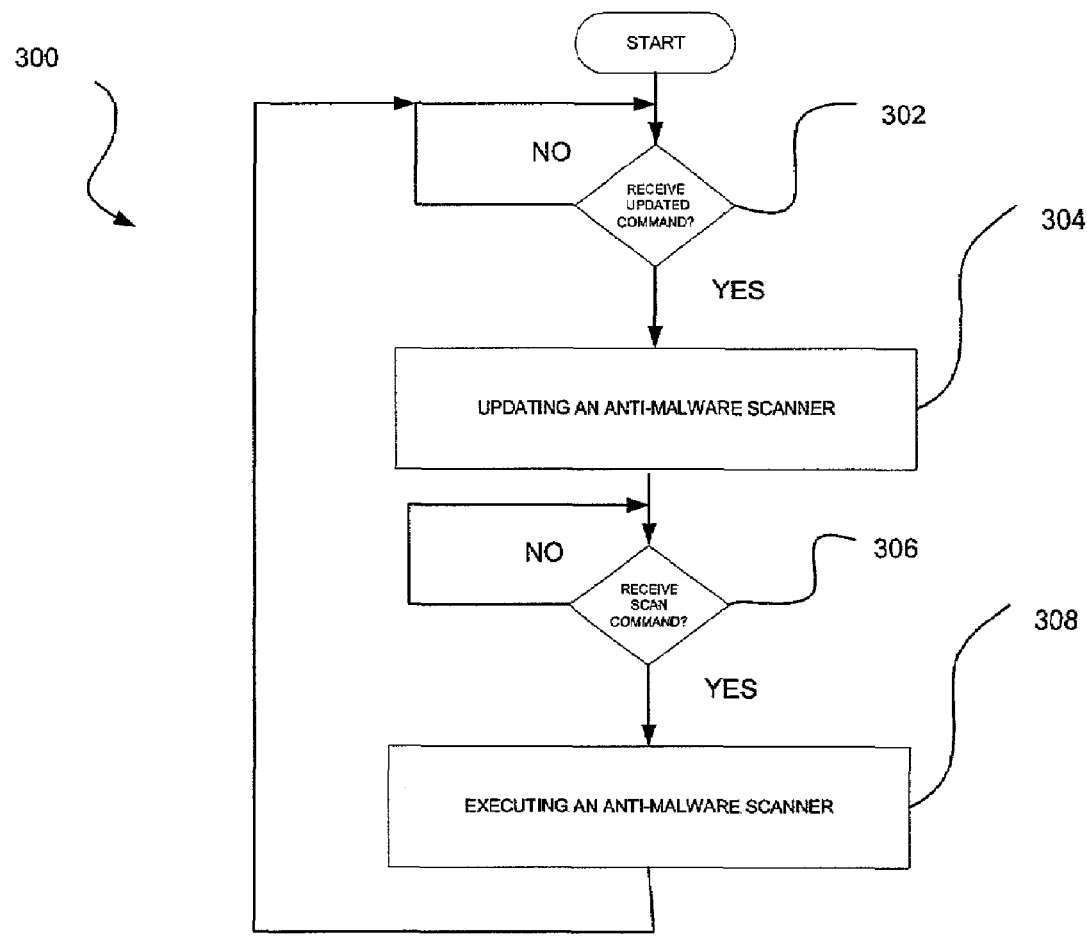
FIG. 3 illustrates a method for scanning a mobile wireless device for malware utilizing a user interface, in accordance with one embodiment.

FIG. 3 illustrates a method 300 for scanning a mobile wireless device for malware utilizing a user interface, in accordance with one embodiment. Initially, in decision 302, it is determined whether an update command is received from a user utilizing a graphical user interface of a mobile wireless device. As an option, the update command may be received upon the selection of an update icon displayed on the graphical user interface of the mobile wireless device. In operation 304, an anti-malware scanner installed on the mobile wireless device is then updated over a wireless network in response to the update command.

Next, it is determined in decision 306 as to whether a scan command has been received via the selection of a scan icon displayed on the graphical user interface of the mobile wireless device. More information regarding an exemplary interface with such icons will be set forth hereinafter during reference to FIG. 4. The mobile wireless device is then scanned utilizing the updated anti-malware scanner, as indicated in operation 308. Such anti-malware scanner may be conditionally updated based on the update command so as to regulate usage of the wireless network with the mobile wireless device.

As an option, a version number of a last update may be displayed utilizing the graphical user interface of the mobile wireless device. Further, a time of a last update may be displayed utilizing the graphical user interface of the mobile wireless device.

The anti-malware scanner user interface is very effective in design. Configuration settings and updates are handled by the back-end system, relieving the user from any responsibilities. Some basic feedback such as the product name, logo, and version information is provided. The user may check for product updates, and initiate a scan for malicious programs on removable media. The details for these capabilities are provided below.

Manual Virus Scanning

Manually virus scanning of the entire device is performed according to the configuration settings set by the IT administrator. That is, either all files may be scanned or only certain types of files. Also, the IT Administrator specifies how the anti-malware scanner responds to any infected file that is found. Upon scan completion, a report is created that reflects what was scanned and whether any computer viruses were found.

Check for Product Updates

Checking for product updates is made available from the main user interface. When update checking is requested, the anti-malware scanner attempts to update itself using a service agent in a manner that will soon be set forth.

About the Anti-malware Scanner

An 'About the anti-malware scanner' dialog box is displayed upon user request. The contents of this dialog box contain the information of Table 1C-1.

TABLE 1C-1

All the necessary anti-malware scanner copyright messages.
Scan engine and virus definition file version numbers.
Last time the product was updated.

Figure 4:
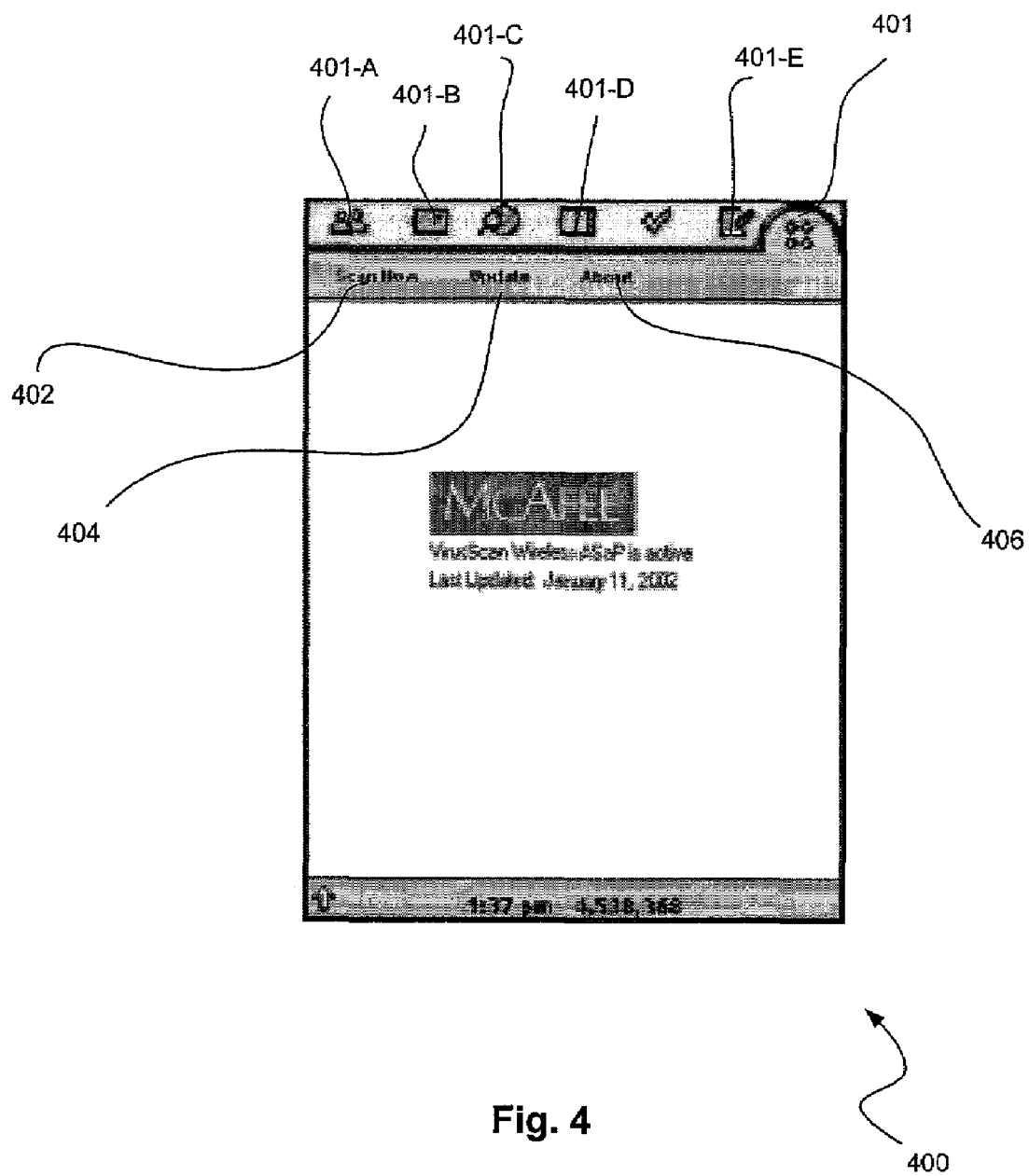
FIG. 4 illustrates a sample user interface screen that shows the features exposed by the anti-malware scanner.

FIG. 4 illustrates a sample user interface screen 400 that shows the features exposed by the anti-malware scanner. The user interface screen 400 may be displayed upon the selection of an anti-malware scanner tab 401 always shown on the user interface screen 400. Of course, other tabs such as a contacts tab 401-A, a mail tab 401-B, a browser tab 401-C, an address book tab 401-D, and a notes tab 401-E may also be provided. As shown in FIG. 4, a scan icon 402, an update icon 404, and an about icon 406 are illustrated upon the selection of the anti-malware scanner tab 401 for allowing a user to carry out the functionality of the anti-malware scanner.

Component Manager Design Specification (204 of FIG. 2)

The component manager inside the anti-malware scanner is the logic layer that instantiates the following subsystems of Table 1D.

TABLE 1D

On-access scanning subsystem.
On-demand scanning subsystem.
Activity logging subsystem.
Service agent subsystem.

The component manager contains logic on how to instantiate the different subsystems, how to configure them, and manages when to activate and deactivate subsystems. It drives the entire application and can provide the user interface with feedback on subsystem progress.

The user interface relies on the component manager to initiate actions such as manually scanning for computer viruses and to check for product updates.

Figure 5:
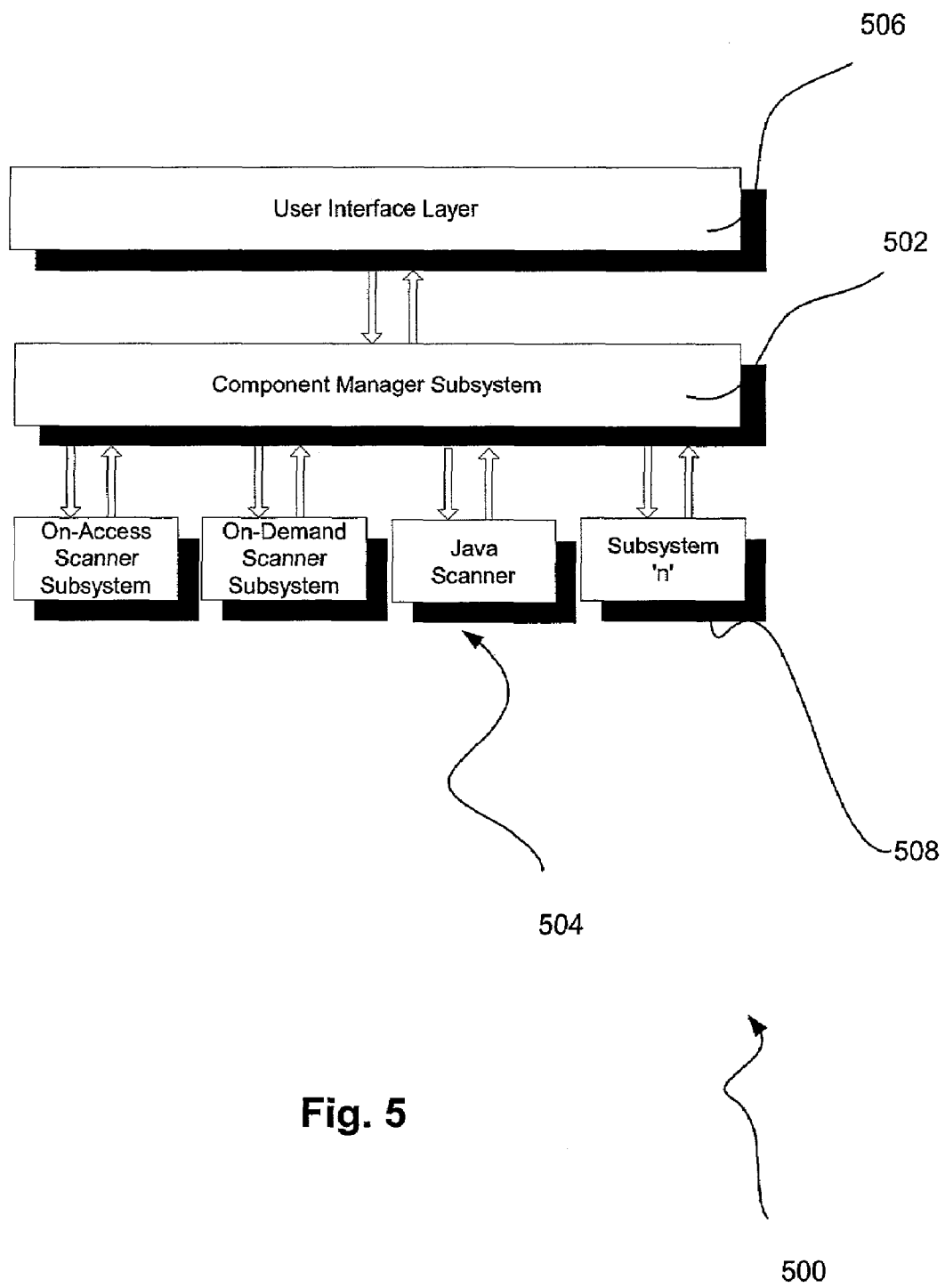
FIG. 5 illustrates a block diagram showing the interaction between a component manager and other subsystems such as the user interface.

FIG. 5 illustrates a block diagram 500 showing the interaction between the component manager 502 and the other subsystems 504 such as the user interface 506. As shown, any number of subsystems 508 may be employed per the desires of the user.

How the Component Manager Works

Figure 6:
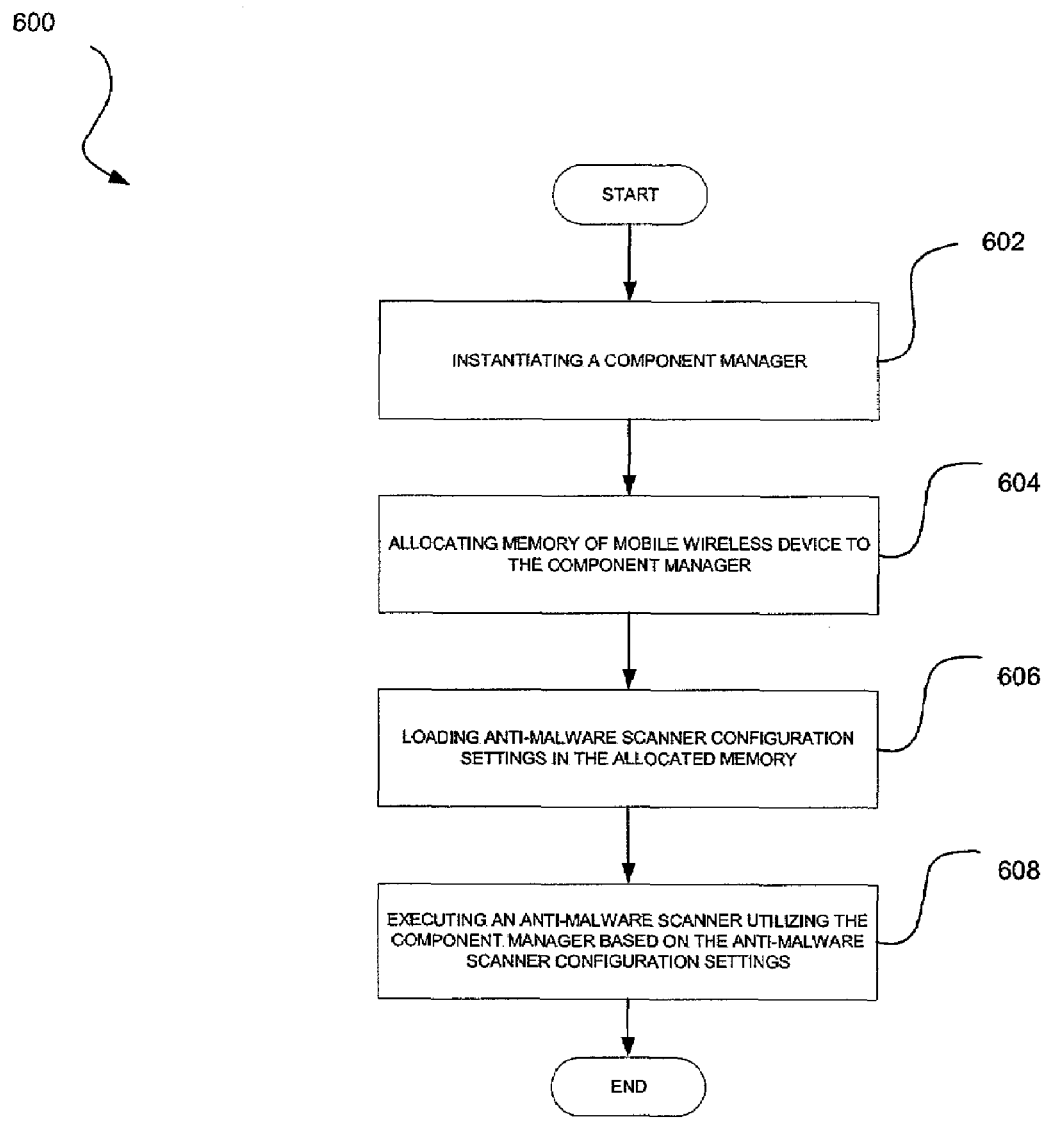
FIG. 6 illustrates a method for scanning a mobile wireless device for malware utilizing a component manager, in accordance with one embodiment.

FIG. 6 illustrates a method 600 for scanning a mobile wireless device for malware utilizing a component manager, in accordance with one embodiment. The component manager is initially instantiated, in operation 602, just like any other core technology component of the present embodiment. As an option, the operation 602 may be executed in response to a scan command received from a user utilizing the user interface of the mobile wireless device.

Next, in operation 604, memory is allocated to store private data information for the component manager. The configuration manager is then used to load in anti-malware scanner scan settings in the private memory just allocated. See operation 606.

Based on the scan settings, the specialized subsystems are initiated. See operation 608. These subsystems may include the on-access scanning, activity logging and/or a service agent function. The on-demand scanning subsystem is only instantiated on a per need basis in order to save system resources. On-demand scanning is only needed when manual device scanning is requested. Based on these initialisation steps, a completion return code is returned to the owner of this subsystem.

The on-access scanning subsystem is initiated so real-time monitoring for viruses begins. When a computer virus is detected, a component manager callback function is called by the on-access scanning subsystem. Within this callback function the component manager determines based on the scan settings how it wishes the on-access scanning subsystem to deal with infected items. The completion status of this event is then passed to the activity logging subsystem for recording purposes.

When manual scanning is requested, it is performed according to the established configuration provided by an IT administrator. Manual scanning involves accessing several files or databases on the device and this same action is what the on-access scanner also monitors. In order to not cause system resources to be spent unnecessarily, the on-access scanning subsystem is disabled for the brief time period that the on-demand scanning is active.

Component Manager API

The component manager exposes all its functionality through an API layer. No platform dependencies are necessarily assumed. All interfaces follow a sandwiched approach where there is an initialisation to obtain an instance handle. Based on this instance handle, the component manager worker functions are available and when the object is not needed anymore the object is destroyed. The number of features that a user interface can request to be performed by the component manager may be limited. All knowledge on how scanning is performed may be contained within the component manager. A user interface can request from the component manager to do the following steps of Table 1E.

TABLE 1E

Start an on-demand scan.
Start the service agent to check for updates.
Find out the version of the scan engine and DAT files.
Find out when was updating done the last time.

As the component manager handles different specialized subsystems, all events that are generated may be communicated back to the owner of the component manager handle using a callback function. To some of these events the callback function may return a TRUE Boolean value to indicate an affirmative answer that the core technology in question should proceed with the action that is about to happen, or return a FALSE to indicate that the action should not be performed.

As an example, when the service agent indicates that it is about to check for updates, if the callback function returns FALSE, this action may not happen.

See Table 2A for an exemplary component manager API.

TABLE 2A

```
CMgrCreate( )
Description
The CMgrCreate( ) function creates an instance of the component
manager. A user interface layer that wraps the core technology
should make this call. The handle that is returned by this
function call should be passed to all subsequent calls to the
component manager.
Prototype
HCMGR CMgrCreate(  // Creates a component manager instance
    PFNCMGRNOTIFY    pfnNotify,   // [in] Function to notify.
    PVOID    pUserParam        // [in] Any user defined value.
    );
Parameters
pfnNotify
[in] Pointer to a notification function that is called to notify the
owner of this object about events that are happening. See the description
of CMgrNotify( ) function for more information.
pUserParam
[in] optionally the owner of this object can specify a user specific
pointer size value that should be passed to the callback function. This can
be handy to eliminate the need of static variables on platforms where
static variables are not allowed.
Return Values
A handle to a component manager object. If NULL value is returned then
this function call failed. To find out the reason why this call failed
call the ErrGet( ) function. This function is thoroughly documented in
the platform abstraction layer. If the function succeeds it may be a
valid handle that should be freed up using the CMgrDestroy( ) function
when it is not needed anymore.
See Also
CMgrDestroy( ), CMgrActivate( ), CMgrNotify( )
CMgrDestroy( )
Description
The CMgrDestroy( ) function destroys a component manager object that
was created using CmgrCreate( ). When this call is made all
specialized subsystems are terminated and all resources associated
with these subsystems are freed up.
Prototype
int CMgrDestroy(  // Destroys component manager instance.
    HCMGR    hCmgr    // [in] handle to component manager.
    );
Parameters
hCmgr
[in] handle to a component manager to destroy. It must have been
created using CMgrCreate( ).
Return Values
Zero is returned to indicate success. −1 is returned to indicate error
To find out the reason why this call failed called the ErrGet( )
function. This function is thoroughly documented in the platform
abstraction layer.
See Also
CMgrCreate( ), CMgrActivate( ), CMgrNotify( )
CMgrActivate( )
Description
```

TABLE 2A-continued

The GMgrActivate( ) function starts the specified core technology component. It should be called by the user interface to start certain actions such as a manual scan of the device or to start checking for an update.
Prototype
int CMgrActivate(     // Activates a component.
    HCMGR    hCmgr,    // [in] handle to component manager.
    COMPID   CompID    // [in] subsystem to activate
    );
Parameters
hCmgr
[in] handle to a component manager that was created using CMgrCreate( ).
CompID Core component identifier that should be activated. This value can be any of the following values. If some other core component value is given an error is returned.
COMPID_ONDEMAND, starts a manual scan of the device.
COMPID_SERVAGENT, start to check for a product update.
Return Values
Zero is returned to indicate success. −1 is returned to indicate error
To find out the reason why this call failed called the ErrGet( ) function. This function is thoroughly documented in the platform abstraction layer.
See Also
CMgrCreate( ), CMgrDestroy( ), CMgrActivate( ), CMgrNotify( )
CMgrNotify( )
Description
The CMgrNotify( ) function must be implemented by the calling application and a pointer to it must be passed during initialisation to CMgrCreate( ). This component manager may notify the caller about different events as they are about to occur so the application can record these events if it has to. The application can also indicate using the return code whether the event that it is being notified about should be allowed or disallowed from happening.
Prototype
BOOL CMgrNotify(    // Notification callback function.
PCOMPMGRNOTIFYINFO pNotify    // Notification structure.
);
Parameters
pNotify
[in] pointer to a notification structure. This structure hold everything needed to properly notify the owner of this object about the events that are happening within the anti-malware scanner core technology. This structure is defined as:
typedef struct tagCOMPMGRNOTIFYINFO
{
    PVOID              pUserParam;    // User defined value used in CompMgrCreate( )
    COMPID             CompID;        // Component that generates this event.
    VSCNEVENT          hEvent;        // Why the notification function was called.
    COMPMGRVALID       Valid;         // Fields that are valid to check.
    HVSCNITEM          hItem;         // Item that scanner is notifying about.
    SCNDONEACTION      DoneAction;    // Status of completion status
} COMPMGRNOTIFYINFO, * PCOMPMGRNOTIFYINFO;
The structure members should be interpreted by the caller as:
pUserParam: The same user defined pointer size value that was given to the core component manager during creation is returned in this field. This is a convenient way for applications to not have to resort to global static data usage since this is not supported on many platforms. CompID: This field indicates the component identification number that is notifying about an event that is about to happen, or about an event that just happened. The possible component identification numbers are as follows:
COMPID_ONACCESS, On-access scanning subsystem.
COMPID_ONDEMAND, On-demand scanning subsystem.
COMPID_ACTILOG, Activity logging subsystem.
COMPID_SERVAGENT, Service agent subsystem.
hEvent: This is the event that the CompID subsystem is notifying about. The possible event identifiers for this field are as follows:
VSE_CANCELLED
The previous request that the component manager notified about was cancelled as requested by the object owner. This is nothing more than a confirmation message indicating that the request was understood. At this point the return code from this function has no meaning and it is ignored.
VSE_INFECTED
The component manager is indicating that a computer virus or some malicious code was found. The subsystem that found this malicious code is known from the CompID component identification number. If the component that found this malicious code is the on-demand scanner, a return code of TRUE indicates that scanning should continue. A return code of FALSE indicates that scanning should be stopped. If FALSE is returned a confirmation notification message VSE_CANCELLED may be sent to the owner of this object.
On the on-access and the on-demand scanning subsystems can generate this event.
VSE_COMPLSTATUS
This event indicates the completion status of the action that was taken on an infected file. This event can only be generated by the on-access and by the on-demand subsystems. For possible completion status codes please see the DoneAction structure member. If the component that found this malicious code is the on-demand scanner, a return code of TRUE indicates that scanning should continue. A return code of FALSE indicates that scanning should be stopped. If FALSE is returned a confirmation notification message VSE_CANCELLED may be sent to the owner of this object.
On the on-access and the on-demand scanning subsystems can generate this event.
VSE_SCANNINGITEM
This is a notification event that tells the owner of this object that a file is about to be scanned for viruses. The file that is about to be scanned has already been pre-filtered based on the IT Administrator specified scan setting so at this way the user interface has no say about what files are being scanned. The only core components that can generate this event are the on-access and the on-demand scanners. Because the user can choose to cancel a user initiated on-demand scan, the return code may only be respected if this event was generated by the on-demand scanner subsystem. A return code of TRUE indicates that scanning should continue. A return code of FALSE indicates that scanning should be stopped. If FALSE is returned a confirmation notification message VSE_CANCELLED may be sent to the owner of this object.
VSE_START
This event indicates to the caller that the core technology component identified in the CompID structure member just finished initialising. This is only a notification message so any return code that is returned to the component manager from this event notification may be ignored.
VSE_END
This event indicates to the caller that the core technology component identified in the CompID structure member just terminated. This is only a notification message so any return code that is returned to the component manager from this event notification may be ignored. Valid: This structure member indicates what other fields below this structure member contains valid values. This structure field should be interpreted as a bit field and the individual bits should be access the standard documented 'C' coding guideline way. The named bit fields are as follows:
bit_hItem, indicates that the hItem structure member is valid.
bit_DoneAction, indicates that the DoneAction structure member is valid.
hItem: This is a handle to a anti-malware scanner scan item. Information that is associated with this handle can be accessed using the ScnItem family of functions.
DoneAction: This structure member indicates the completion status of an action that was performed on an infected item. The completion status can be one of the following values:
SCNDONE_NOACTION, Nothing was done about the infected item.
SCNDONE_DENIEDACCESS, Infected item was denied access to.
SCNDONE_CLEANED, Infected item was cleaned.
SCNDONE_CLEANFAILED, Infected item could not be cleaned.
SCNDONE_DELETED, Infected item was deleted.
SCNDONE_DELETEFAILED, Infected item could not be deleted.
Return Values
The Boolean return value depends on the type of event that the owner of this object is being notified with. Please see the description of each event for description on what the appropriate return code should be.
See Also
CMgrCreate( ), CMgrDestroy( ), CMgrActivate( )

On-Access Scanner Module (206 of FIG. 2)

Figure 7:
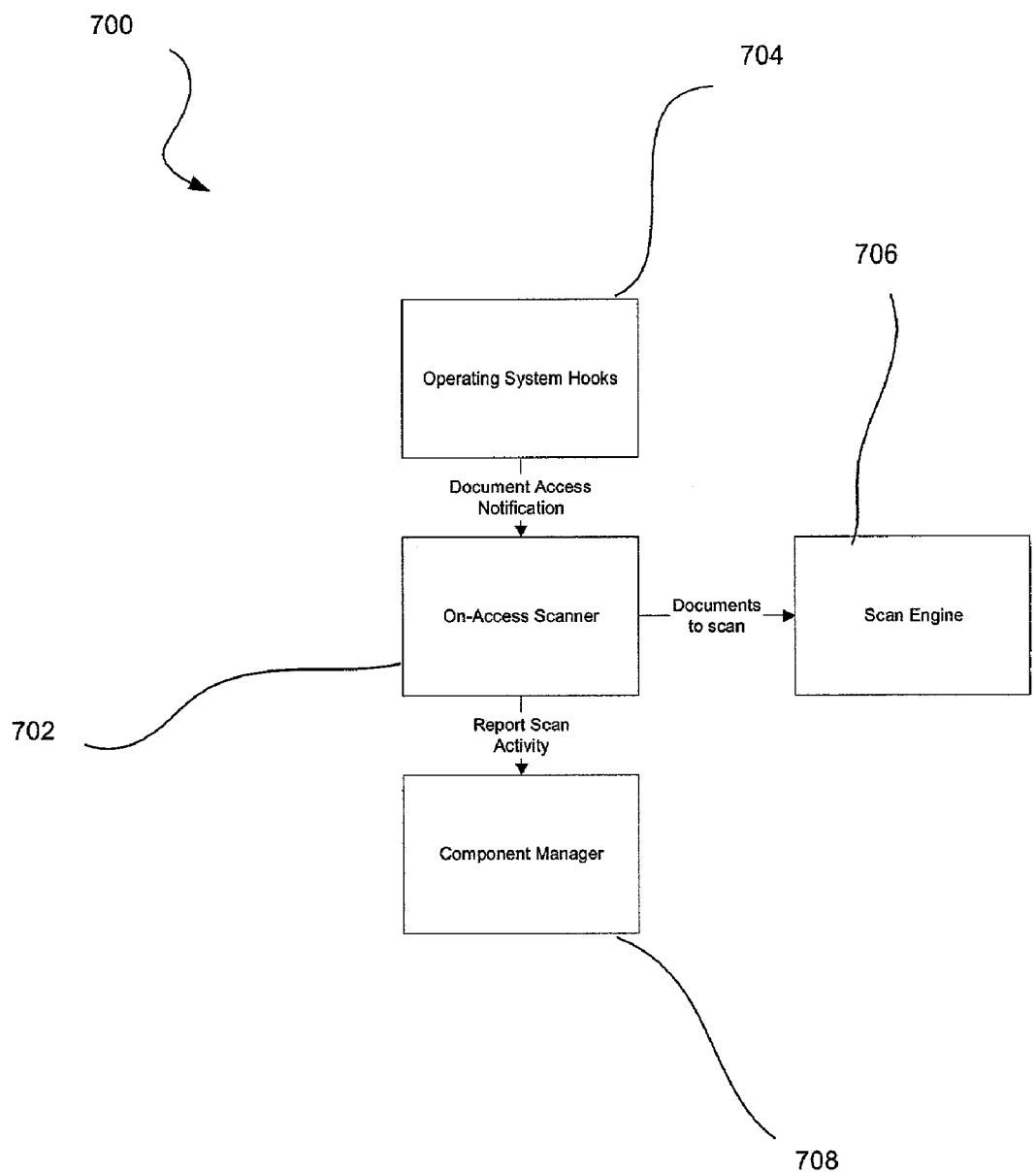
FIG. 7 illustrates a system including an on-access scanner, in accordance with one embodiment.

FIG. 7 illustrates a system 700 including an on-access scanner 702, in accordance with one embodiment. In general, the on-access scanner 702 is governed by operating system hooks 704 which provide document access notification. Further, the on-access scanner 702 interfaces with a scan engine 706 to scan documents. Still yet, the on-access scanner 702 reports scan activity to a component manager 708. More information relating to such operation will now be set forth.

The on-access scanner 702 identifies malware as documents are being access on the device. The on-access scanner 702 may be entirely transparent to the user until malicious code is discovered. Scanning can be performed on all executables and documents. This includes word processor documents or files being downloaded by a web browser. The on-access scanner can be configured to only scan certain types of documents.

The on-access scanner 702 is notified of various events related to accessing documents. It then determines whether the document needs to be scanned. The scan engine 706 is used to detect malicious code. When malicious code is discovered, the on-access scanner 702 notifies the component manager 708. It is then the component manager's responsibility to determine which of the following actions in Table 2B to perform.

TABLE 2B

Notify the user that malicious code was discovered.
Clean the infected file. Once successfully cleaned, the user may access the file.
Delete the infected file. This results in an error message displayed to the user that the file could not be accessed.
Optionally ask the user whether the infected items should be cleaned, deleted, or just denying access to it.

On-access file scanning is accomplished by hooking into a file access notification mechanism that resides inside the operating system. For a comprehensive protection it is crucial to be able to hook into all file access events prior to them happening and after they have occurred.

The purpose of hooking into all file access events prior to them happening is so they can be intercepted. The purpose of hooking into all file access events after they have occurred is so the file in question can be analyzed prior to control being returned to the operating system. An important part of this notification interception is that an application that is part of this notification chain must have the capability to allow or disallow an event from continuing through the file system notification. Of course nothing can be allowed or disallowed once the event has already happened, such as a close event, but in case an infected file is opened, the hooking application must indicate to the operating system that this event should not traverse further in the file system.

The file system related events that are filtered are as follows.

File Create Event

When a file create event is received it may be because the user has decided to download, beam or install some sort of application. When a create event occurs, the anti-malware scanner keeps track of a reference information that is associated with this event, and matches it up with the corresponding close event. This is done because when a new file is created it does not contain any information that can be analyzed for malicious code. It is important to know that if a "file create" event is the same as a file open event, these two are combined into one.

File Open, Execute Program Event

Prior to opening a file, the anti-malware scanner must make sure that the file is not infected. If the file is not infected, identification information is obtained from it. This way, when the file is closed this same information is compared to determine if any changes were made to the file. If changes were made, the anti-malware scanner resorts to a more resource intensive task to ensure that the file does not contain any malicious code. It is important to note that if application execution is a different event from a regular file open event, file execution should be monitored the same way.

File Close Event

The close event must be monitored for several reasons. As described above, when a file is created, it is scanned after the close operation occurred so the anti-malware scanner can analyze its content for computer viruses.

File Rename Event

This is yet another important part of the protection because a smarter computer virus could try to create a text file that contains malicious executable code and prior to launching it, rename it to an executable file type.

On-access Scanner Subsystem Interaction

The on-access scanner subsystem is made usable with the help of other application subsystems. Each subsystem that on-access scanning interacts with are described below. A reason why this interaction is needed is also explained.

Component Manager

When the on-access scanning subsystem determined that there is something important to notify about such as an error condition or that an infected files was found, it informs the component manager.

Scan Engine

The scan engine is the component that takes a file and analyzes it to see if the file contains any malicious code. The scan engine is invoked prior to an open event happening and after a close event has happened.

Operating System

The on-access scanning subsystem must interact with the underlying operating system that informs of all file related events that take place. The operating system may always inform about the following information in Table 2C.

TABLE 2C

The full path and filename of the file that is being handled by the operating system.
The function that the operating system is about to perform on the indicated file.
Any time a drive is being connected and disconnected.

It is important to know that the file system should allow for re-entrancy so when a file system event is intercepted, the file system hooking function can open any file on any drive and perform I/O operations.

On some operating systems it is not possible for an application to use static or global data. Therefore, it would be required on those platforms that a mechanism is provided where the hooked function can access some previously allocated and initiated data.

An example way of accomplishing this would be to have a file system hook installation function that accepts a pointer to a callback function and a void pointer to application defined data. This application defined data would then be passed with every call to the hooking function. An example set of functions that are required to perform comprehensive file system hooking is described in Table 3.

TABLE 3

FsInstallHook( )
Description
The FsInstallHook( ) function installs a file system hook. All file I/O related events that occur within the operating system are piped through this function.
Prototype
int FsInstallHook(
    PFNFSHOOK  pAppCallback,
    void  * pUser,
    PFNFSHOOK  * ppPrevHook
    );
Parameters
pAppCallback
[in] application defined callback function that should be called for all file system events. See function definition for FsHookFunc( ) for a detailed description.
pUser
[in] is a user defined data that is passed to the callback function with every call so it can access its own initialized data.
pPrevHook
[out] pointer to a pointer to the previous file system hooking function. This is required so file system events can be chained. See function definition for FsHookFunc( ) for a detailed description.
Return Values
A return value of zero should be returned for success or any other number to indicate an error condition.
See Also
FsUninstallHook( ), FsHookFunc( )
FsUninstallHook( )
Description
The FsUninstallHook( ) function removes a previously installed file system hook.
Prototype
int FsUnInstallHook( PFNFSHOOK pAppCallback );
Parameters
pAppCallback
[in] application defined file system callback function that was installed. See function definition for FsHookFunc( ) for a detailed description.
Return Values
A return value of zero should be returned for success or any other number to indicate an error condition.
See Also
FsInstallHook( ), FsHookFunc( )
FsHookFunc( )
Description
The FsHookFunc( ) is an application defined function that the operating system calls before a file event occurs. This allows an application to be notified of all file I/O related events before they occur and the application has the capability of allowing or disallowing a file 110 event from continuing. Because FsHookFunc( ) is called before the event occurs, the hooking function may most likely chain this event to the next caller in the list using the pPrevHook value that was returned during hook installation. In case the hooking function determines that further chaining of this file I/O event should not continue, it may return an error indicating this intent. As noted previously, the file system should allow for reentrancy so within FsHookFunc( ) the application can perform I/O operations on any other file that it chooses.
Prototype
int FsHookFunc( POSFILESTRUCT pOsFileInfo, void * pUserParam );
Parameters
pOsFileInfo
[in] this is an operating system dependent structure that contains all the necessary information needed by the operating system to perform a file I/O related function. As an example of information that a hooking function could obtain from here are:
Full path and filename to the file being accessed.

TABLE 3-continued

File system function identifier that is currently being requested such as CREATE, OPEN, EXECUTE, CLOSE, READ, WRITE, Etc.
Function specific attributes such as file open attributes for an open function and file handle for a close function.
Return Values
A return value of zero indicates success and any other number to indicate an error condition. When an error is returned the operating system should not process this event
See Also
FsInstallHook( ), FsUninstallHook( )

On-Access Scanner API

To protect against malicious code such as computer viruses, the anti-malware scanner requires access to all files being accessed through system provided APIs. The on-access scanning subsystem resides parallel to the other specialized subsystems and as such the component manager manages it.

Figure 8:
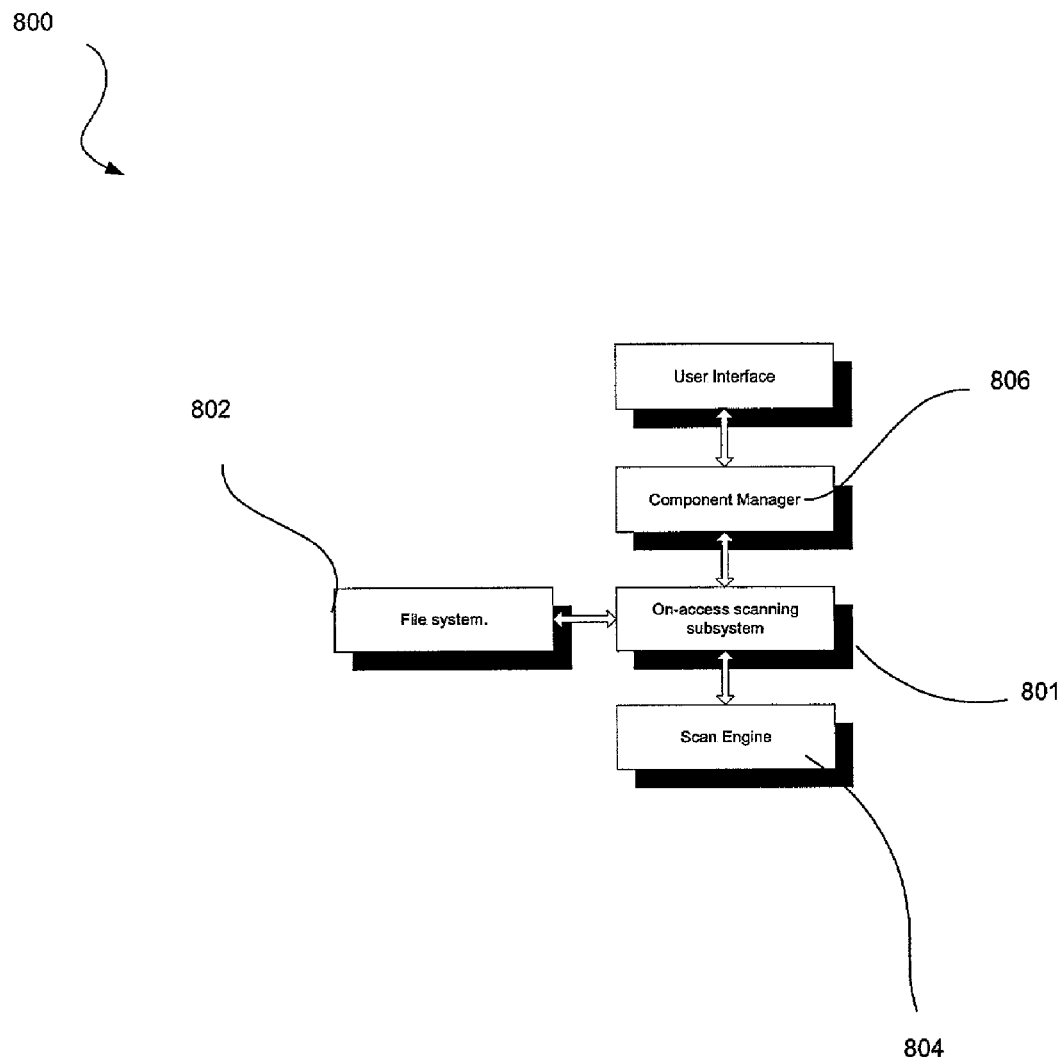
FIG. 8 illustrates a framework with an on-access scanner interfacing with a file system, and filtering all file I/O related events.

FIG. 8 illustrates a framework 800 with an on-access scanner 801 interfacing with the file system 802 and filtering all file I/O related events. Every file that is about to be accessed is passed to the scan engine 804 that determines whether it is safe to access it.

If the scan engine 804 determines that it is not safe, the component manager 806 may be notified and, based on established scan settings, some action may be done on the infected file. See Table 4 for an exemplary API.

TABLE 4

OnAccCreate( )
Description
The OnAccCreate( ) function creates an instance of the on-access scanning subsystem. If the creation returns success the subsystem is ready to monitor for viruses in real-time. The actual monitoring may begin when the OnAccEnable( ) function is called to request the subsystem to enable itself.
Prototype
HONACCESS  OnAccCreate(  // Creates on-access scan instance
    PFONACCNOTIFY  pfnNotify,  // [in] Function to notify.
    PVOID  pUserParam  // [in] Any user defined value.
    );
Parameters
phOnAccess
[out] pointer to an on-access scanner handle. This is the same handle that must be passed to OnAccDestroy( ) before the application terminates.
pfnNotify
Address to a notification function. If NULL is passed in, all notifications may be turned off. Please see OnAccNotify( ) function for a detailed description of this function.
pUserParam
A user defined value that may be passed to the call-back function.
Return Values
Zero is returned to indicate success. −1 is returned to indicate error To find
out the reason why this call failed called the ErrGet( ) function. This function is thoroughly documented in the platform abstraction layer.
See Also
OnAcoDestroy( ), OnAccEnable( ), OnAccNotify( )
OnAccDestroy( )
Description
The OnAccDestroy( ) function destroys an on-access scan instance that was created using OnAccCreate( ). There is no need to call OnAccEnable( ) function to disable the on-access scanning subsystem prior to destroying.
Prototype
int OnAccDestroy(    // Destroys on-access scan instance.
    HONACCESS  hOnAccess  // [in] handle to destroy
    );
Parameters
hOnAccess
[in] handle to an on-access scanner subsystem. This is the same handle that was created using OnAccCreate( ).

TABLE 4-continued

Return Values
Zero is returned to indicate success. −1 is returned to indicate error To find
out the reason why this call failed called the ErrGet( ) function. This
function is thoroughly documented in the platform abstraction layer.
See Also
OnAccCreate( ), OnAccEnable( ), OnAccNotify( )
OnAccEnable( )
Description
The OnAccEnable( ) function allows the caller to enable and disable the
on-access scanning subsystem that was created using OnAccCreate( ). The
on-access scanner is enabled and disabled internally to the anti-malware
scanner when an on-demand scan is started. This is done so the on-
access scanner does not interfere with the on-demand scanners work.
When on-demand scanning is completed, on-access scanning is re-enabled.
Prototyne
int OnAccEnable( // Enable on-access scan subsystem.
    HONACCESS  hOnAccess,  // [in] handle to on-access scanner.
    BOOL  bEnable  // [in] TRUE/FALSE to enable/disable.
    );
Parameters
hOnAccess
[in] handle to an on-access scanner subsystem. This is the same
handle that was created using OnAccCreate( ).
bEnable
[in] A Boolean TRUE to indicate that the on-access scanning subsystem
should be enabled, that is it should monitor for file activities and
scan files as they are being accessed. A Boolean value of FALSE
disables the on-access scanning subsystem.
Return Values
Zero is returned to indicate success. −1 is returned to indicate error To find
out the reason why this call failed called the ErrGet( ) function. This
function is thoroughly documented in the platform abstraction layer.
See Also
OnAccCreate( ), OnAccDestroy( ), OnAccNotify( )

Table 5 illustrates additional optional components of the on-access scanner API.

TABLE 5

OnAccNotify( )
Description
The OnAccNotify( ) function is oniy a placeholder and it should be
defined by the calling application in case the application would like to
be notified of events that are occurring within the on-access scanning
subsystem. A pointer to this function should be passed to OnAccCreate( ).
Prototype
typedefBOOL (* PFONACCNOTIFY)(PONACCNOTIFYTNFO pNotify);
Parameters
pNotify
[in] pointer to a notification structure that contains all the
relevant information regarding the reason that the notification
function was called. Important to know that during on-access scanning
subsystem initialization the caller indicates what events it would like
to be notified on. This structure is defined as follows:
//------------------------------------------------------------
-----------
// Structure used by the on-access scanning subsystem to notify
parent.
//------------------------------------------------------------
-----------
typedef struct tagONACCNOTIFYINF( )
{
    UInt16          uThisSize;  // Size of this structure.
    PVOID           pUserParam;  // User defined value used in
OnAceCreate( )
    VSCNEVENT      hEvent;  // Reason why the notification
was called.
    HVSCNITEM      hItem;  // Item that scanner is
notifying about.
    VSWSCNACTION   ScnAction;  // Set if hEvent ==
VSE_INFECTED
    SCNDONEACTION  DoneAction;  // Set if hEvent ==
VSE_COMPLSTATUS
} ONACCNOTIFYINFO, * PONACCNOTIFYINFO;

TABLE 5-continued uThisSize
This is a 16-bit unsigned integer value indicating the size of this
structure. This information is very useful to know for debugging
purposes to ensure proper structure packing.
pUserParam
This is the same pointer size user defined value that was passed to the
subsystem during initialization. This is a convenient way for applications
to associate data with an object without the need of using global variables
and such.
hEvent
This is an event identifier that specifies the reason why the callback
function was called. The possible event identifiers for this field are
as follows:
VSE_CANCELLED
The previous request that the component manager notified about was
cancelled as requested by the object owner. This is nothing more than a
confirmation message indicating that the request was understood. At this
point the return code from this function has no meaning and it is
ignored.
VSE_INFECTED
The component manager is indicating that a computer virus or some
malicious code was found.
The subsystem that found this malicious code is known from the CompID
component identification number. If the component that found this
malicious code is the on-demand scanner, a return code of TRUE
indicates that scanning should continue. A return code of FALSE
indicates that scanning should be stopped. If FALSE is returned a
confirmation notification message VSE_CANCELLED maybe
sent to the owner of this object. On the on-access and the
on-demand scanning subsystems can generate this event.
VSE_COMPLSTATUS
This event indicates the completion status of the action that was taken
on an infected file. This event can only be generated by the
on-access and by the on-demand subsystems. For possible completion
status codes please see the DoneAction structure member. If the
component that found this malicious code is the on-demand scanner, a
return code of TRUE indicates that scanning should continue. A return
code of FALSE indicates that scanning should be stopped. If
FALSE is returned a confirmation notification message
VSE_CANCELLED may be sent to the owner of this object.
On the on-access and the on-demand scanning subsystems can generate
this event.
VSE_SCANNINGITEM
This is a notification event that tells the owner of this object that a
file is about to be scanned for viruses. The file that is about to be
scanned has already been pre-filtered based on the IT Administrator
specified scan setting so at this way the user interface has no say
about what files are being scanned. The only core components that can
generate this event are the on-access and the on-demand scanners.
Because the user can choose to cancel a user initiated on-demand scan,
the return code may only be respected if this event was generated by the
on-demand scanner subsystem. A return code of TRUE indicates that
scanning should continue. A return code of FALSE indicates that
scanning should be stopped. If FALSE is returned a confirmation
notification message VSE CANCELLED may be sent to the owner of this
object.
VSE_START
This event indicates to the caller that the core technology component
identified in the CompID structure member just finished initializing.
This is only a notification message so any return code that is
returned to the component manager from this event notification may be
ignored.
VSE_END
This event indicates to the caller that the core technology component
identified in the CompID structure member just terminated. This is
only a notification message so any return code that is returned to
the component manager from this event notification may be ignored.
hItem: This is a handle to a scan item. Information that is associated
with this handle can be accessed using the ScnItem family of functions.
DoneAction: This structure member indicates the completion status of an
action that was performed on an infected item. The completion status
can be one of the following values:
SCNDONE_NOACTION, Nothing was done about the infected item.
SCNDONE_DENIEDACCESS, Infected item was denied access to.
SCNDONE_CLEANED, Infected item was cleaned.
SCNDONE_CLEANFAILED, Infected item could not be cleaned.
SCNDONE_DELETED, Infected item was deleted.
SCNDONE_DELETEFAILED, Infected item could not be deleted.
Return Values TABLE 5-continued The Boolean return value depends on the type of event that the owner of this object is being notified with. Please see the description of each event for description on what the appropriate return code should be.
See Also
OnAccCreate( ), OnAccDestroy( ), OnAccEnable( )
ScnItemCreate( )
Description
The ScnItemCreate( ) function is used to create an object that contains all information that there is to know about a scan object that is scanned by the on-access scanning subsystem. As an example a 'Scan Item' object could contain the name of the file, the virus it was infected with, what type of scan actions the anti-malware scanner attempted to perform on it and the outcome of this operation.
Prototype
HVSCNITEM ScnItemCreate( void ); // Creates a scan item
Parameters
None
Return Values
If NULL value is returned then this function call failed. To find out the reason why this call failed call the ErrGet( ) function. This function is thoroughly documented in the platform abstraction layer. If the function succeeds it maybe a valid handle that should be freed up using the ScnItemDestroy( ) function when it is not needed anymore.
See Also
ScnItemDestroy( ), ScnItemCopy( ), ScnItemGetItemName( ), ScnItemGetVirusName( ), ScnItemGetActions( ), ScnItemSetAction( ), ScnItemSetUserParam( ), ScnItemGetUserParam( )
ScnItemDestroy( )
Description
The ScnItemDestroy( ) function is used to free up all resources associated with a scan item object that was created using ScnItemCreate( ).
Prototype
int ScnItemDestroy(         // Destroys a scan item object.
    HVSCNITEM   hItem    // [in] handle to scan item
    );
Parameters
hItem
[in] handle to a scan item object that should be destroyed.
Return Values
Zero is returned to indicate success. −1 is returned to indicate error To find out the reason why this call failed called the ErrGet( ) function. This function is thoroughly documented in the platform abstraction layer.
See Also
ScnItemCreate( ), ScnItemCopy( ), ScnItemGetItemName( ), ScnItemGetVirusName( ), ScnItemGetActions( ), ScnItemSetAction( ), ScnItemSetUserParam( ), ScnItemGetUserParam( )
SdnItemCopy( )
Description
The ScnItemCopy( ) function is used to create a copy of a scan item object. The copied object may be a carbon copy of the source. Before calling this function make sure to call ScnItemCreate( ) function on the hItemTgt scan item object.
Prototype
int ScnItemCopy(           // Creates a copy of a scan item object.
    HVSCNITEM   hItemSource,  // [in] handle to copy
    HVSCNITEM   hItemTarget   // [out] a new copy of the item.
    );
Parameters
hItemSource
[in] handle to a scan item object that should be copied.
hItemTarget
[out] handle where the copy maybe placed.
Return Values
Zero is returned to indicate success. −1 is returned to indicate error To find
out the reason why this call failed called the ErrGet( ) function. This function is thoroughly documented in the platform abstraction layer.
See Also
ScnItemCreate( ), ScnItemDestroy( ), ScnItemGetItemName( ), ScnItemGetVirusName( ), ScnItemGetActions( ), ScnItemSetAction( ), ScnItemSetUserParam( ), ScnItemGetUserParam( ).
ScnItemGetName( )
Description
The ScnItemGetName( ) function is used to retrieve the name of the item that this object is referencing to.
Prototype TABLE 5-continued int ScnItemGetName(     // Returns the name of the file.
    HVSCNITEM   hItem,   // [in] handle of the scan item.
    text_t *  pBuffer,  // [out] file name is placed here.
    size_t    uSize    // [in] buffer size in CHARACTERS!
    );
Parameters
hItem
[in] handle to a scan item object that is being referenced.
pBuffer
[out] buffer where the name should be placed.
uSize
[in] maximum number of characters that can be placed in this buffer. Note that this is not the same as the buffer size!
Return Values
Zero is returned to indicate success. −1 is returned to indicate error To find
out the reason why this call failed called the ErrGet( ) function. This function is thoroughly documented in the platform abstraction layer.
See Also
ScnItemCreate( ), ScnItemDestroy( ), ScnItemSetItemName( ), ScnItemGetVirusName( ), ScnItemGetActions( ), ScnItemSetAction( ), ScnItemSetUserParam( ), ScnItemGetUserParam( )
ScnItemSetName( )
Description
The ScnItemSetName( ) function is used to set the name of the item that this object is referencing to.
Prototype
int ScnItemSetName(       // Sets the name of the file.
    HVSCNITEM   hItem,   // [in] handle of the scan item.
    text_t *  pszItem  // [in] file name is placed here.
    );
Parameters
hItem
[in] handle to a scan item object that is being referenced.
pszItem
[in] pointer to a NULL terminated string of characters.
Return Values
Zero is returned to indicate success. −1 is returned to indicate error To find
out the reason why this call failed called the ErrGet( ) function. This function is thoroughly documented in the platform abstraction layer.
See Also
ScnItemCreate( ), ScnItemDestroy( ), ScnItemGetItemName( ), ScnItemGetVirusName( ), ScnItemGetActions( ), ScnItemSetAction( ), ScnItemSetUserParam( ), ScnItemGetUserParam( )
ScnItemGetVirusName( )
Description
The ScnItemGetVirusName( ) function is used to get the name of the virus that this object is referencing to.
Prototype
int ScnItemGetVirusName(      // Returns the virus name from scan item
    HVSCNITEM   hItem,   // [in] handle of the scan item.
    text_t *  pBuffer,  // [out] file name is placed here.
    size_t    uSize    // [in] buffer size in CHARACTERS!
    );
Parameters
hItem
[in] handle to a scan item object that is being referenced.
pBuffer
[out] buffer where the name should be placed.
uSize
[in] maximum number of characters that can be placed in this buffer. Note that this is not the same as the buffer size!
Return Values
Zero is returned to indicate success. −1 is returned to indicate error To find
out the reason why this call failed called the ErrGet( ) function. This function is thoroughly documented in the platform abstraction layer.
See Also
ScnItemCreate( ), ScnItemDestroy( ), ScnItemGetItemName( ), ScnItemSetVirusName( ), ScnItemGetActions( ), ScnItemSetAction( ), ScnItemSetUserParam( ), ScnItemGetUserParam( )
ScnItemSetVirusName( )
Description
The ScnItemSetVirusName( ) function is used to set the name of the virus that this object is referencing to.
Prototype
int ScnItemSetVirusName(      // Sets the name of the virus.
    HVSCNITEM   hItem,   // [in] handle of the scan item.

TABLE 5-continued

```
        text_t * pszItem    // [in] file name is placed here.
    );
Parameters
hItem
[in] handle to a scan item object that is being referenced.
pszItem
[in] pointer to a NULL terminated string of characters.
Return Values
Zero is returned to indicate success. −1 is returned to indicate error To
find
out the reason why this call failed called the ErrGet( ) function. This
function is thoroughly documented in the platform abstraction layer.
See Also
ScnItemCreate( ), ScnItemDestroy( ), ScnItemGetItemName( ),
ScnItemGetVirusName( ), ScnItemGetActions( ), ScnItemSetAction( ),
ScnItemSetUserParam( ), ScnItemGetUserParam( )
ScnItemSetAction( )
Description
The ScnItemSetAction( ) function is used to indicate what was done on
this scan item by a subsystem such as the scan engine. As an example if
cleaning this scan item was attempted, the outcome of this operation
should be indicated so other subsystems, such as activity logging can
retrieve this information A queue of the 3 last scan actions is maintained
within the object.
Prototype
int ScnItemSetAction(          // Sets a scan action performed.
        HVSCNITEM    hItem,    // [in] item that was scanned.
        SCNDONEACTION    Action    // [in] scan action performed.
    );
Parameters
hItem
[in] handle to a scan item object that is being referenced.
Action
[in] an identifier that specifies what actions were performed on this
object. Possible values for this field are:
SCNDONE_NOACTION,          Nothing was done about the
                           infected item.
SCNDONE _DENIEDACCESS,     Infected item was denied access to.
SCNDONE _CLEANED,          Infected item was cleaned.
SCNDONE _CLEANFAILED,      Infected item could not be cleaned.
SCNDONE _DELETED,          Infected item was deleted.
SCNDONE _DELETEFAILED,     Infected item could not be deleted.
Return Values
Zero is returned to indicate success. −1 is returned to indicate error To
find
out the reason why this call failed called the ErrGet( ) function. This
function is thoroughly documented in the platform abstraction layer.
See Also
ScnItemCreate( ), ScnItemDestroy( ), ScnItemGetItemName( ),
ScnItemGetVirusName( ), ScnItemSetVirusName( ),
ScnItemGetActions( ), ScnItemSetAction( ), ScnItemSetUserParam( ),
ScnItemGetUserParam( )
ScnItemGetActions( )
Description
The ScnItemGetActions( ) function is used to retrieve what actions were
done on this scan item by subsystems such as the scan engine. A list of
the 3 last scan actions is maintained within the scan item object. When
the last item is of type OAS_NOACTION, that means no more
actions are associated with this scan item.
Prototype
int ScnItemGetActions(          // Returns scan actions performed.
        HVSCNITEM    hItem,     // [in] item that was scanned.
        SCNDONEACTION    Action[3]    // [out] maximum 3 scan actions.
    );
Parameters
hItem
[in] handle to a scan item object that is being referenced.
Action[3]
[out] an array of identifier that specifies what actions were performed on
this object. Possible values for this field are:
SCNDONE _NOACTION,         Nothing was done about the infected
                           item.
SCNDONE _DENIEDACCESS,     Infected item was denied access to.
SCNDONE _CLEANED,          Infected item was cleaned.
SCNDONE _CLEANFAILED,      Infected item could not be cleaned.
SCNDONE _DELETED,          Infected item was deleted.
SCNDONE _DELETEFAILED,     Infected item could not be deleted.
Return Values
Zero is returned to indicate success. −1 is returned to indicate error To
find
out the reason why this call failed called the ErrGet( ) function. This
function is thoroughly documented in the platform abstraction layer.
See Also
ScnItemCreate( ), ScnItemDestroy( ), ScnItemGetItemName( ),
ScnItemGetVirusName( ), ScnItemSetVirusName( ),
ScnItemGetActions( ), ScnItemSetAction( ), ScnItemSetUserParam( ),
ScnItemGetUserParam( )
ScnItemSetUserParam( )
Description
The ScnItemSetUserParam( ) function is used to associate any pointer size
argument with a scan item object. The meaning of this value is up to the
application to define.
Prototype
int ScnItemSetUserParam(          // Associate user defined values.
        HVSCNITEM    hItem,       // [in] scan item to associate with.
        PVOID    pUserParam       // [in] value to associate.
    );
Parameters
hItem
[in] handle to a scan item object that is being referenced.
pUserParam
[in] Application defined value to associate with this object.
Return Values
Zero is returned to indicate success. −1 is returned to indicate error To
find
out the reason why this call failed called the ErrGet( ) function. This
function is thoroughly documented in the platform abstraction layer.
See Also
ScnItemCreate( ), ScnItemDestroy( ), ScnItemGetItemName( ),
ScnItemGetVirusName( ), ScnitemSetVirusName( ),
ScnItemGetActions( ), ScnItemSetAction( ), ScnItemSetUserParam( ),
ScnItemGetUserParam( )
ScnItemGetUserParam( )
Description
The ScnItemGetUserParam( ) function is used to retrieve any application
associated value with this object.
Prototype
int ScnItemGetUserParam(          // retrieve associated values.
        HVSCNITEM    hItem,       // [in] scan item to associate with.
        PVOID    * ppUserParam    // [out] pointer to associated item.
    );
Parameters
hItem
[in] handle to a scan item object that is being referenced.
ppUserParam
[out] Application defined value that was associated with this object.
Return Values
Zero is returned to indicate success. −1 is returned to indicate error To
find
out the reason why this call failed called the ErrGet( ) function. This
function is thoroughly documented in the platform abstraction layer.
See Also
ScnItemCreate( ), ScnItemDestroy( ), ScnItemGetItemName( ),
ScnItemGetVirusName( ), ScnItemSetVirusName( ),
ScnItemGetActions( ), ScnItemSetAction( ), ScnItemSetUserParam( ),
ScnItemGetUserParam( )
```

Figure 9:
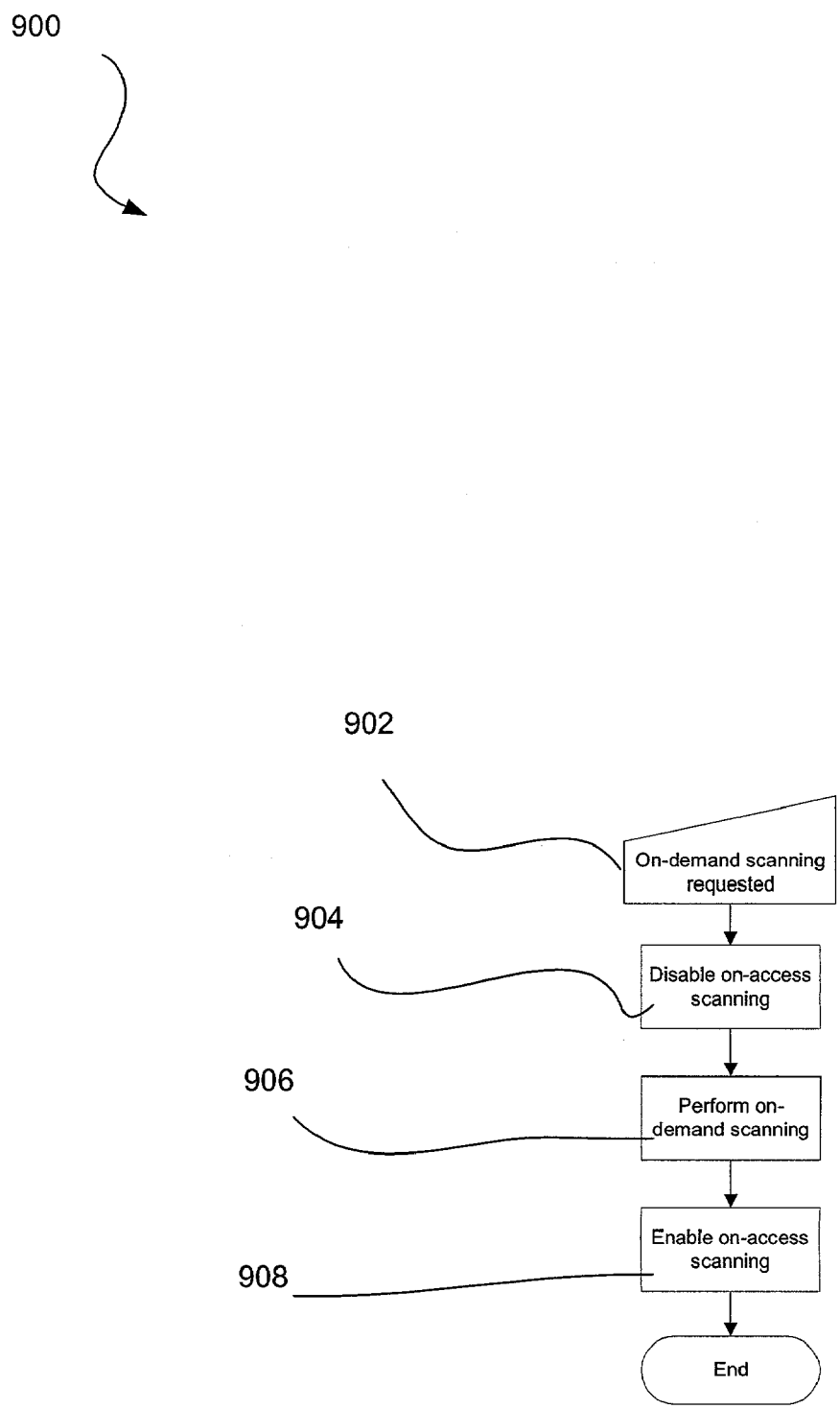
FIG. 9 illustrates the manner in which the on-access scanner is enabled and disabled during use based on on-demand scanning.

FIG. 9 illustrates the manner 900 in which the on-access scanner is enabled and disabled during use based on on-demand scanning. Upon on-demand scanning being requested in operation 902, on-access scanning is disabled in operation 904. Thus, on-demand scanning may be performed in operation 906.

Once the on-demand scanning is complete, the on-access scanning may be enabled in operation 908. By this design, the on-access scanning is disabled when on-demand scanning to preserve resources on the mobile wireless device. In the context of the foregoing interface, the OnAccEnable( ) command may be used to effect the enabling and disabling of the on-access scanning. More information on the on-demand scanning will be set forth hereinafter in greater detail.

Java Scanner (210 of FIG. 2)

Java Applet and Script Scanning

Figure 10:
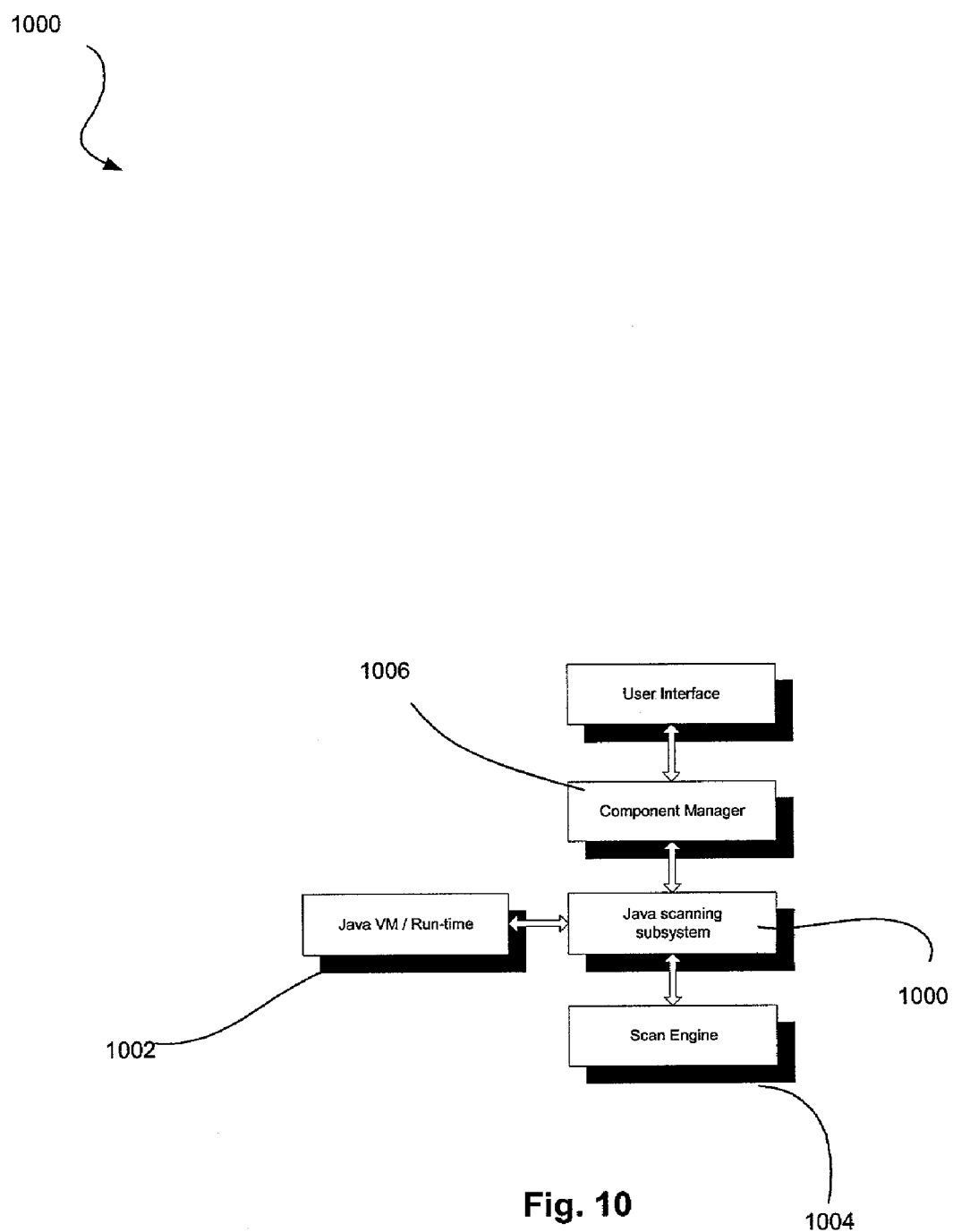
FIG. 10 illustrates a Java scanning module interfacing with Java, and filtering all Java applet and Java script executions.

To protect against malicious Java applets and Java scripts, the anti-malware scanner requires access to executable images and scripts through system provided APIs. The Java applet/script scanning subsystem resides parallel to on-access scanning and on-demand scanning subsystems and, as such, it is managed by the component manager. FIG. 10 illustrates the Java scanning module 1000 interfacing with the Java VM 1002 and filtering all Java applet and Java script executions. Every Java object that is about to be executed is passed to the scan engine 1004 that determines whether it is safe to execute the Java object. If the scan engine determines that it is not safe, the component manager 1006 may be notified and, based on established scan settings, some action may be done on it.

See Table 6 for an exemplary Java Scanner API.

TABLE 6

JavaInstallHook( )
Description
The JavaInstallHook( ) function installs a Java applet interpreter or a Java script interpreter hook. All I/O related events that occur within the Java interpreter are piped through this function.
Prototype
int JavaInstallHook(
    PFNJAVAHOOK   pAppCallback,
    void          * pUser,
    PFNJAVAHOOK   * ppPrevHook
    );
Parameters
pAppCallback
[in] application defined callback function that should be called for all Java events. See function definition for JavaHookFunc( ) for a detailed description.
pUser
[in] is a user defined data that is passed to the callback function so it can access its own initialized data.
pPrevHook
[out] pointer to a pointer to the previous Java interpreter hooking function. This is required so Java events can be chained. See function definition for JavaHookFunc( ) for a detailed description.
Return Values
A return value of zero should be returned for success or any other number to indicate an error condition.
See Also
JavaUninstaliHook( ), JavaHookFunc( )
JavauninstauHook( )
Description
The JavaUninstallHook( ) function removes a previously installed Java interpreter hook.
Prototype
int JavaUninstallHook(
    PFNJAVAHOOK   pAppCallback
    );
Parameters
pAppCallback
[in] application defined Java interpreter callback function that was installed. See function definition for JavaHookFunc( ) for a detailed description.
Return Values
A return value of zero should be returned for success or any other number to indicate an error condition.
See Also
JavaInstallHook( ), JavaHookFunc( )
JavaHookFunc( )
Descrintion
The JavaHookFunc( ) is an application defined function that the Java interpreter calls before a Java applet or a Java script is executed. This allows an application to analyze and allow or disallow the execution of the Java script. Because JavaHookFunc( ) is called before the execution occurs, the hooking function may most likely chain this event to the next caller in the list using the pPrevHook value that was returned during hook installation. In case the hooking function determines that further chaining of this event should not continue, it may return an error indicating this intent.

TABLE 6-continued

Prototype
int JavaHookFunc(
    PJAVAINTINFO   pInterpreterInfo,
    void         * pUserParam
    );
Parameters
[in] pInterpreterInfo
This is a Java interpreter dependent structure that contains all the necessary information needed by the Java interpreter to perform I/O related function. As an example of information that a hooking function could obtain from here are: Name of the Java object about to be accessed. Java interpreter specific function identifier that is being performed such as EXECUTE, CLOSE, Etc.
Any Java interpreter data that is required to complete the request.
As an example for an execute event there should be a buffer pointer to the Java applet or Java script that is about to be executed.
[in] pUserParam
This is the user defined value that was passed to JavaInstallHook( ) function. It is provided to this function with every call.
Return Values
A return value of zero indicates success and any other number to indicate an error condition. When an error is returned the Java interpreter should not process this event.
See Also
JavaInstallHook( ), JavaUninstallHook( )

On-Demand Scanner Module (208 of FIG. 2)

Figure 11:
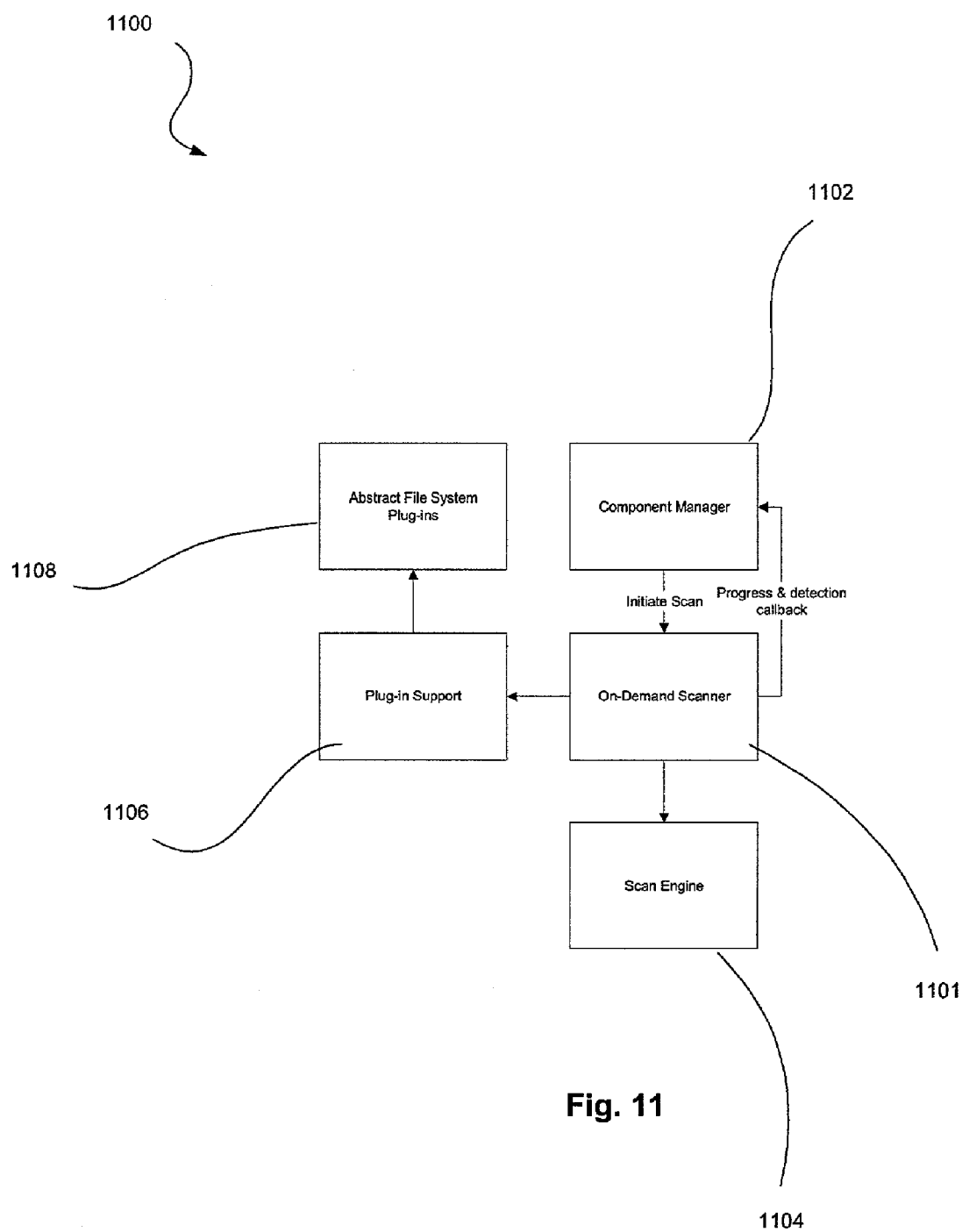
FIG. 11 illustrates an on-demand scanner system including an on-demand scanner interacting with a component manager and a scan engine.

FIG. 11 illustrates an on-demand scanner system 1100 including an on-demand scanner 1101 interacting with a component manager 1102 and a scan engine 1004. Further provided is plug-in support 1006 which interfaces a plurality of abstract file system plug-ins 1108.

The on-demand scanner 1101 is a component of the anti-malware scanner system responsible for scanning collections of data objects. The component manager 1102 initiates calls to the on-demand scanner 1101. The on-demand scanner 1101 makes use of the scan engine 1102 to detect and clean malware. It also makes use of plug-ins 1106, 1108 to determine if a given file can be interpreted as a directory. For example, a compress archive can be enumerated like a directory. The plug-ins 1108 may supply alternate translations to files for decompression, decryption, or other aspects of using the file.

The on-demand scanner 1101 recursively enumerates all data objects on the device from a given starting location. While scanning files, three callback functions are used: pScanFile, pScanDirectory, and pCleanFile. To use the on-demand scanner 1101, the caller must initialise an SE_SCANNER from the scan engine 1104 and the proper callback functions.

Figure 12:
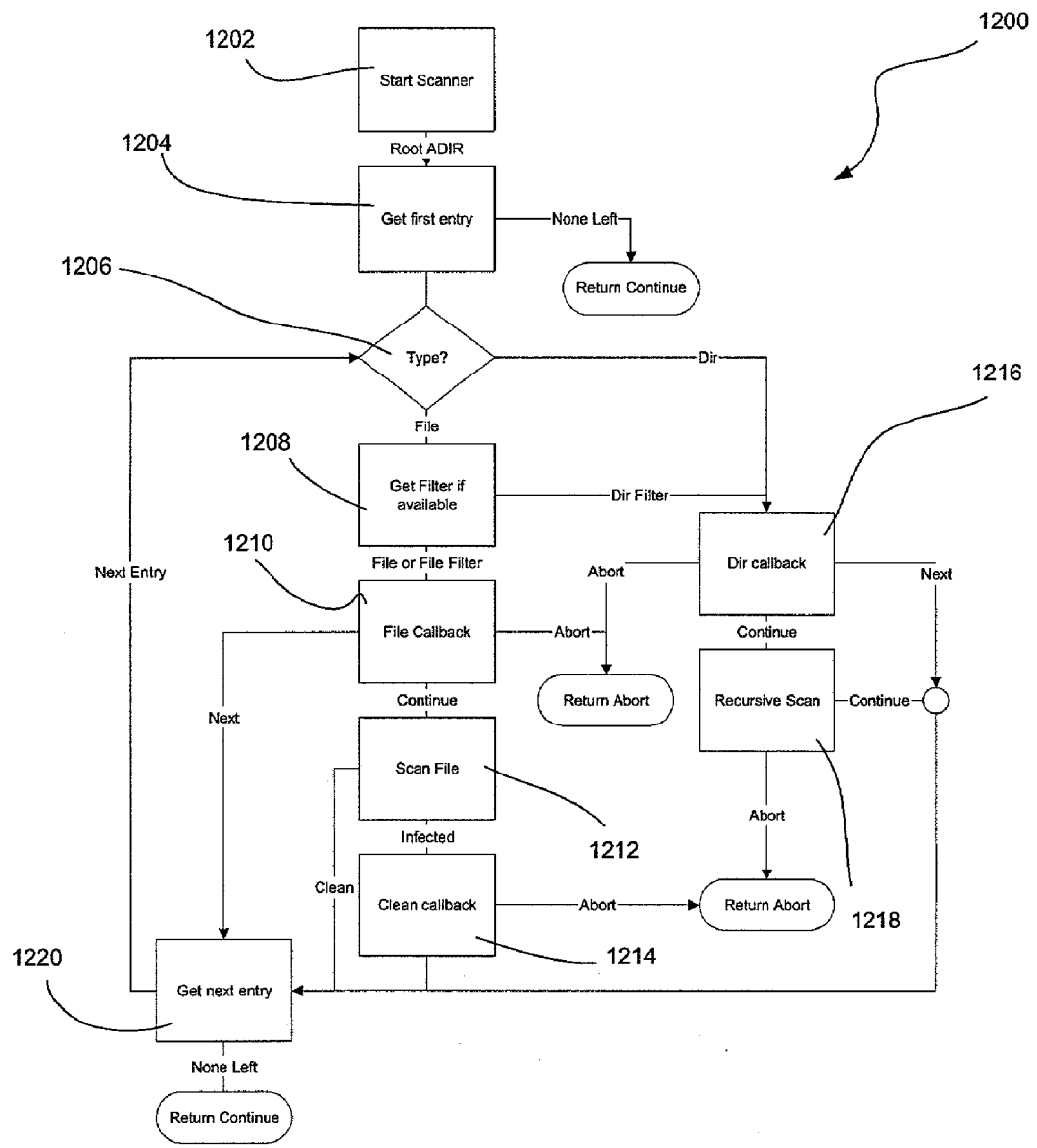
FIG. 12 illustrates a method for performing on-demand scanning, in accordance with one embodiment.

FIG. 12 illustrates a method 1200 for performing on-demand scanning, in accordance with one embodiment. As shown, the scanner is started in operation 1202, after which a first entry is identified in operation 1204. It is then determined whether the entry is of a file type or a directory type in decision 1206.

If the entry is of a file type, a filter is obtained in operation 1208, after which a file callback is executed in operation 1210. Based on the callback function, the file is then conditionally scanned in operation 1212. If the file is deemed infected, a clean callback is executed. See operation 1214.

If, on the other hand, the entry is of a directory type (see decision 1206), a directory callback is executed in operation 1216. Next, a recursive scan is executed in operation 1218. The foregoing method 1200 is continued until all of the entries are identified (see operation 1220).

On-Demand Scanner API

An exemplary API for carrying out the foregoing functionality is set forth in Table 7.

TABLE 7

SCAN_ACTION
Description
The SCAN_ACTION enumeration is used by callback functions to tell the
on-demand scanner what to do when the callback function returns.
CONTINUE_RECURSIVE_SCAN
Continue scanning. This is the most common return value for callback
functions.
ABORT_RECURSIVE_SCAN
Aborts the on-demand scanner immediately.
NEXT_RECURSIVE_SCAN
Skip the next item to be scanned. This may be used to skip files or
directories depending on the callback function that returns this value.
Prototype
typedef enum
{
    CONTINUE_RECURSIVE_SCAN,
    ABORT_RECURSIVE_SCAN,
    NEXT_RECURSIVE_SCAN
} SCAN_ACTION;
ODCreateScanner
Description
Create an on-demand scanner.
Prototype
HODS ODCreateScanner(HVSOPTS hOpts)
Parameters
hOpts
[in] This is a handle to the configuration options.
Return Value
The returned handle is used for setting callback functions and launching
the recursive scan. It must be destroyed when no longer needed with
ODDestroyScanner.
See Also
ODDestroyScanner( ), ODSetFileCallback( ), ODSetDirCallback( ),
ODSetCleanFileCallback( ).
ODDestroyScanner
Description
Destroys the given scanner. This must be called once the scanner is no
longer needed.
Prototype
int ODDestroyScanner(HODS hScanner)
Parameters
hScanner
[in] The scanner to destroy. All resources allocated for the scanner are
released.
Return Value
Returns 0 on success, otherwise −1 on error.
See Also
ODCreateScanner( )
ODSetScanFileCallback
Description
The pScanFileCallback( ) is called by the ODScanRecursiveDir( ) function
just before each file is scanned. The data pointer sent to ODSetScanFile-
Callback( ) is passed to the pScanFileCallback( ). This enables the
application to supply context information.
Prototype
void ODSetScanFileCallback(
    HODS *pScan,
    PSCANFILECALLBACK pScanFileCallback,
    void *pData
);
Parameters
pScan
[in] This is a pointer to the scan engine that may be used with the
ODScanRecursiveDir( ).
pScanFileCallback
[in] This is the callback function to be used by ODScanRecursiveDir( ).
pData
[in] This is a pointer to any data that is needed by pScanFileCallback.
See Also
ScanFileCallback( ), ODScanRecursiveDir( ).
ScanFileCallback
Description
This function is implemented by the ODScanRecursiveDir( ) caller. It is
used by ODScanRecursiveDir( ) to notify the caller when a file is about to TABLE 7-continued be scanned, and provides an opportunity to direct the scanner's behaviour.
Prototype
typedef SCAN_ACTION (*PSCANFILECALLBACK)(
    void *pData,
    FILEPATH *pFName
);
Parameters
pData
[in] This is the pointer that was supplied to ODSetScanFileCallback( ).
It can be used for whatever the callback function requires.
pFName
[in] The full path and file name is supplied in pFName.
Return Values
ScanFileCallback( ) must return one of the following:
CONTINUE_RECURSIVE_SCAN. This is the normal return value so
that the file may be scanned.
ABORT_RECURSIVE_SCAN. This is used to stop scanning entirely.
The given file is not scanned.
NEXT_RECURSIVE_SCAN. The given file is not scanned. The
recursive scan continues with the next file.
It is recommended that care be taken not to use much stack space in the
callback function. Some platforms have very limited stack space, and the
recursive scan requires a fair amount. Be aware that calls into system
GUI functions may cause a stack overflow.
One successful technique for handling this problem is to setup a timer.
The
callback function merely copies information for the timer to consume. The
timer event displays progress and interacts with the user using a separate
stack.
ODSetDirCallback
Description
The ScanDirCallback( ) is nearly identical to the ScanFileCallback( )
except for one detail. Instead of reporting files, it reports directories
before scanning them.
Prototype
void ODSetScanDirCallback(
    HODS hScan,
    PSCANDIRCALLBACK *pScanDirCallback,
    void *pData
);
Parameters
pScan
[in] This is a pointer to the scan engine that may be used with the
ODScanRecursiveDir( ).
pScanDirCallback
[in] This is the directory callback function to be used by ODScan-
RecursiveDir( ).
pData
[in] This is a pointer to any data that is needed by pScanDirCallback.
See Also
ODScanRecursiveDir( ), ScanDirCallback( ), ScanFileCallback( ),
ODSetScanFileCallback( ).
ScanDirCallback
Description
This function is implemented by the ODScanRecursiveDir( ) caller. It is
used by ODScanRecursiveDir( ) to notify the caller when a directory is
about to be scanned, and provides an opportunity to direct the scanner's
behavior.
Prototype
typedef SCAN_ACTION (*PSCANDIRCALLBACK)(
    void *pData,
    DIRPATH *pFName
);
Parameters
pData
[in] This is the pointer that was supplied to ODSetScanDirCallback( ).
It can be used for whatever the callback function requires.
pFName
[in] The full path is supplied in pFName.
Return Values
The return values are the same as pScanFileCallback( ).
See Also
pScanFileCallback( ), ODScanRecursiveDir( ),
ODSetScanDirCallback( ), ODSetScanFileCallback( )
ODSetCleanFileCallback
Description
The pCleanFileCallback( ) is called when malware is discovered by the
ODScanRecursiveDir( ) function. All the information necessary to call
SECleanFile( ) is supplied.

TABLE 7-continued

It is up the to the callback function to call SECleanFile( ) if needed. As
scanner state information is needed by the SECleanFile( ) function, it must
be called before continuing the recursive scan, or not at all. Storing the
scan_result_t id, and calling SECleanFile( ) after
returning from the callback may have unexpected results.
Prototype
void ODSetCleanFileCallback(
    HODS hScan,
    PCLEANFILECALLBACK pCleanFileCallback,
    void *pData
);
Parameters
pScan
[in] This is a pointer to the scan engine that may be used with the
ODScanRecursiveDir( ).
pCleanFileCallback
[in] This is the callback function to be used by ODScanRecursiveDir( ).
pData
[in] This is a pointer to any data that is needed by pCleanFileCallback.
See Also
ODScanRecursiveDir( ), CleanFileCallback( ), SECleanFile( ).
CleanFileCallback
Description
The CleanFileCallback( ) called when an infected file is discovered. The
callback function is responsible for deciding what must be done with the
malware, and executes the response. The response may be a call to
SECleanFile( ).
Prototype
typedef SCAN_ACTION (*PCLEANFILECALLBACK)(
    Void *pData,
    HODS hScan,
    FILEPATH *pFileName,
    scan_result_t id
);
Parameters
pData
[in] A pointer to the pData sent to ODSetCleanFileCallback( ).
pScan
[in] A pointer to the SCANNER that was used to detect the infected file.
pEnt
[in] A pointer to the directory entry of the file that is infected.
pFile
[in] A pointer to the file opened that is infected. The file is opened
for read/write access.
id
[in] This is the ID of the malware discovered. This can be used with
SEScanGetName( ) and SEScanGetVariant( ) to retrieve the name.
Return Values
The CleanFileCallback( ) may return
CONTINUE_RECURSIVE_SCAN or
ABORT_RECURSIVE_SCAN.
See Also
ODScanRecursiveDir( ), pScanDirCallback( ), pscanFileCallback( ),
ODSetScanFileCallback( ).
ODScanRecursiveDir
Description
Scan all the files in the given pADir, as well as recurs into subdirectories.
This is used for on-demand scanning.
Feedback is provided during the recursive scan through three callback
functions: ODScanFileCallback, ODScanDirCallback, and ODCleanFile-
Callback.
The ODScanFileCallback( ) is called just before the given file is scanned.
This provides the calling application an opportunity to track scan progress,
to skip files, and abort scanning.
The ODScanDirCallback( ) is called just before the given directory is
scanned. Just like the ODScanFileCallback( ), the application can track
progress, skip the directory, or abort scanning.
The ODCleanFileCallback( ) is only used when malware is detected. The
application then needs to choose the proper action. This may include
calling the SECleanFile( ) function. Any callback not set, or set to
NULL, is ignored.
Prototype
SCAN_ACTION ODScanRecursiveDir(HODS hScan, HDIR hDir);
Parameters
pScan
[in] This is a pointer to the SCANNER to use. Call SEScanOpen( )
to create a new SCANNER. The caller is responsible to calling
SEScanClose( ) once the ODScanRecursiveDir( ) is done.
pADir
[in] This is a pointer to the root directory to start the recursive scan.
Return Values
The SCAN_ACTION returned denotes how the function ended:
CONTINUE_RECURSIVE_SCAN or
ABORT_RECURSIVE_SCAN.
A return value of CONTINUE_RECURSIVE_SCAN indicates that it
successfully completed the scan. ABORT_RECURSIVE_SCAN
indicates that the scan was aborted.
Plug-in API
The on-demand scanner supports adding plug-ins for new abstract
directory and file types. This enables adding support for compressed
archives and other special file formats.
ODRegisterDirFilter
Description
The caller supplies a callback function for creating HDIR instances.
The callback function takes an HFILE and detects whether the HFILE can
be interpreted as an ADIR. The callback function must return an HDIR or
NULL.
Prototype
void ODRegisterDirFilter(
    PDIRFILTERCALLBACK pDirFilterCallback
);
Parameters
pDirFilter
[in] This is a pointer to a callback function to create the HDIR based
on an HFILE.
See Also
DirFilterCallback( )
DirFilterCallback
Description
This callback function is responsible for determining whether the given
pAFile can be represented as an ADIR. For example, compressed archives
may be treated as an ADIR so that the contents can be enumerated and
scanned.
Prototype
HDIR DirFilterCallback(
    HFILE hFile
);
Parameters
hFile
[in] A valid HFILE opened for reading.
Return Values
The callback must return NULL if it is not able to use the provided hFile.
Otherwise, it returns a valid HDIR implementation for the pAFile. The
callback can rely in the hFile to continue to be open for the life of the
returned HDIR.
See Also
ODRegisterADirCallback( )
ODRegisterFileFilter
Description
The caller supplies a callback function for creating AFILE instances. The
callback function takes an hFile and detects whether it is supported. If
supported, the callback function returns a new HFILE. Otherwise, NULL.
Prototype
void ODRegisterFileFilter(
    PFILEFILTERCALLBACK pFileFilterCallback
);
Parameters
pFileFilterCallback
[in] The callback function to create an HFILE filter.
See Also
FileFilterCallback( )
FileFilterCallback
Description
This callback function is used to determine if this filter supports the given
hFile. If the hFile is supported, this function creates an HFILE interface
to wrap the hFile.
Prototype
HFILE (*PFILEFILTERCALLBACK)(HFILE hFile)
Parameters
hFile
[in] Provided is an HFILE opened for reading. It may remain open for
the duration of the returned HFILE from this function.
Return Value
Returns NULL if the given hFile is not supported. Otherwise, it creates an
HFILE interface, and returns that.
See Also
ODRegisterFileFilter( )
ODOpenDirFilter

TABLE 7-continued

Description
Looks for an HDIR interface for the given HFILE.
Prototype
HDIR *ODOpenDirFilter(HFILE hFile);
Parameters
hFile
[in] An HFILE opened for reading.
Return Values
Returns an HDIR. The hFile must remain available for the returned HDIR
to use in accessing the file. The caller is responsible for releasing
both the HDIR and hFile. Note that the caller must not release the
hFile until after releasing the returned HDIR.
Returns NULL if no HDIR filter is available.
ODOpenFileFilter
Description
Looks for an alternate HFILE interface for the given HFILE.
Prototype
HFILE ODOpenAFileFilter(HFILE hFile, AFILE_MODE mode);
Parameters
hFile
[in] The HFILE to use with the filter.
mode
[in] This is the read/write mode to use when the file is created.
This should be compatible with the hFile's mode.
Return Values
The supplied hFile must remain available for the returned HFILE to
access. The caller is responsible for releasing both the returned
HFILE and supplied hFile. Note that the caller must not release the
hFile until after releasing the returned HFILE.
Returns NULL if no HFILE filter is available.

Scan Engine (216 of FIG. 2)

Figure 13:
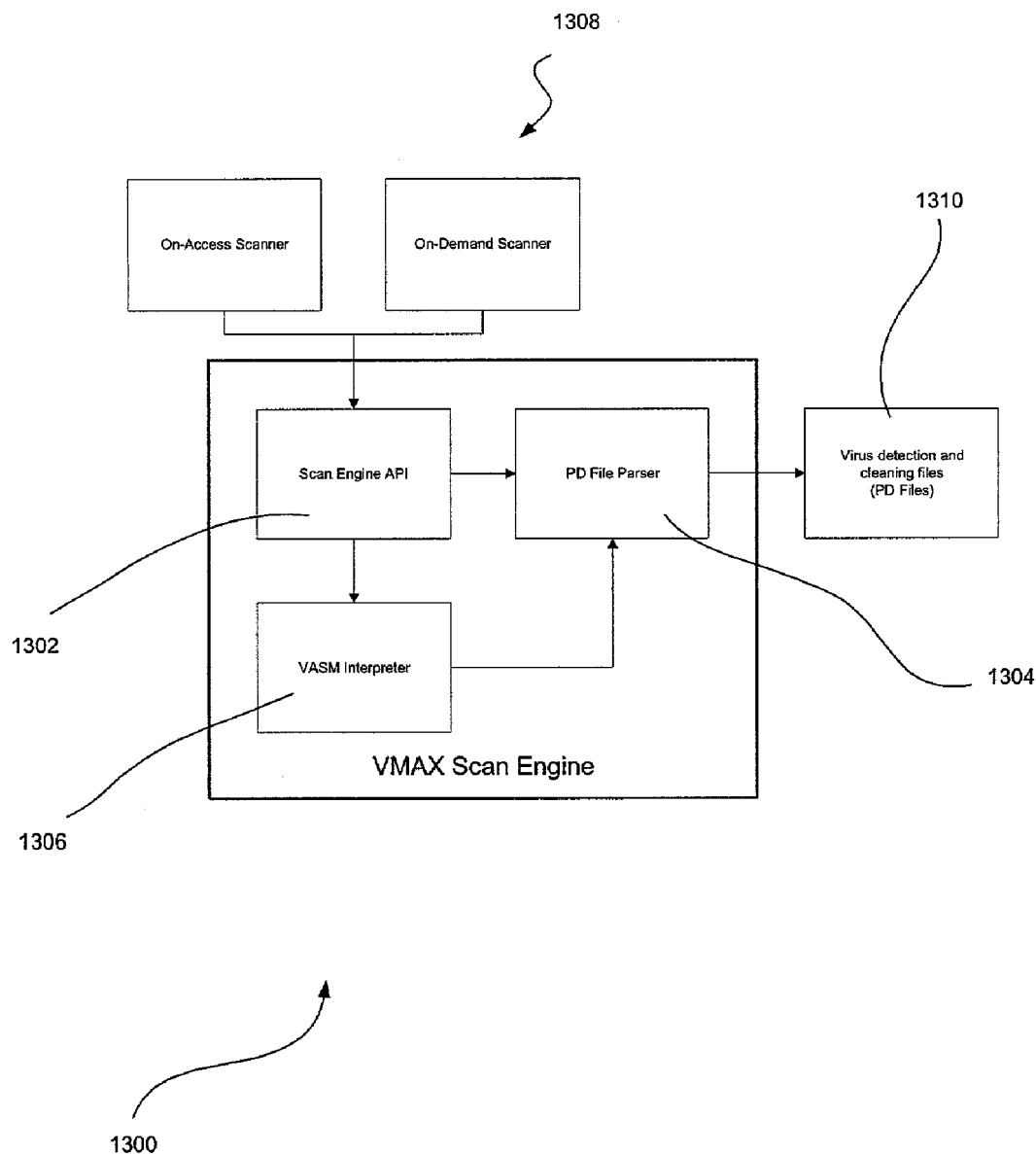
FIG. 13 illustrates a scan engine system including a scan engine module, a file parser, and an interpreter.

FIG. 13 illustrates a scan engine system 1300 including a scan engine module 1302, a file parser 1304, and an interpreter 1306. The scan engine system 1300 interfaces the on-access and on-demand scanner modules 1308 to carry out virus detection and clean files. See operation 1310.

The scan engine system 1300 is responsible for scanning individual data objects for malware and to repair infected documents. Potentially infected data is presented to the scan engine system 1300 from the on-access and on-demand scanner modules 1308. It is built to be system independent, and thus has an abstraction for data objects that can be scanned and cleaned.

Scan Engine API

The purpose of the scanner API is to enable the on-demand and on-access scanner modules 1308 to initiate detection and cleaning of malware in a given data object. This involves providing the necessary detection and cleaning files as well as providing data objects to scan.

An abstract file system is used to make the scan engine system 1300 portable to new devices and enable scanning of many different data objects. More information about ADIR, ADIRENT, and AFILE data objects of the abstract file system will be set forth hereinafter in greater detail.

Table 8 illustrates an exemplary scan engine API.

TABLE 8

SEOpenScanner
Description
Create an instance of the scanner. The scanner is initialized with files
found in the provided pADir. As the scanner doesn't know how to parse
file names (being ASCII and Unicode agnostic), the ADIR must filter out
any non-PD files.
Prototype
SCANNER *SEOpenScanner(HDIR hDir);
Parameters
hDir
[in] The supplied HDIR must enumerate only the PD files that are to
be used by the scanner.
Return Value
The function return is an initialized SCANNER data structure. The
contents of the SCANNER data structure are internal to the scan engine
implementation.
See Also
SECloseScanner( )
SECloseScanner
Description
When done using the scanner, it must be closed. This releases any
resources that were used by the scanner.
Prototype
void SECloseScanner (SCANNER *pScan);
Parameters
pScan
[in] pScan is the scanner to close.
See Also
SEOpenScanner( )
SEScanFile
Description
Scan the given file for malware. The return value may usually be −1
for no malware detected. Otherwise, SEScanFile returns an identifier
for the discovered malware.
The returned ID is used with the SECleanFile( ), SEGetScanName( ),
and SEGetScanVariant( ) functions. The ID doesn't completely
identify the malware as the scanner state holds information about
what was discovered.
Prototype
scan_result_t SEScanFile(
    SCANNER *pScan
    FILEPATH *pFileName,
    HFILE hFile);
Parameters
pScan
[in] pScan is the scanner to use.
pFileName
[in] The name of the file being scanned.
hFile
[in] The file opened for read access. The hFile may be a specialized
interface for reading this type of file.
Return Value
The returned scan_result_t is an identifier for the malware detected. If
malware is not detected, then the return value is −1.
See Also
SECleanFile( ), SEGetScanName( ), SEGetScanVariant( ).
SECleanFile
Description
Attempt to repair the given infected file. This can only be called after
SEScanFile( ) to identify malware. The clean function may include
deleting the file.
Prototype
int SECleanFile(
    SCANNER *pScan,
    FILEPATH *pFileName,
    AFILE *pFile,
    scan_result_t id)
Parameters
pScan
[in] pScan is the scanner to use.
pFileName
[in] The file name of the file being scanned.
hFile
[in] The file opened for read access.
Return Values
On success, SECleanFile returns Otherwise, it returns −1.
See Also
SEScanFile( ).
SEScanGetName
Description
Returns the base name of the malware detected. The returned name
may change in subsequent calls to SEScanFile( ).
Prototype
char *SEScanGetName(SCANNER *pScan, scan_result_t id)
Parameters
pScan
[in] The scan engine used with SEScanFile( ).
id
[in] The returned ID from SEScanFile( ).
Return Values

TABLE 8-continued

Returns a UTF-8 encoded, zero terminated string. The string is the base
name of the malware detected. If no name is available, NULL is returned.
See Also
SEScanGetVariant( ), SEScanFile( ).
SEScanGetVariant
Description
Returns the variant of the malware detected. Normally this is concatenated
with the base name to form the full name of the malware.
Prototype
char *SEScanGetVariant(SCANNER *pScan, scan_result_t id)
Parameters
pScan
[in] The scan engine used with SEScanFile( ).
id
[in] The returned ID from SEScanFile( ).
Return Values
Returns a UTF-8 encoded, zero terminated string. The string is the
extended name of the malware detected. Concatenate this to the end of
the base name to get the complete name. If no name is available,
NULL is returned.
See Also
SEScanGetName( ), SEScanFile( ).

PD File Format

The purpose of this file is to provide the necessary information to detect and clean malware on handheld devices.

The PD file is composed of a header and a collection of records. The header provides general information about the use and management of the PD file. The records contain details about scanning and cleaning malware.

One of the design considerations is that 2-byte entries is desired to be 2-byte aligned, and 4-byte entries to be 4-byte aligned. This resolves some portability issues to processors that can't or have difficulty accessing non-aligned memory references. Note that aligned 4-byte values are not enforced with the instruction byte-code unless the target platform requires it.

Other than keeping the scan engine small, one may also want to support incremental updates for the PD file. One goal is to keep file transfers to the PD devices small.

The following capabilities of Table 9 may be required.

TABLE 9

After the file header, the rest of the file is a list of
records
New records can be added to the end of the file
Records can be marked as free
Free records can be re-used for new records
Neighboring free records are merged to create a larger
free record
A record may be moved in memory when updating the contents
of that record
It's possible that all records may be moved when de-
fragmenting the file
Avoid re-encrypting the entire file because of a small
change
An updated checksum needs to be supplied with patches to
verify the update File Header Table 10 illustrates an exemplary file header.

TABLE 10

| Bytes | Description |
|---|---|
| 48 | Copyright notice, end with CTRL + Z |
| 2 | Header size |
| 2 | Target platform identifier |
| 2 | Scan class identifier |
| 2 | Reserved. (To be determined - used as 4-byte alignment padding) |
| 4 | File version number (major, minor, revision, build) |
| 4 | File format version number |
| 4 | Date of creation |
| 4 | Date of last incremental update |
| 4 | Checksum of contents |
| 4 | Encryption seed |
| 4 | First scan record offset |
| 4 | First check record offset |
| 4 | First clean record offset |
| 4 | First free record offset |

Header Size

This is used for future expansion. One can add new information to the header without breaking compatibility with older scan engines. This may never actually be used. Byte order for this value is target platform dependant.

Target Platform Identifier

To simplify parsing the PD file on the target machine, the PD file is formatted for the target. The target platform identifier denotes which type of target the file is intended. From this, the following information of Table 11 can be deduced.

TABLE 11

Big-endian or little endian byte order
Text encoding format
Byte alignment

The only defined combination is the following set forth in Table 12.

TABLE 12

Little endian byte order
UTF-8 text encoding
2-byte values are 2 byte aligned, 4 byte values are
4-byte aligned The definition of Table 12 is used for the target platforms of Table 13.

TABLE 13

Windows variants on IA-32 processors
Linux on IA-32 processors
Symbian EPOC on ARM processors Scan Class Identifier The scan class identifier is a value for identifying what class of data the PD file is designed to scan. The following classes of Table 14 are identified at this time.

TABLE 14

| Value | Description |
|---|---|
| 1 | File system |
| 2 | Process |
| 3 | Data stream |

Record Header

The records have a common layout to make incremental update simple and aide in finding records without making the scan engine large. An update would send only those records that need to be deleted, replaced, or added. See Table 15.

TABLE 15

| Offset | Bytes | Description |
| --- | --- | --- |
| 0 | 2 | Record length (N) |
| 2 | 2 | Record type (Scan, name, check, clean, or free) |
| 4 | 4 | Record identifier |
| 8 | 4 | Address of next record of this type (0 if end of list) |
| 12 | | Record data |
| | 0–3 | Pad record out to 4-byte align |

Instead of referencing parts of the file by address, the PD file uses record ID's. This makes it possible to move a record without having to change every reference to the record.

The record header uses addresses to create a linked list of each type of record. This may help improve performance in finding the proper record. Eventually this could be used to sort records by record ID.

Record lengths are only 2-byte values. This is intentional to make porting between 16-bit processors simple. For example, a mobile wireless device such as a Palm® Pilot™ uses a database instead of a file system. Each record can be at most 64 KB. Nearly all scan functions may be very small. As they get larger, new instructions should be added to the language to move the functionality into the scan engine.

It may be interesting to apply a simple Huffman compression algorithm to the PD byte codes on a record-by-record basis.

Scan Records

This record contains a function for doing an initial scan of the selected file. The amount of code needed for this scan may exceed 64 KB (the maximum record size). Thus, the first scan record starts the process, but may reference other scan records. One goal is to keep the initial scan record small, yet able to eliminate 80% of the clean files. This keeps the scan engine's memory footprint small as well as making efficient use of the processor.

If malware is discovered, the scan function may return the record ID of the name record for this item. This table entry may provide the proper check function to verify the malware variant present. Though this does a double reference, it may not be important. Most of the time is spent eliminating files so that this step may be rare.

Check Records

Check records contain functions for identifying the specific malware variant once identified by the scan records.

The check record starts with the following header information in Table 16.

TABLE 16

| Offset | Bytes | Description |
| --- | --- | --- |
| 0 | 4 | Record ID of the clean function to call (or 0 if none) |
| 4 | 2 | Number of bytes in name section (N) |
| 6 | 1 | Number of names provided |
| 7 | 1 | Length of malware name, (N0) |
| 8 | N0 | Text name of the malware |
| | 1 | Length of variant name (N1) |
| | N1 | Text name of the variant |
| | | . . . (Repeat for k variants) |

TABLE 16-continued

| Offset | Bytes | Description |
| --- | --- | --- |
| | 1 | Length of variant name (Nk) |
| | Nk | Text name of the variant |
| | 0–1 | Pad record out to 2-byte align length |
| N + 4 | | Instructions for the check function |

If no variants are detected, then ~0 is returned. Otherwise, the index for the variant is returned. A 0 is used if the generic malware detection suffices.

It should be noted that many different check functions can be merged into a single record to reduce the file size if they are sufficiently similar. However, this can cause trouble for incremental updates.

Clean Records

A clean record contains a function for removing the malware and repairing files if possible.

It should be noted that multiple detected malware may use the same clean function.

Free Records

When a record is deleted, it is merged with other free records or added to the free record list. This allows the system to re-use space when performing incremental updates. It solves the problem of re-writing the entire file just because a portion was modified.

Replacing a record is the same as deleting the original, and then adding a new record in its place.

Free records may be set to zero to make predicting the checksum easier.

Activity Logging Module (214 of FIG. 2)

The activity logging subsystem is responsible for recording significant events to be collected at the back-end for analysis. This aids in providing information from the field to track outbreaks, detect and diagnose issues, and help determine how to improve the product.

The following are logged events in Table 17.

TABLE 17

| |
| --- |
| Error conditions and warnings |
| Detection of malware |
| Infected file name and path |
| Malware name and variant |
| Response to malware |
| File name and path |
| Action taken |
| Starting and stopping of services |
| On-demand scan |
| On-access scanner |
| Virus scanner application |
| Service agent upgrades |

The detection of and response to malware is separated. Detection is logged immediately when the malware it detected. Once the action is taken and successfully completed, the response is logged. If anything were to go wrong with the response, one would at least see the detection entry.

Adding log file entries is supported at two levels. The most common are functions that handle specific logging needs. These require all the necessary information and add them to the log file with the minimum effort from the programmer. The lower layer manages the log file rotation and a generic mechanism for adding entries.

Configuration

The activity log requires the following configuration values in Table 18.

TABLE 18

Log file rotation size
Log file maximum size
Log trace messages (yes/no)

A single log file is used until is reaches the log file rotation size. At which point, it is renamed and a new log file is started. Once the total space used by all of the log files exceeds the maximum, the oldest log file is removed. As log files are uploaded from the device, they are deleted from the device.

The log file location and naming conventions are configured per platform when the program is compiled.

Requirements

See Table 19 for possible requirements.

TABLE 19

It must be reasonable to translate the log file to multiple languages.
Limit the log file size to a reasonable (configurable) maximum
Scroll log file entries as the log file becomes too large (?)
Track time and date of log entries
Available to the service agent for transmission to the back-end
Once transferred, the log file may be truncated.
It must be resilient to system crashes
Output in a simplified, structured XML format with header for ASCII or UNICODE encoding
Enforce log file structure and completeness if information presented
Ability to detect when log files have been lost due to exceeding the maximum log file size.

Table 20 illustrates an exemplary interface associated with the activity logging module.

TABLE 20

High level API
LogOpen
Description
Open the log file for reading.
Prototype
HLOG LogOpen(HVSOPTS opts);
Parameters
opts
[in] A handle to the configuration options manager.
Return Value
Returns a handle to the log file. It is needed for all of the log functions.
If reading the log file, call LogTruncate( ) after the last log file that is successfully transferred from the device. Call LogClose( ) when the log file is no longer being used. If LogTruncate( ) is not called, then the entries may be read the next time LogOpen( ) is called.
LogClose
Description
Closes the log file. This de-allocates all resources related to using the log file.
Prototype
void LogClose(HLOG log)
Parameters
log
[in] The log file to close.
LogMessage
Description
Adds a message entry into the log file. The type of message is based on LOG_MESSAGE_TYPE.
LOG_TRACE is used to help diagnose problems by logging certain milestones in the program. Normally, trace messages are not added into the log file unless configured.
LOG_WARNING is provided when a problem is encountered, but

TABLE 20-continued does not prevent the proper operation of the program.
LOG_ERROR should be used when a recoverable error is encountered. Some functionality of the program may be hindered.
LOG_FATAL should only be used when the error is severe, non-recoverable, or prevents the program from running. This may be useful in a post-mortem analysis if the device is returned.
Note that the messages are intended for diagnosing field errors by the anti-malware scanner software engineers, and not intended for administrators to understand. Thus, these messages can be in English.
Prototype
typedef enum {
    LOG_TRACE,
    LOG_WARNING,
    LOG_ERROR,
    LOG_FATAL
} LOG_MESSAGE_TYPE;
void LogMessage(HLOG log LOG_MESSAGE_TYPE type, VSWSTATUS status,
    char *pMessage)
Parameters
log
[in] This is a handle for the log file.
type
[in] The type of message being logged.
status
[in] This is the status code associated with the message. For non-English speaking countries, this may be used to display the error message in the native language.
pMessage
[in] A UTF-8 encoded, zero terminated string. This is used for extra information our engineers can use to diagnose problems.
LogMalwareDetect
Description
This must be called as soon as malware is detected. The file path must be converted into UTC-8 as a zero terminated string. The scan engine provides malware names and variant names in UTC-8.
Prototype
void LogMalwareDetect(
    HLOG log,
    FILEPATH *pFilePath,
    char *pMalwareName,
    char *pMalwareVariant
)
Parameters
log
[in] A handle to the log file.
pFilePath
[in] This specifies a full description of the infected data object. In a file system, this is the file path. In a database, it uniquely identifies the record. Etc.
pMalwareName
[in] This is the malware name as returned by SEGetScanName( ).
pMalwareVariant
[in] This is the malware variant as returned by SEGetScanVariant( ).
LogMalwareAction
Description
This must be called once an action to the detected malware is completed. A log entry should also be provided even for ignoring the malware. If the action does not successfully complete, a warning or error message should be added instead.
The path provided must be converted to UTC-8. Note that 7-bit clean ASCII text is a subset of the UTC-8 specification.
Prototype
typedef enum {
    LOG_CLEAN,
    LOG_DELETE,
    LOG_QUARANTEEN,
    LOG_IGNORE,
} LOG_ACTION;
void LogMalwareAction(HLOG log, FILEPATH *pPath, LOG_ACTION action)
Parameters
log
[in] A handle to the log file.
pPath
[in] This is a UTF-8 encoded, zero terminated string. It provides the full path description of the data object identified. This should be the same string as sent to LogMalwareDetect( ).
action

TABLE 20-continued

[in] The action that was successfully completed on the infected data object.
LogServiceEvent
Description
This is used to track when services are started and stopped. Tracking these events can help diagnose problems in the field. For example, log entries on starting the application without it being stopped may denote that it crashed and was restarted. One can also detect whether the on-access scanner is being disabled and whether the on-demand scanner is being used regularly.
More specific milestones should be tracked with the LOG_TRACE messages through the LogMessage( ) function. Unlike the LOG_TRACE messages, the service events are always available in the log file.
Prototype
typedef enum {
    LOG_START_SERVICE,
    LOG_STOP_SERVICE,
} LOG_EVENT
typedef enum {
    LOG_APPLICATION,
    LOG_ON_DEMAND,
    LOG_ON_ACCESS,
    LOG_AGENT,
    LOG_INSTALL
} LOG_SERVICE;
void LogServiceEvent(HLOG log, LOG_EVENT event, LOG_SERVICE service)
Parameters
log
[in] A handle to the log file.
event
[in] Specify whether the service is starting or was stopped.
service
[in] Specify which service.
Low level API
The low level API manages the log file rotation and adding generic entries to the log file. This interface is agnostic to what data is added to the log file. The high level API is implemented based on these functions.
The first group is for adding entries to the log file.
LogOpenEntry
LogEntryField
LogCloseEntry
The above functions are used to create new high-level API functions that are consistent with the subset of XML that is supported. Be careful to define all English words that are used as keywords. This way they can be parsed and translated easily to different languages. This ensures that the raw log file is human readable, though in English, but is easy to also view in any other language.
The next group of functions is for consuming log file entries:
LogOpen
LogRead
LogTruncate
LogClose
LogOpenEntry
Description
Open a new log entry. Each entry is automatically stamped with the time and date.
Prototype
HLOGENTRY LogOpenEntry(
    HLOG log,
    char *pEntryName)
Parameters
pEntryName
[in] The name that may be used for this entry. This is placed in the log file as follows:
    <entry-name>
    [ fields ]
    </entry-name>
Where entry-name is replaced with pEntryName.
Return Value
A handle to the log entry is supplied, or NULL on error.
See Also
LogEntryField( ), LogCloseEntry( )
LogEntryField
Description
Add a field to the given log entry. The field name and value are provided to help structure the log entry. This is useful for generating different tables of information in the log file.
Prototype
int LogEntryField(
    HLOGENTRY hLogEntry,
    char *pFieldName,
    char *pFieldValue);
Parameters
pLogEntry
[in] This is a handle to the log entry to add the field.
pFieldName
[in] This is a UTC-8 encoded string for the field-value. It is used as in <field-name>field-value</field-name>
pFieldValue
[in] This is a UTC-8 encoded string used as the field-value.
Return Value
The LogEntryField( ) function returns 1 on success, or 0 if it failed to add the entry.
LogCloseEntry
Description
Close the log entry. No more fields may be added to the entry.
Prototype
void LogCloseEntry(HLOGENTRY hEntry);
Parameters
hEntry
[in] The log entry to close.
LogRead
Description
Read an entry from the log file.
Prototype
char *LogRead(HLOG log)
Parameters
log
[in] The log file being read.
Return Value
The returned value a UTF-8 encoded, zero terminated string for the XML entry. It is autonomous in the sense that the caller can stop reading at any time and have a valid XML file from what was read.
The returned string is only valid until the next call to LogRead( ). At which point, it may be overwritten with the next entry or de-allocated. A call to LogClose( ) also invalidates the string.
NULL is returned if there are no more log entries.
LogTruncate
Descrirtion
Remove all entries that were read from the log. This should be used once the log entries are confirmed transferred off of the device.
Prototype
void LogTruncate(HLOG log);
Parameters
log
[in] A handle to the log file.

File Format

The file format may be based on XML. There is a common form that is supported by the low-level API. This is described as follows. Then below, specifics for each type of logged event are provided as well.

Each log file is numbered sequentially. This enables sorting and merging log files, as well as detecting when log files are missing. See Table 21.

TABLE 21

For UNICODE
<?xml version="1.0" encoding="ISO-10646"?>
For ASCII
<?xml version="1.0" encoding="ISO-8859-1"?>
Then the rest:
<log id=log_id>
<entry-name date="time-date-stamp">
<field-name> value </field-name>
. . .
</entry-name>
. . .

The strings entry-name and field-name are replaced with the actual entry and field names. The time-date-stamp is the time at which the entry is added to the log file. This is encoded as YYYYMMDDhhmmss, where YYYY is the year, MM is the month, DD is the day of the month, hh is the hour, mm is the minutes, and ss is the seconds.

A sample LogMessage object is shown in Table 22.

TABLE 22

```
<event date="YYYYMMDDhhmmss">
<type>message-type</type>
<message>message-body</message>
</event>
message_type is one of trace, warning, error, or fatal.
message_body is the text string provided for the message.
```

A sample LogMalwareDetect object is shown in Table 23.

TABLE 23

```
LogMalwareDetect
<detect date="YYYYMMDDhhmmss">
<path>file-path</path>
<name>malware-name</name>
<variant>malware-variant</variant>
</detect>
file-path is a string identifying where the infected item was found.
malware-name is the name of the detected infection
malware-variant is the verified variant name of the infection
LogMalwareAction
<action date="YYYYMMDDhhmmss">
<path>file-path</path>
<action>scanner-action</action>
</action>
scanner-action is one of "clean", "delete", "quarantine", "ingore".
```

A LogServiceEvent is shown in Table 24.

TABLE 24

```
<service date="YYYYMMDDhhmmss">
<name>service-name</name>
<action>service-action</action>
</service>
service-name is the name of the service: "on-demand", "on-access",
"application", "agent", "installer".
service-action the word "start" or "stop".
```

Service Agent

Figure 14:
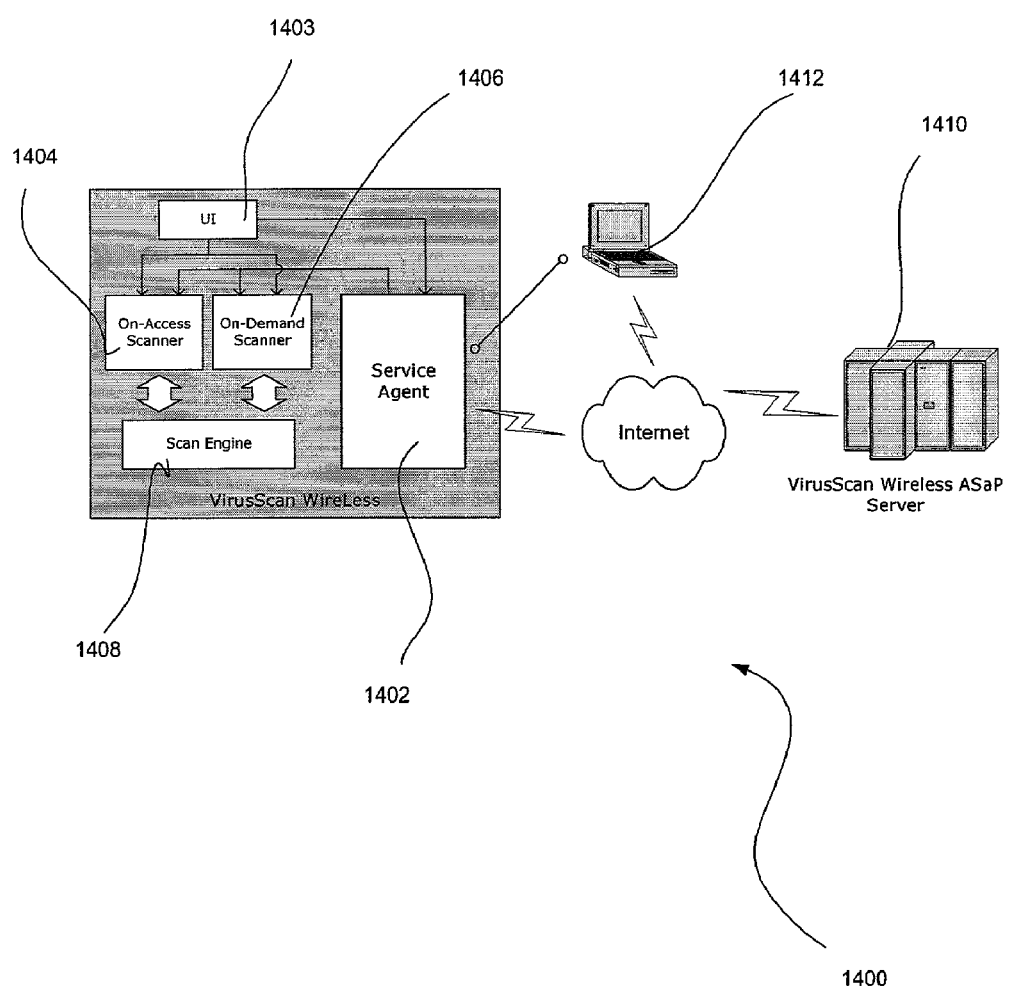
FIG. 14 illustrates a service agent (SA) architecture, in accordance with one embodiment.

FIG. 14 illustrates a service agent (SA) architecture 1400, in accordance with one embodiment. As shown, a service agent 1402 interfaces with an user interface 1403, an on-access scanner module 1404, and an on-demand scanner module 1406. Such on-access scanner module 1404 and on-demand scanner module 1406, in turn, interface a scan engine 1408.

In use, the service agent 1402 communicates with the back-end architecture 1410 which may be controlled and monitored via a web-interface 1412. The service agent 1402 is thus responsible for communicating with the back-end architecture 1410. It handles delivering device-specific information such as log data to a remote back-end architecture 1410. The second responsibility is in retrieving the anti-malware scanner component installation and package updates. The component manager initiates service agent updates. This may be due to scheduled updates or by user initiated updates.

Figure 15:
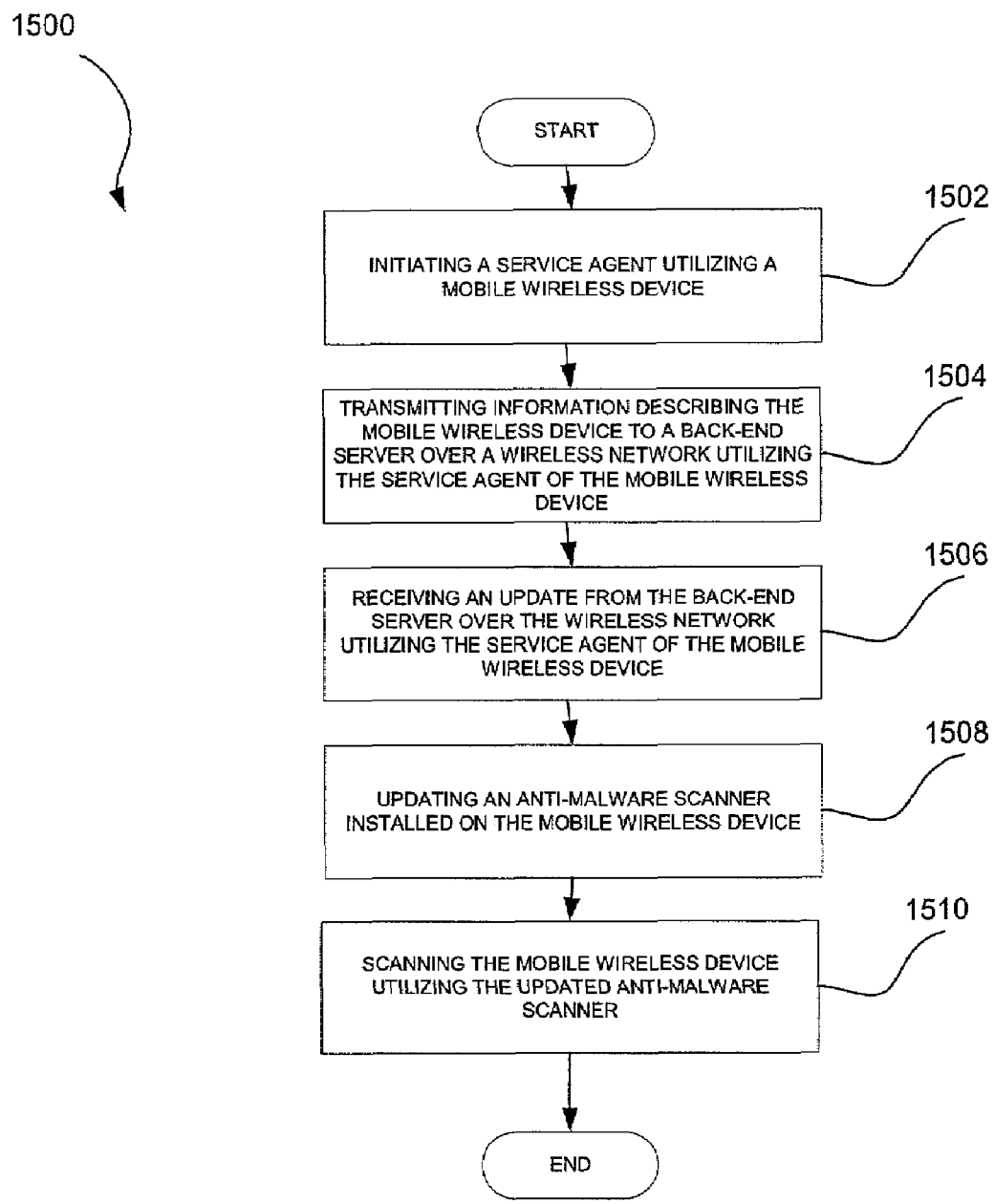
FIG. 15 illustrates a method for scanning a mobile wireless device for malware, involving service agents.

FIG. 15 illustrates a method 1500 for scanning a mobile wireless device for malware. Initially, in operation 1502, a service agent 1402 is initiated utilizing a mobile wireless device. In one embodiment, the service agent may be initiated by a user interface of the mobile wireless device. Further, the service agent may be initiated by the anti-malware scanner of the mobile wireless device. Still yet, the service agent may be initiated by a daemon of the mobile wireless device. As an option, the service agent may be initiated by a scheduler of the mobile wireless device or a trigger.

Next, in operation 1504, information describing the mobile wireless device is transmitted to a back-end server over a wireless network utilizing the service agent of the mobile wireless device. In one embodiment, the information describing the mobile wireless may include log data. Such log data may be specific to the mobile wireless device.

In operation 1506, an update is then received from the back-end server over the wireless network utilizing the service agent of the mobile wireless device. Optionally, the update may be wrapped. Further, the update may include a header and a plurality of parts. Such parts may include a part-header section and a part-data section.

Subsequently, in operation 1508, an anti-malware scanner installed on the mobile wireless device is updated so that the mobile wireless device may be scanned utilizing the updated anti-malware scanner. More information regarding the foregoing architecture 1400 and associated method 1500 will now be set forth.

Agent Activation Scenarios

Figure 16:
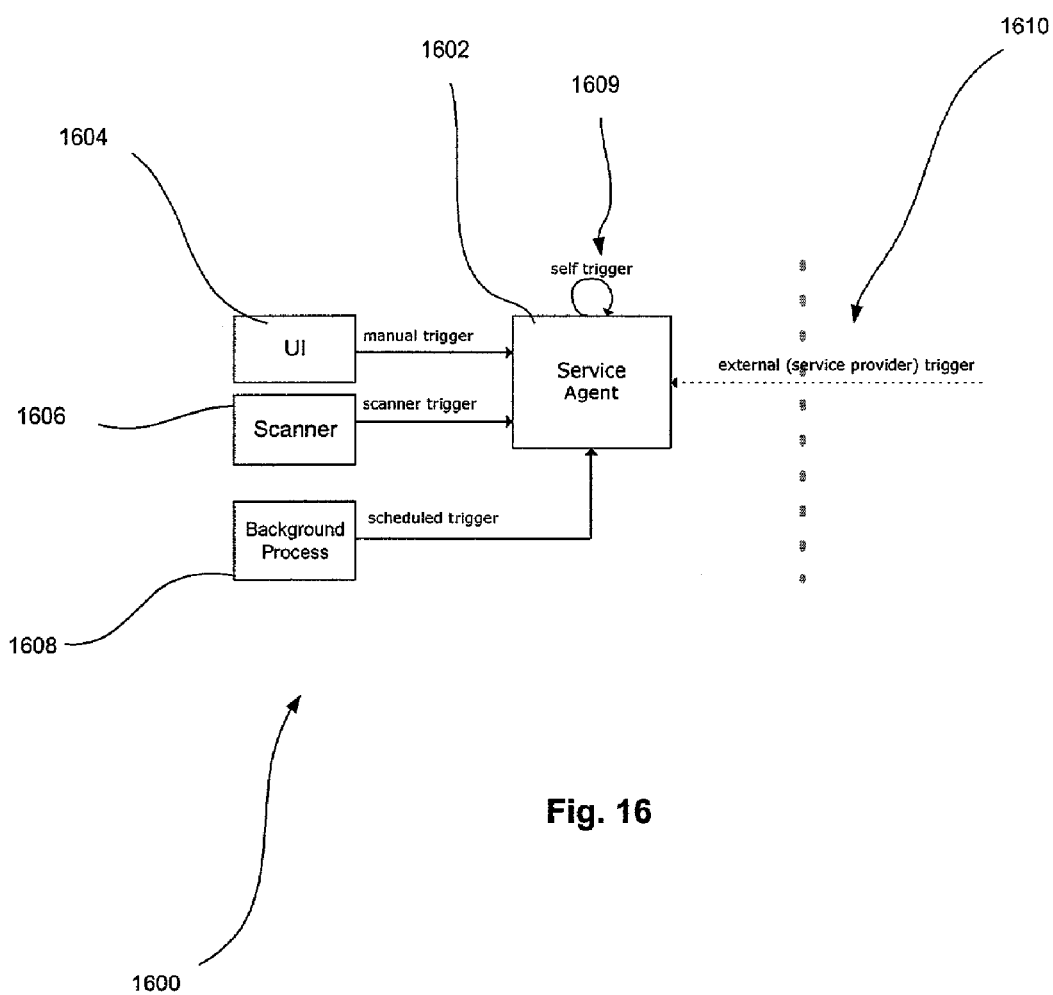
FIG. 16 illustrates a sample service agent activation method, in accordance with one embodiment.

FIG. 16 illustrates a sample service agent activation method 1600, in accordance with one embodiment. Depending on the operating system running on the wireless device, the service agent 1602 can be launched by the user-interface 1604, on-demand and on-access scanners 1606, a background process (daemon) and/or system scheduler 1608, itself 1609, and external signal/trigger 1610 originated from the service provider. More information regarding such triggers will now be set forth.

Activation Through User-Interface (Manual Trigger)

The agent can be directly launched from the wireless user-interface by the user. When the user selects an update-now button (or menu entry), the user-interface activates the agent.

Activation by the Agent (Self Trigger)

Under multi-process operating environment, the service agent stays resident and awaits (or sleeps) for update-interval time specified in the anti-malware scanner configuration before contacting the update server.

Scanner Activation (Scanner Trigger)

The agent is launched for new updates when the on-demand and/or on-access scanner notices that the update-interval-time has elapsed since the agent was activated last.

Scheduled Activation (Scheduled Trigger)

Operating system provided scheduler like cron™ in Unix/Linux™ is utilized to schedule the agent activation. Also, if the operating system allows daemon (or background process), a simple daemon is used to activate the service agent.

Carrier/Service Provider Activation (External Trigger)

This is an ideal method for deploying urgent virus signature updates while providing load balance. The wireless device/phone may support launching an application via a signal from its service provider. When an update signal from an external source is received by the device, it launches a pre-configured application, in this case the service agent, for immediate update.

Configuration

Like other the anti-malware scanner components on the device, the agent configuration information is kept in a central location. Table 25 lists the service agent communication configuration and status variables read/updated.

TABLE 25

| Variable | Example | Description |
| --- | --- | --- |
| server | http://update1.mcafeeasap.com/cgi-bin/update.fcg, http://update2.mcafeeasap.com/cgi-bin/update.fcg | Lists one or more update server URL's. |
| method | 1 | Specifies server selection method. 0: direct-method - always attempt to connect to the first server given, connect to next server if the first one fails. 1: round-robin - attempt to connect to server listed after previous connected server. |
| last_connect | 167.68.79.100 | IP address port number of the last update server successfully connected. |
| last_check | 20020110051530 | Last time the agent made a successful server connection, Format: YYYYMMDDhhmmss |
| connect_timeout | 5000 | Server connection timeout in milliseconds. |
| read_timeout | 3000 | Socket read timeout value in milliseconds. |
| write_timeout | 3000 | Socket write timeout value in milliseconds. |
| connect_retry | 5 | Maximum connection open retry count. |
| read_retry | 3 | Maximum socket read retry count. |
| write_retry | 3 | Maximum socket read retry count. |
| download_dir | X$/vswsa/download | Where to store downloaded package. |

Service Package

The term "package" refers to any data/information uploaded/downloaded to/from a remote update server. Each package is made up of a header and parts. Each part consists of part-header and part-data sections. Designed for simplicity, endian-ness independence, and extensibility, the anti-malware scanner package format is an HTTP-like transmission format that allows multiple inclusion of any types of data. The package format is composed by subsequent entries:

Table 26 illustrates an exemplary format.

TABLE 26

Format
<PART$_0$>
...
<PART$_n$>
with each part is composed of:
<PART-HEADER>
<PART-DATA>
The end-of-file marks the end-of-package data.
Package and part header section has the following format:
<FIELD$_n$> ':' <SP> <VALUE$_n$> <CRLF>
...
<CRLF>
where:
<FIELD$_n$> :: $NAMETOKEN
<SP> :: [\b] (space character)
<VALUE$_n$> :: $VARTOKEN
<CRLF> :: "\r\n" (carriage return followed by linefeed)
and:
$NAMETOKEN :: [a–z, A–Z, 0–9]
$VARTOKEN :: [^\r\n]
Between the <FIELD> values, two are mandatory:
ContentName: ENRTY-NAME
ContentLength: LENGTH where:

ENRTY-NAME is the object identification name, and LENGTH is the length of the subsequent DATA section in bytes. The part-data section is made up of a binary chuck of data whose length is LENGTH. The format described above simplifies package creation and information access thus keeping the device application footprint small.

The part-header section can contain other useful information, for example, content type, compression method, signatures, checksums, etc. Also, it's possible to contain information that does not carry any data by setting the ContentLength: to zero and by making the <FIELD> carry data. As given in the example of Table 27, the device identification number is uploaded to a server by setting the ContentName to $DEV-UID, including a field names X-DEVUID, and setting the ContentLength to zero. See Table 27 for a package containing device ID number.

TABLE 27

ContentName: $DEV-UID
X-DevUID: 091200831080281
ContentLength: 0

The content name part can easily contain pathname information that make the format suitable for multi-level packaging transfers. Table 28 shows an example package uploaded to a server. It contains three separate information: 1) device identification number, 2) device log information, and 3) product and component version information (catalogue).

Upload Package

Three types of part contents are uploaded to a server for back-end processing are: 1) device identification number, 2) device system/log information in XML format, and 3) component version information. The device identification number is used by the back-end to validate a device connection. Uploaded system and log information is processed and stored in a back-end database for reporting. Product/component version information, catalogue, is used by the back-end server in selecting an installation package to download.

TABLE 28

| Content Name | Required Field | Description |
| --- | --- | --- |
| $DEV-UID | X-DevUID | Contains 16-byte device identification number given in the X-DevUID field. Content length is always zero. |
| $DEV-LOG | none | Contains system activity and virus detection log information to be stored in the back-end database. |
| $DEV-CATALOGUE | none | Virus signature database version, scan engine version numbers, and other component and product version information is included in the catalogue. The back-end update server uses the version information uploaded in determining whether to download a new installation package. |

The upload package is created from data provided by individual components that are registered with the service agent to upload/report its information to the back-end server. The service agent simply requests the registered components for upload data. Table 29 illustrates sample upload parts.

TABLE 29

```
ContentName: $DEV-UID
X-DevUID: 091200831080281
ContentLength: 0
ContentName: $DEV-LOG
ContentType: text/xml
ContentLength: 1252
<?xml version="1.0" encoding="ISO-8859-1"?>
<log>
    <event time="20020110110323">
        <severity>0</severity>
        <message>Device was updated successfully</message>
    </event>
    <scan time="20020110121545">
        <name>Nasty</name>
        <type>trojan</type>
        <action>2</action>
        <infected>Address.prc</infected>
    </detect>
    .
    .
    .
</log>
ContentName: $DEV-CATALOGUE
ContentType: text/xml
ContentLength: 815
<?xml version="1.0" encoding="ISO-8859-1"?>
<catalogue>
    <product>
        <id>7002</id>
        <version>1.0</version>
        <name> Wireless</name>
    </product>
    <component>
        <name>engine</name>
        <version>4.10.08</version>
    </component>
    <component>
        <name>PD</name>
        <version>4288</version>
    </component>
    .
    .
    .
<catalogue>
```

Client Authentication/Verification

The server uses the device identification number specified by the X-Device-LUID field to verify and retrieve client-specific information. This verification is done as soon as any part of the HTTP POST data containing the device identification is received.

Event Log

Also given in the client upload package is a wireless component/application log entries. Like the catalogue information, the log entries are formatted in XML form. There are two types of log entries: detection log and application event log. The detection log entry contains detected malware name, its type, infected filename, and the action taken by the scanner. Application (or component) event log entry lists severity of the event and a short message describing the event. Both the detection and the event log entries have a timestamp specified in UTC. Table 30 illustrates a pair of XML formats.

TABLE 30

```
<event time="YYYYMMDDhhmmss">
    <severity>severity-value</severity>
    <message>event-description</message>
</event>
Format 1 Event Log Entry Format
<detect time="YYYYMMDDhhmmss">
    <name>malware-name</name>
    <type>malware-type</name>
    <infected>infected-file</infected>
    <action>scanner-action</action>
</detect>
Format 2 Detection Log Entry Format
```

The log entry time stamp given in UTC has the following format in Table 31.

TABLE 31

|  | YYYY | :: year (e.g. 2002) |
| --- | --- | --- |
|  | MM | :: month(01–12) |
|  | DD | :: day of the month (01–31) |
|  | hh | :: hour of the day in 24 hour format (00–23) |
| mm |  | :: minute (00–59) |
| ss |  | :: second (00–59) |

Table 32 illustrates a sample log.

TABLE 32

```
ContentName: $DEV-LOG
ContentType: text/xml
ContentLength: 659
<?xml version="1.0" encoding ="ISO-8859-1"?>
<log>
    <event date="20020108110323">
        <Severity>0</severity>
        <message>PD updated</message>
    </event>
    <detect date="20020108110645">
        <name>Nasty</name>
        <type>virus</type>
        <infected>paint.exe</infected>
        <action>cleaned</cleaned>
    </detect>
    <detect date="20020108110815">
        <name>Nimda</name>
        <type>trojan</type>
        <infected>hello.exe</infected>
        <action>deleted</cleaned>
    </detect>
    <event date="20020108111010">
        <Severity>2</severity>
        <message>failed to scan kernel32.exe</message>
    </event>
<log>
```

Component Catalogue

The device catalogue (version information) uploads lists on the anti-malware scanner components. This catalogue information along with the device identification number is used in constructing a download package for the specific-device/client. Each catalogue entry given in the client upload package follows the format in Table 33.

TABLE 33

```
<catalogue>
    <product>
        <id>product-id</id>
        <version>version-number</version>
        [<name>product-name</name>]
    </product>
    <component>
        <id>component-id</id>
        <version>version-number</version>
        [<name>component-name</name>]
    </component>
    .
    .
    .
</catalogue>
```

Upload Information Gathering

Except for the device identification information, the service agent does not directly generate or format the data in the upload package—the service agent uploads data obtained from its clients. The service agent uses a set of callback functions supplied by its caller (or client) to request upload information. The service agent API SaSetParameter (and SaSetParameters) is used to by service agent client(s) to specify how to obtain upload data from each component.

Below steps describe the upload process

A. Initialization 1. each client is notified by the SA to construct a package part to upload.

2. the SA prepares package header that contains total package size information 3. device-identification part is constructed B. Login 1. connect to a remote server 2. send package header and device-identification part $DEV-ID C. Transmit 1. For each registered client, request a block of data from the client and then transmit.

D. Cleanup

E. Notify clients upload status

Package Download

After uploading a package, the service agent awaits for the server to download an installation package. The package header specifies the total package size, and the SA uses it to determine if the package contains installation part(s). The package size specified is greater zero, the SA downloads and saves the entire package data onto a download directory and calls the component installer. Each install part in an install package is identified by the content name that specifies the data format. The installer uses the format identifier in selecting an appropriate unpacker/decompressor for extracting and installing files contained in the part. Table 34 illustrates a sample installation package.

TABLE 34

ContentName: $INST-SIS
ContentType: binary
ContentLength: 200105
[200,105 byes of SIS data]

Client-Server Communication

Figure 17:
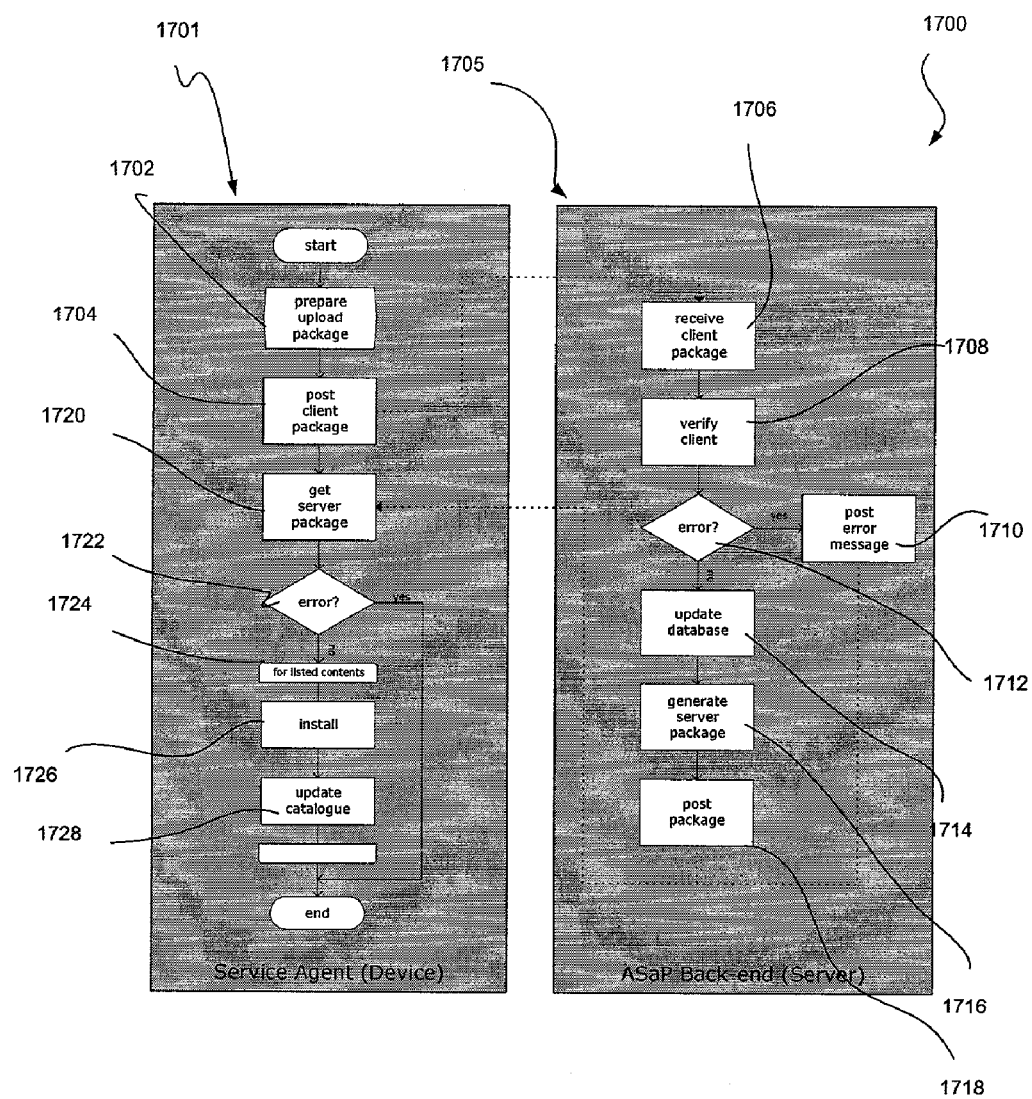
FIG. 17 provides a method for client and server package handling.

FIG. 17 provides a method 1700 for client and server package handling. As shown in FIG. 17, during a client process 1701, a package is prepared by a mobile wireless device to be uploaded. See operation 1702. This client package is then posted for access by the server in operation 1704. This prompts the initiation of a server process 1705.

During the server process 1705, the client package is received in operation 1706, after which the client is verified in operation 1708. If an error is detected in decision 1712, an error message is posted in operation 1710. If not, however, the database is updated based on the client package in operation 1714. Next, a server package is generated in operation 1716, after which the server package is posted for access by the client in operation 1718.

The client process 1701 then proceeds by receiving the server package in operation 1720. If an error is identified in decision 1722, the process is terminated. If, however, no error is detected, the contents that are listed in operation 1724 are installed in operation 1726. Further, the catalogue is updated in operation 1728.

The client-server communication is thus initiated by the service agent by posting an upload package to a remote server. When this HTTP(S) POST is made to the server, the client connection is verified and the entire client package is received. After receiving the client package, the server updates database with the uploaded information, and then returns a package generated based on the information uploaded. The client installs components in the server package and updates its installed component catalogue.

Client-Server Protocol

The device update process may take place by preparing the package format (MPF) that may be basically composed by an UID entry, an XML file containing device catalogue information like dat/engine/applications versions and log entries and eventually quarantine files.

Once the package is prepared, the service agent ( SA ) may lookup its configuration searching for the URL to which to post the request. The URL may have the form shown in Table 35

TABLE 35 http://CARRIERDOMAIN/cgi-bin/update.fcg
or
https://CARRIERDOMAIN/cgi-bin/update.fcg for HTTP over SSL connections. The package may be sent to the remote back-end agent (RBA) with a standard HTTP POST request like given that in Table 36.

TABLE 36

POST <CARRIERDOMAIN>/cgi-bin/update.fcg HTTP/1.0
Host: <CARRIERDOMAIN>
Content-Type: binary/MPF
X-Device-UID: <DEVICE-UID>
Content-Length: <SIZEOF-PACKAGE>
[<SIZEOF-PACKAGE> bytes of binary data]

After that, the RBA may be invoked and it may unpack the package looking for the catalogue information coming from the device (i.e. details of what happens inside the RBA are described in another document ). Based on the device current catalogue, the RBA may prepare a custom package whose format may be device dependent to better utilize intrinsic device capabilities and hence reduce the code footprint of the SA application. The RBA may send the prepared package as data inside the HTTP POST response given in Table 37. Then, the connection to the RBA may be closed and the SA may be free to process the package.

TABLE 37

```
POST <CARRIERDOMAIN>/cgi-bin/update.fcg HTTP/1.0
Host: <CARRIERDOMAIN>
Content-Type: binary/MPF
X-Device-UID: <DEVICE-UID>
Content-Length: <SIZEOF-PACKAGE>
[<SIZEOF-PACKAGE> bytes of binary data]
HTTP/1.0 200 OK
Host: <CARRIERDOMAIN>
Content-Type: binary/MPF
Content-Length: <PACKAGE-SIZE>
[<PACKAGE-SIZE> bytes of binary data]
```

Secure Communication and Authentication

The service agent uses system-provided secure channel (e.g. SSL) for server communication and authentication APIs for downloaded package verification. Data uploaded from a device to a server is done through secure channel to protect private information. The download package containing virus detection files and component upgrades need to be cryptographically signed and authenticated. Without proper authentication, the device may be vulnerable to a third party attack.

Table 38 illustrates an exemplary service agent API.

TABLE 38

SaOpen
Description
The SaOpen( ) call creates a service agent(SA) instance and returns its handle. The returned handle must be released using the SaClose( ) call.
Prototype
HSAgent SaOpen(SAMODEL model, HVSOPTS hOpts);
Parameters
model
[in] specifies the created service agent's run-time process model. Below list describes the service agent run-time models.

| SAMODEL | Description |
| --- | --- |
| SARUN_SPS | Instantiated service agent resides in the caller's process space. The caller needs to make subsequent SA calls for update, installation and status queries. |
| SARUN_FORK | SaOpen spawns/forks a service agent process. The SA process stays resident until SaClose is called. This run-time model is supported only under multi-task/multi-process OS such as Unix/Linux and Windows NT/2K. |
| SARUN_DEF | Specifies the system default run-time model. SaOpen selects either SARUN_SPS or SARUN_FORK depending on the system implementation |

HVSOPTS
[in] application configuration/option handle. Table below provides the service agent run-time configuration options obtained from the configuration handle.

| Configuration Name/Reference | Value Type | Description |
| --- | --- | --- |
| SAPAR_INTERVAL | UINT16 | Service interval in minutes. Supported under SAMODE_FORK model. |

TABLE 38-continued

| SAPAR_SERVERS | SASERVERS | Specifies servers to contact for upload/download. SASERVERS is defined as typedef struct {    int     nServers;    URL*  pList; } SASERVERS; Where URL is typedef struct {    char*  pszURL; } URL; This parameter overrides server listed in the configuration settings. |
| --- | --- | --- |
| SAPAR_SELECT | BYTE | Server selection method 0 for direct-mode (first-listed first) 1 for round-robin This parameter overrides CFG_SERVER_SELECT setting in the system configuration. |
| SAPAR_TIMEOUT | UINT32 | Server communication timeout in milliseconds. This parameter overrides CFG_SERVER_SELECT setting in the system configuration. |
| SAPAR_TEMP | PATHSTR | System temp directory path. This parameter overrides CFG_SERVER_SELECT setting in the system configuration. |
| SAPAR_DOWNDIR | PATHSTR | Where to store downloaded package. This parameter overrides CFG_SERVER_SELECT setting in the system configuration. |

Return Value
A handle to the instantiated service agent. NULL indicates failure.
See Also
SaClose
SaClose
Description
SaClose releases system resources used by a service agent handle. If the SA is running as a separate process, SARUN_FORK model, the process is terminated.
Prototype
int SaClose(HSAGENT hAgent);
Parameters
hAgent
[in] service agent handle returned by SaOpen
Return value
0 on success. −1 indicates error.
See also
SaOpen
SaSetDnCallback
Description
Used to specify a callback function during a package download process.
Prototype
int SaSetDnCallback(HSAGENT hAgent, FNSADNPARTCB* pfnCallback);
typedef int (* UpPartCallback)(
   char* pszPartName,
   size_t partSize,
   size_t totalSize,
) SADNPARTCB;
Parameters
hAgent
[in] service agent handle returned by SaOpen
pfnCallback
[in] If set, the service agent calls the function specified for each part downloaded from a server. If the callback function returns −1, the agent aborts the download process.

TABLE 38-continued pszPartName   downloaded part name
partSize      downloaded part size
totalSize     download package size
Return value
0 on success. −1 indicates error.
See also
SaOpen, SaSetUpHandlers
SaRegClients
Description
The SaRegClients is used by the caller to specify a list upload clients.
The service agent obtains upload data and related information via a set
of callback functions that define an upload client.
Prototype
int SaSetUpHandlers(
    HSAGENT   hAgent,
    FNSAUPPARTCB*  pfnCallback,
    SAUPPERTCLIENT*  clients,
    int      howMany
);
typedef int (* UpPartCallback)(
    char* pszPartName,
    size_t partSize,
    size_t totalSize,
    int nPartNum,
    int nParts
) FNSAUPPARTCB;
typedef struct
{
    char* pszPartName;
    int (* Initialize)(void);
    size_t (* PartSize)(void);
    int (* GetData)(
        void* buffer,
        size_t cbBuffer,
        size_t* pcbSize
    );
    int (* Cleanup)(BOOL bSuccess);
    int (* Result)(BOOL bSuccess);
} SAUPPARTCLIENT;
Parameters
hAgent
[in] Service agent handle returned by SaOpen.
pfnCallback
[in] if specified, the service agent periodically makes calls
the 'pfnCallback' function during the upload process with the
following parameters:
pszPartName  name of the part uploaded (or being uploaded)
partSize     part data uploaded (in bytes)
totalSize    total upload package size (in bytes)
nPartNum     part handler number listed in the upload handler list
             'handlers'
nParts       total number part handlers listed (='howMany').
If the callback function returns −1, the service agent aborts the
update process.
clients
[in] a list components involved in uploading information to a
server. When an upload package is prepared by the service agent
through a scheduled event or by a request by another component/
application, the service agents goes through the upload "clients"
given as the 'clients'. A SAUPPARTCLIENT structure contains
callback functions the agent makes to a client when preparing and
sending upload-data (or part). The Initialize call is made by the
service agent to notify each upload client to prepare data to
upload. The PartSize is used to query upload-data size. The
GetData is called by the service agent to request a block of
upload-data from its owner (or client). The Cleanup call is made
to notify the client after entire data has been uploaded to a
server. The parameter nError is set to zero if the upload process
was successful. −1 to indicate failure.
pszPartName  upload component/part name passed to the 'pfnCallback'
Initialize   informs the upload handler to prepare data to send
PartSize     request the upload part size
GetData      request a chunk of upload data from the handler
Cleanup      informs the handler its part/data has been successfully
            uploaded or failed
Result       informs the handler whether the entire upload process was
            successful
The service agent, when ready to send a given upload part, calls
the Initalize function to let its client know that it needs to prepare a

TABLE 38-continued upload data, and then requests the size of the upload part/data. The
GetData function is used by the service agent to request a chunk of
upload data client. The data received is immediately uploaded to a
server. The Cleanup is called when entire upload data for the client
has been transmitted or an error occurred. When all the component
upload parts have been uploaded, the service agent informs listed
clients using the Result callback function.
howMany
[in] specifies the number of upload clients listed
Return Values
0 to indicate success. −1 to indicate failure.
See also
SaSetDnCallback, SaUpdate
SaUpdate
Description
The SaUpdate call performs three tasks: 1) device to server package
upload, 2) server to device package download, and 3) package
installation. The device's upload package is prepared using
the upload part handlers specified using the SaRegClients and
SaSetDnCallback calls. After uploading a device package, SaUpdate
downloads and installs a package containing wireless components
from a server.
Prototype
int SaUpdate(
    HSAGENT hAgent,
    BOOL* pbPkgInstalled
    );
Parameters
hAgent
[in] Service agent handle returned by SaOpen.
pbPkgThere
[out] TRUE if a package has been downloaded and installed successfully.
Return Values
0 to indicate success. −1 to indicate failure.
See also
SaRegClients, SaSetDnCallback
SaState
Description
The SaState call returns the service agent's state. This call
provides the caller with current operation being performed by the
service agent under the SARUN_FORK model.
Prototype
SASTATE SaState (HSAGENT hAgent);
Parameters
hAgent [in] service agent handle returned by SaOpen
Return value
Returns one of the states listed below.

| SASTATE | Meaning |
| --- | --- |
| SAST_NOTIMPL | Not implemented - OS does not multi-tasking/process. |
| SAST_ERROR | Failed to obtain the service agent state. |
| SAST_STANDBY | Waiting for service interval or waiting for call to SaUpdate. |
| SAST_UPDATE | Uploading/download package to/from a server. |
| SAST_INSTALL | Installing downloaded package. |
| SAST_ABORTING | Processing SaAbort request. |

See also
SaUpdate, SaAbort
SaAhort
Description
The SaAbort call aborts package upload/download and installation. This
call is not supported under single-task/process model
SARUN_SPS.
If SaAbort is called during a upload process, each registered upload
part handler is notified
Prototype
int SaAbort (HSAGENT hAgent);
Parameters
hAgent [in] service agent handle returned by SaOpen
Return Values
0 if successful. −1 indicates error.
See also
SaUpdate, SaState

Installer

The anti-malware scanner installer is tasked with extracting and installing components. This includes the update or install packages the service agent receives from a back-end server. The configuration manager coordinates between the service agent and the installer to retrieve updates, and shuts down the on-access scanner so as not to cause a conflict when installing components.

Installation Package

The installation package contains one or more wireless installation components encapsulated in parts. Each part contains binary image of the component, version information, and special pre/post scripts used to install the component. The installation package format and its part format is identical to the service package uploaded to a server by the service agent.

One exemplary format is shown in Table 39.

TABLE 39

The installation package is made up of multiple parts:
<PART$_0$>
...
<PART$_n$>
Each installation part is made up of part-header and part-data:
<PART-HEADER>
<PART-DATA>
Installation part-header is made up of part-data and component description:
ContentName: <content-identifier>
ContentType: <content-type>
ContentLength: <content-length>
ComponentID: <component-ID>
ComponentName: <component-name>
ComponentVersion: <component-version>

The content-identifier uniquely identifies the content information, content-type describes the content format/type of the part-data, and content-length provides the length (in bytes) the part-data included. Component—id is the wireless component identification number used in referencing a particular component, component-name specifies the component name, and component-version provides the version information. The example of Table 40 is an installation package containing PD and engine updates. The first part contains the virus signature file scan.pd, and the second part contains scan engine update with pre and post installation scripts to execute when installing the engine.

Content Name

The installer uses the content names in identify the install algorithm. Table 40 lists the content names accepted by the installer.

TABLE 40

| Content Name | Description |
| --- | --- |
| $ENGINE | scan engine |
| $PD | virus signature database |
| $PDn | virus signature database containing a limited set of detections; where 0 ≦ n |
| $PDU | virus signature database update |
| $APP | Wireless application |
| $CONFIG | Wireless application configuration |
| $APP-1 | contains an application to be executed and removed (e.g. special virus cleanup app) |
| $PRE-SCRIPT | script/application to be executed before a component is installed |
| $INST-SCRIPT | script/application for installing the component; default install algorithm is by passed when this script/app is included |
| $POST-SCRIPT | script/application to be executed after installation |

Content Type

The content type provides the stored part-data (component install image) format type, either binary or text, and the component classification names. Table 41 lists the component classification names used in an install package.

TABLE 41

| Content Type | Description |
| --- | --- |
| pd-file | virus-signature data |
| container | part-data containing one or more parts |
| script | system-specific script file |
| lib | run-time library (e.g. DLL) |
| app | application binary |

Component Identification

The component identification specifies the wireless component number. It is used to reference a specific component in the wireless component catalogue on the device. See Table 42.

TABLE 42

| Component ID | Description |
| --- | --- |
| 1000 | full virus signature database |
| 1001, . . . , 1099 | virus signature database subset |
| 2000 | scan engine |
| 3000 | main application |
| 5000, . . . , 5999 | special applications |

ContentName: $PD
ContentType: binary/pd-file
ContentLength: 156
ComponentID: 2000
ComponentName: PD
ComponentVersion: 2.0.1
[156 bytes long scan.pd image]
ContentName: $ENGINE
ContentType: binary/container
ContentLength: 650
ContentPriority: 0
ComponentID: 1000
ComponentName: scan engine
ComponentVersion: 4.3.21
ContentName: $PRE-SCRIPT
ContentType: text/script
ContentLength: 35
/etc/rc.d/init.d/vmax stop
ContentName: $BINARY
ContentType: binary/lib
ContentLength: 256
[256 bytes long scanengine image]
ContentName: $POST-SCRIPT
ContentType: text/script
ContentLength: 34
/etc/rc.d/init.d/vmax start

Installation Process

Figure 18:
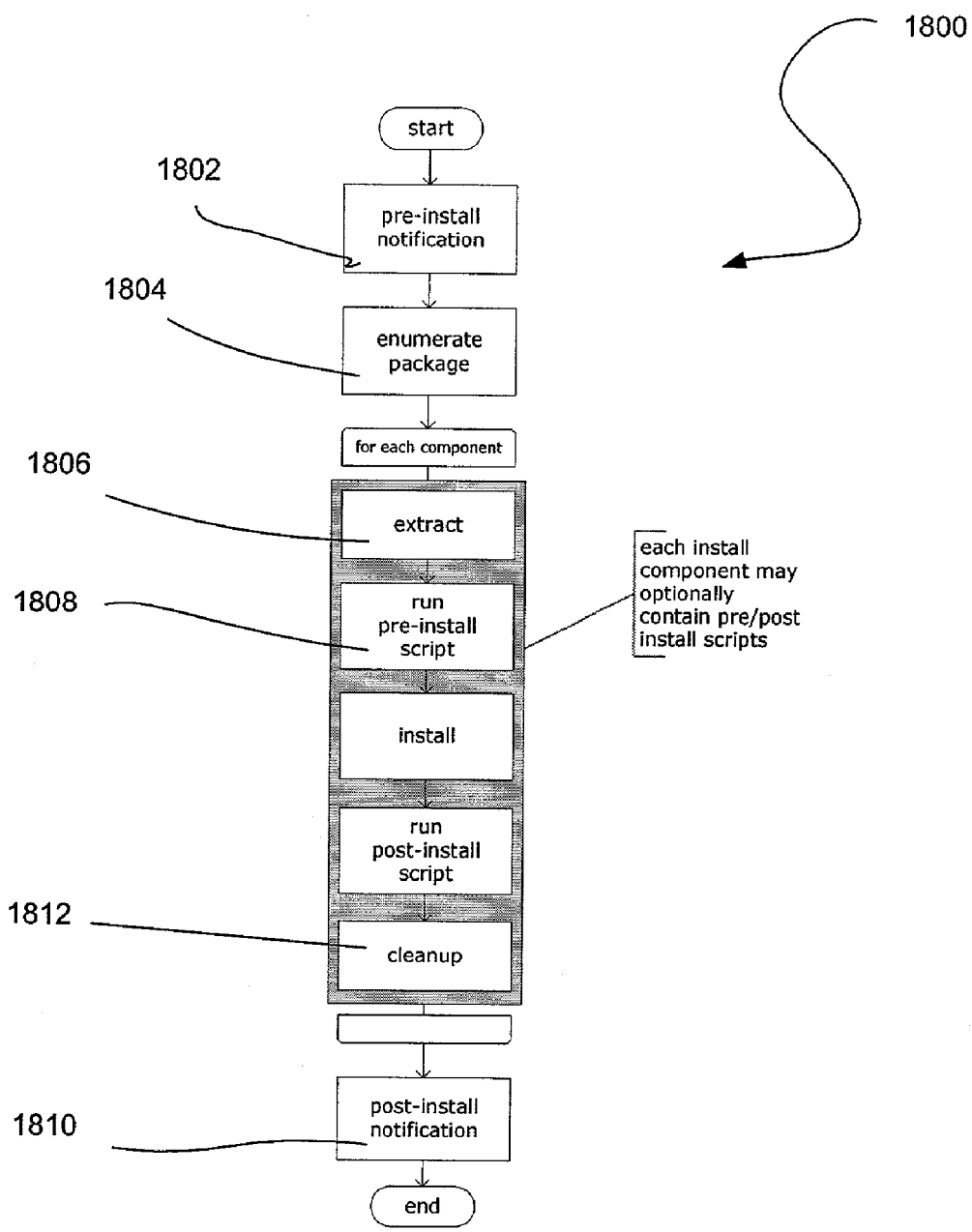
FIG. 18 illustrates the various steps of a package installation process, in accordance with one embodiment.

FIG. 18 illustrates the various steps 1800 of the package installation process, in accordance with one embodiment. Once an installation/update package has been downloaded, the service agent notifies the installer to extract and install/update new components. See operation 1802.

1. obtain package information
   a. enumerate through enclosed contents/parts (1804)
   b. order components by priority
2. notify components
3. for each component:
   a. extract components to a temporary storage (1806)
   b. execute pre-install script if included (1808)
   c. copy/move extracted component
   d. update catalogue
   e. execute post-install script
4. notify components
5. cleanup (1812)

The installation notification is sent out to components running on the device before and after an installation. See operation 1810. The notification information includes the component identification number of the component being updated.

Installer API

An illustrative installer API is shown in Table 43A.

TABLE 43A

InsPackageInstall
Description
The InsPackageInstall call installs the anti-malware scanner installation package.
Prototype
int InsPacakgeInstall(void);
Parameters
none
Return Values
0 on success. −1 indicates error.

Platform Abstraction Layer (218 of FIG. 2)

The wireless platform abstraction layer (PAL) is a middleware API designed to provide components with a platform-independent system interfaces. The abstraction layer is divided into following seven categories.

Figure 19:
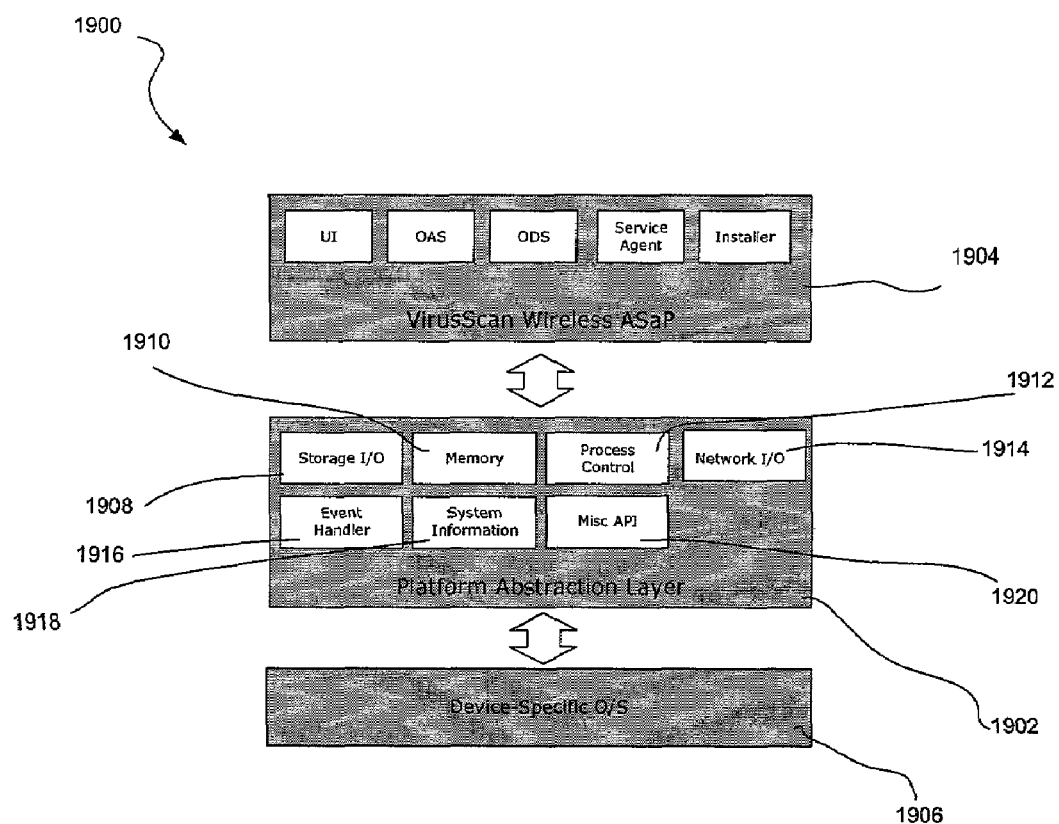
FIG. 19 illustrates the components of the platform abstraction layer and the manner in which they interface with a mobile wireless device and operating system thereof.

FIG. 19 illustrates the components 1900 of the platform abstraction layer 1902 and the manner in which they interface with the mobile wireless device 1904 and operating system 1906 thereof. See Table 43B for a list of such components.

TABLE 43B 1. storage I/O APIs for accessing files (or stored objects) and directories, (1908)
2. Dynamic memory allocation APIs, (1910)
3. Process/task control calls (1912)
4. Network I/O calls (1914)
5. System event handler APIs (1916)
6. System identification and resource information routines (1918)
7. Miscellaneous APIs (1920)

More information will now be set forth regarding the various components of the platform abstract layer.

Storage I/O (1908 of FIG. 19)

Storage I/O API is used by wireless to access and modify data objects (or files) stored on a non-volatile storage device (e.g. flash memory, hard disk) and managed by a file system or file system like storage and retrieval system. The API is divided into three categories: 1) I/O routines for reading/writing data to/from single object or file, 2) calls used to copy, move and delete a stored object, 3) and routines that provide object enumeration from a storage. See Table 44.

TABLE 44

| Name | Arguments | Returns | Description |
| --- | --- | --- | --- |
| FsFileOpen | const FILEPATH* pFilePath, fmode_t modes, | HFILE | Opens the specified file using the specified. FILEPATH is a system-specific data structure used to define a specific-file path. |
| FsFileClose | HFILE hFile | In. | Closes specified file handle. |
| FsFileRead | HFILE hFile, void* buffer, size_t cbLength | size_t | Returns the number of bytes read into 'buffer' after attempting to read 'cbLength' from file handle 'hFile'. (size_t)-1 is returned on error. |
| FsFileWrite | HFILE hFile, void* buffer, size_t cbLength | size_t | Returns the number of bytes written from 'buffer' after attempting to write 'cbLength' bytes to file handle 'hFile'. (size_t)-1 is returned on error. |
| FsFileSeek | HFILE hFile, off_t offset, fpos_t whence | off_t | Returns current file handle offset position after moving 'offset' bytes from the location directive 'whence'. (off_t)-1 is returned on error. |
| FsFileSetSize | HANDLE hFile, off_t cbNewLength | off_t | Sets the files size to 'cbNewLength' bytes long. −1 is returned on error. |
| FsFileDelete | const FILEPATH* pFilePath | int | Deletes the specified file. −1 is returned on error. |
| FsFileRename | const FILEPATH* pOldPath, const FILEPATH* pNewPath | int | Renames a file, moving it to different directory is required. If a file with same path exists, the call returns an error. −1 is returned on error. |
| FsFileCopy | const FILEPATH* pSrcPath, const FILEPATH* pDestPath, BOOL bOverwrite | int | Copies a file to a different location. If 'bOverwrite' is not set (= FILE) and a destination file exists, an error is returned. |
| FsFileCopyToDir | const FILEPATH* pSrcPath, const DirPATH* pDestDir, BOOL bOverwrite | int | Copies a file to the specified directory location. If 'bOverwrite' is not set (= FILE) and a destination file exists, an error is returned. |

TABLE 44-continued

| Name | Arguments | Returns | Description |
|---|---|---|---|
| FsFileStat | const FILEPATH* pFilePath, FILESTATE* pFileStat | int | Returns information (including file size, permission) on specified file. |
| FsSetMode | const FILEPATH* pszPath, faccess_t accessMode | int | Sets the file access permission to the mode specified. |
| FsDirRoot | void | HDIR | Returns the root directory handle. |
| FsDirOpen | const DIRPATH* pDirPath | HDIR | Returns a directory handle for the specified directory. |
| FsDirClose | HDIR hDir | int | Releases resource taken up by a directory handle. |
| FsDirFirst | HDIR hDir | const DIRENTRY* | Returns the first directory entry. |
| FsDirNext | const DIRENTRY* pDirEntry | const DIRENTRY* | Returns the directory entry listed after the entry pointed by the 'pDirEntry' pointer. |
| FsGetFilePath | void* buffer | FILEPATH* | Converts system-specific file path into the FILEPATH structure and returns its memory pointer. The returned pointer needs to be released using the FsFreeFilePath. |
| FsFreeFilePath | FILEPATH* pFilePath | int | Frees system resource associated with the structure pointed by 'pFilePath' pointer. |
| FsGetDirPath | void* buffer | DIRPATH * | Converts system-specific directory path into the DIRPATH structure and returns its memory pointer. The returned pointer needs to be released using the FsFreeDirPath. |
| FsFreeDirPath | DIRPATH* pDirPath | int | Frees system resource associated with the structure pointed by 'pDirPath' pointer. |

Network Socket I/O (1914 of FIG. 19)
See Table 45 for an exemplary network socket I/O API.

TABLE 45

| Name | Arguments | Returns | Description |
|---|---|---|---|
| SocketOpen | int domain, int type, int protocol | HSOCKET | Creates a network socket and returns its handle. |
| SocketConnect | HSOCKET hSocket, msec_t timeout, SockAddr sockAddr, NETPORT_T port | int | Initializes connection on a socket. -1 returned if error. |
| SocketBind | HSOCKET hSocket, NETPORT_T port | int | Sets the socket to bind to port 'port'. Client IP address is set to INADDR_ANY. -1 returned if error. |
| SocketAccept | HSOCKET hSocket, SOCKADDR* pAddr | int | Accepts a connection on a socket and returns connected client IP information in 'pAddr'. -1 returned if error. |
| SocketReceive | HSOCKET hSocket, msec_t timeout, void* buffer, size_t size | size_t | Reads from a connected socket. |
| SocketSend | HSOCKET hSocket, msec_t timeout, void* buffer, size_t size | size_t | Writes to a connected socket. |
| SocketClose | HSOCKET hSocket | int | Closes connection and releases system resource. |
| SSLOpen | HSOCKET hSocket | HSSL | Transforms a normal (non-secure) socket to a SSL socket, and the SSL API calls should be used instead. If the call fails, the 'hSocket' property is retained and NULL is returned. |

TABLE 45-continued

| Name | Arguments | Returns | Description |
|---|---|---|---|
| SSLConnect | HSSL hSocket, msec_t timeout, SockAddr sockAddr, NETPORT_T port | int | Initializes connection on a SSL socket. -1 returned if error. |
| SSLAccept | HSSL hSocket, SOCKADDR* pAddr | int | Accepts a SSL connection on a SSL socket and returns connected client IP information in 'pAddr'. -1 returned if error. |
| SSLReceive | HSSL hSocket, msec_t timeout, void* buffer, size_t size | size_t | Reads from a connected SSL socket. |
| SSLSend | HSSL hSocket, msec_t timeout, void* buffer, size_t size | size_t | Writes to a connected SSL socket. |
| SSLClose | HSSL hSocket | int | Closes SSL connection and releases system resource. |

Process Control API (1912 of FIG. 19)
See Table 46 for an exemplary process control API.

TABLE 46

| Name | Arguments | Returns | Description |
|---|---|---|---|
| ProGetList | pid_t** ppPid | int | Returns the number of current system processes and a list of process id's. |
| ProFreeList | pid_t* pPid | int | Frees process listed obtained using ProGetList. |
| ProKill | pid_t pid | int | Terminates specified process. |
| ProOpen | pid_t pid | HPROCESS | Returns a process handle corresponding to the process id. |
| ProClose | HPROCESS hProcess | int | Frees resource associated with the process handle. |
| ProGetName | HPROCESS hProcess, void* pName, size_t cbName | int | Returns process name. |
| ProGetFilePath | HPROCESS hProcess, FILEPATH** ppFilePath | int | Returns storage path for the process image. |
| ProGetCodeMem | HPROCESS hProcess, size_t offset, void* buffer, size_t cbRead | size_t | Retrieves 'cbRead' bytes of process instruction code/data from process code offset 'offset'. Returns the number of bytes read into 'buffer'. Return value (size_t)-1 indicates error. |

Dynamic Memory (1910 of FIG. 19)
See Table 47 for an exemplary dynamic memory API.

TABLE 47

| Name | Argument | Returns | Description |
|---|---|---|---|
| MemMalloc | size_t size | void* | Returns a pointer to at least 'size' bytes long dynamic memory block. |
| MemFree | void* ptr | void | Frees dynamic memory allocated using MemMalloc |

Event Handler API (1916 of FIG. 19)

See Table 48 for an exemplary event handler API.

TABLE 48

| Name | Argument | Returns | Description |
| --- | --- | --- | --- |
| EvntSetHandler | int event, FNEVENT_HANDLER* pFunc | int | Sets a callback/handler for event 'event'. |
| EvntGetHandler | int event | FNEVENT_HANDLER* | Returns event handler for event 'event' |

System Information (1918 of FIG. 19)

See Table 49 for an exemplary system information API.

TABLE 49

| Name | Arguments | Returns | Description |
| --- | --- | --- | --- |
| SysGetId | unsigned char id[16] | int | Obtains 16-byte device identification code. |

See Table 50 for an exemplary error/status API.

TABLE 50

| Name | Arguments | Returns | Description |
| --- | --- | --- | --- |
| ErrSetLast | VSWSTATUS err | int | Sets the last error to 'err' |
| ErrGetLast | void | VSWSTATUS | Returns the last error set using the ErrSetLast function. |

Misc. API (1920 of FIG. 19)

See Table 51 for an exemplary misc. API.

TABLE 51

| Name | Arguments | Returns | Description |
| --- | --- | --- | --- |
| Sleep | msec_t msec | int | suspends current execution and sleeps for 'msec' milliseconds |
| MemSet | void* dest, int pattern, size_t n | void* | Sets the first 'n' bytes of memory pointed by 'ptr' to 'pattern'. Pointer to 'ptr' is returned. |
| MemCopy | void* dest, void* src, size_t n | void* | Copies 'n' bytes from memory area 'src' to memory area 'dest' and then returns pointer to 'dest'. |
| ExecBuffer | void* buffer, size_t length | int | Treats the 'buffer' as executable binary image and requests the system to execute. The return code of the executable is returned. |
| ExecFile | const FILEPATH* pExePath | int | Request the system to execute the executable file identified by 'pExePath'. The return code returned by the executable is passed on to the caller. |

Abstract File System Specification

The abstract file system provides an interface for supporting features in the platform abstraction layer (PAL). When porting the anti-malware scanner to new platforms, this interface may need to be implemented for every class of scannable data object on the device. The most common may be a file system. This may also include databases or custom persistent data storage on the device.

Implementing the Interface

The scanner components use the HDIR and HFILE handles to interact with files and directories. These handles are discussed in greater detail in the PAL. The abstract file system is one way of implementing these handles.

Three different interfaces need to be supported, as shown in Table 52.

TABLE 52

Abstract Directory: ADIR
Abstract Directory Entry: ADIRENT
Abstract File: AFILE

The ADIR is used to support HDIR. The ADIRENT supports both FILEPATH and DIRPATH. The AFILE supports HFILE.

For example, an HDIR is type cast into an ADIR pointer. Thus, FsFileRead( ) can be defined as follows in Table 53.

TABLE 53 define FsFileRead(hFile, pBuffer, length) \
    ((ADIR *)hFile )->pRead(hFile, pBuffer, length)

This saves on the overhead of having to implement a FsFileRead( ) function that does essentially the same thing as the macro.

ADIR, ADIRENT, and AFILE are implemented as data structures with callback functions. The callback functions provide basic capabilities to enumerate and manipulate files. The calling application must implement these interfaces.

Data Types

See Table 54 for various exemplary data types.

TABLE 54

ADIRENT_TYPE
Description
Denotes the type of ADIRENT.
Prototype
enum ADIRENT_TYPE
{
    ADIRENT_UNKNOWN = 0,
    ADIRENT_AFILE = 1,
    ADIRENT_ADIR = 2
};
AFILE_MODE
Description
When opening a file, the read/write mode must be specified. It can be changed later with a call to AFILE.setmode( ). For scanning files, the mode should be read only. However, to clean the file, the mode may be changed to read/write if possible.
Prototype TABLE 54-continued

```
enum AFILE_MODE
{
    AFILE_READ_ONLY = 1,
    AFILE_WRITE_ONLY = 2,
    AFILE_READ_WRITE = 3,
};
```

ADIR Interface

See Table 55 for an exemplary ADIR API.

TABLE 55

ADIR
Description

This interface provides an abstract directory. This is anything that has entries that can be enumerated like a directory structure.
Prototype

```
struct ADIR
{
    ADIRENT *(*pOpenFirst)(ADIR *pADir);
    ADIRENT *(*pOpenNext)(ADIR *pADir);
    void (*pClose)(ADIR *pADir);
};
```
Example Internally, it may be useful to create a structure for holding private data members for the ADIR structure. For example,
```
typedef struct
{
    /* public */
    ADIR adir;
    /* private */
    char *pPath;
    char *pFilter;
    glob_t glob;
    int index;
} PDIR;
```
A function is needed to initially create an ADIR of any given type. The following shows how the data structure is allocated and initialized under UNIX systems.
```
ADIR *open_std_dir(const char *path const char *filter)
{
    PDIR *dir = malloc(sizeof(PDIR));
    if(dir != NULL)
    {
        memset(dir, 0, sizeof(PDIR));
        dir->pPath = strdup(path);
        if(filter != NULL)
            dir->pFilter = strdup(filter);
        dir->adir.pOpenFirst = dir_open_first;
        dir->adir.pOpenNext = dir_open_next;
        dir->adir.pClose = dir_close;
    }
    return (ADIR *) dir;
}
```
pOpenFirst
Description Open the first entry in the directory. The directory entries might not be sorted. This function merely starts the enumeration of entries.
Example In the above example, adir->pOpenFirst points to the dir_open_first( ) function:
```
static ADIRENT *dir_open_first(ADIR *adir)
{
    PDIR *dir = (PDIR *) adir;
    char *pattern;
    pattern = malloc(strlen(dir->pPath) + strlen(dir->pFilter) + 1);
    if(pattern != NULL)
    {
        strcpy(pattern, dir->pPath);
        strcat(pattern, dir->pFilter);
```

TABLE 55-continued

```
        if(glob(pattern, GLOB_MARK|GLOB_NOSORT, NULL,
            &dir->glob) == 0)
        {
            dir->index = 0;
            free(pattern);
            return dir_open_next(adir);
        }
        free(pattern);
    }
    return NULL;
}
```
pOpenNext
Description Get the next entry in the directory. It may be necessary to close the prior entry before opening another entry. Returns NULL when no more entries are available.
Example

```
static ADIRENT *dir_open_next(ADIR *adir)
{
    PDIR *dir = (PDIR *) adir;
    if(dir->index < dir->glob.gl_pathc)
    {
        ADIRENT *ent = open_std_dirent(
            dir->glob.gl_pathv[dir->index]);
        dir->index++;
        return ent;
    }
    return NULL;
}
```
pClose
Description Release resources for the directory.
Example

```
static void dir_close(ADIR *adir)
{
    PDIR *dir = (PDIR *) adir;
    free(dir->pPath);
    dir->pPath = NULL;
    if(dir->pFilter)
    {
        free(dir->pFilter);
        dir->pFilter = NULL;
    }
    globfree(&dir->glob);
#ifdef _DEBUG
    memset(dir, 0, sizeof(PDIR));
#endif /* _DEBUG */
    free(adir);
}
```

ADIRENT Interface

See Table 56 for an exemplary ADIRENT API.

TABLE 56

ADIRENT
Description

This is the abstract directory entry interface. These are returned by ADIR interfaces when enumerating entries in the directory.
Prototype

```
struct ADIRENT
{
    text_t *(*pGetFName)(ADIRENT *pEnt);
    ADIRENT_TYPE (*pGetType)(ADIRENT *pEnt);
    ADIR *(*pOpenADir)(ADIRENT *pEnt);
    AFILE *(*pOpenAFile)(ADIRENT *pEnt, AFILE_MODE mode);
    int (*pRemove)(ADIRENT *pEnt);
    int (*pRename)(ADIRENT *pEnt1, ADIRENT *pEnt2);
    int (*pCopy)(ADIRENT *pEnt1, ADIRENT *pEnt2);
    int (*pStat)(ADIRENT *pEnt, FILESTAT *pFileStat);
```

TABLE 56-continued

```
        int (*pSetMode)(ADIRENT *pEnt, faccess_t accessMode)
        void (*pClose)(ADIRENT *pEnt);
};
```
Example In order to have private data for the ADIRENT, the following data
structure is commonly created internally:
```
typedef struct
{
    ADIRENT adirent;
    /* private */
    text_t *fname;
    ADIRENT_TYPE type;
} PDIRENT;
```
Note that the ADIR implementation references the
open_std_dirent( ) function. This allocates memory and initializes the
ADIRENT structure.
```
ADIRENT *open_std_dirent(const char *fname)
{
    PDIRENT *ent;
    ent = malloc(sizeof(PDIRENT));
    if(ent)
        {
            ent->fname = (text_t *) strdup(fname);
            ent->type = ADIRENT_UNKNOWN;
            ent->adirent.pGetFname = dirent_get_fname;
            ent->adirent.pGetType = dirent_get_type;
            ent->adirent.pOpenADir = dirent_open_adir;
            ent->adirent.pOpenAFile = dirent_open_afile;
            ent->adirent.pRemove = dirent_remove;
            ent->adirent.pClose = dirent_close;
        }
    return (ADIRENT *)ent;
}
```
pGetFName
Description Returns the name of the file. The actual text_t is system dependant.
However, for a given operating system, all ADIRENT implementations
must use the same text_t type.
Example

```
static text_t *dirent_get_fname(ADIRENT *dirent)
{
    PDIRENT *ent = (PDIRENT *) dirent;
    return ent->fname;
}
```
pGetType
Description Returns the type of file. ADIRENT_UNKOWN is returned if an error
has occurred. Otherwise, the entry is identified as ADIRENT_AFILE or
ADIRENT_ADIR. Use the pOpenADir ( ) and pOpenAFile ( ) functions
accordingly.
Example

```
static ADIRENT_TYPE dirent_get_type(ADIRENT *dirent)
{
    PDIRENT *ent = (PDIRENT *) dirent;
    struct stat st;
    ent->type = ADIRENT_UNKNOWN;
    if(stat((char *)ent->fname, &st) == 0)
        {
            if(S_ISDIR(st.st_mode))
                ent->type = ADIRENT_ADIR;
            else if(S_ISREG(st.st_mode))
                ent->type = ADIRENT_AFILE;
        }
    return ent->type;
}
```
pOpenADir
Description If the entry type is ADIRENT_ADIR, this returns an ADIR for the entry.
Example

```
static ADIR *dirent_open_adir(ADIRENT *dirent)
{
    PDIRENT *ent = (PDIRENT *) dirent;
```
        if(ent->type != ADIRENT_ADIR)
            return NULL;
        return open_std_dir((char *)ent->fname, NULL);
```
}
```
pOpenAFile
Description If the entry type is ADIRENT_AFILE, this returns a generic AFILE
for the entry. Use OpenADirFilter ( ) and OpenAFileFilter ( ) to access
alternate plug-in filters for files.
Example

```
static AFILE *dirent_open_afile(ADIRENT *dirent,
AFILE_MODE mode)
{
    PDIRENT *ent = (PDIRENT *) dirent;
    if(ent->type != ADIRENT_AFILE)
        return NULL;
    return open_std_file((char *)ent->fname, mode);
}
```
pRemove
Description Remove the current file entry from the directory. After a call to remove( ),
only close( ) may function properly.
Example

```
static int dirent_remove(ADIRENT *dirent)
{
    PDIRENT *ent = (PDIRENT *) dirent;
    return unlink((char *)ent->fname);
}
```
pRename
Description Renames the pEnt1 to pEnt2.
Prototype int (*pRename)(ADIRENT *pEnt1, ADIRENT *pEnt2)
pCopy
Description Copies directory entry pEnt1 to pEnt2.
Prototype int (*pCopy)(ADIRENT *pEnt1, ADIRENT *pEnt2)
pStat
Description Stat's the given directory entry.
Prototype int (*pStat)(ADIRENT *pEnt, FILESTAT *pFileStat)
pSetMode
Description Changes the read/write file permissions for the directory entry.
Prototype int (*pSetMode)(ADIRENT *pEnt, faccess_t accessMode)
pClose
Description Release resources used by the file entry.
Example

```
static void dirent_close(ADIRENT *dirent)
{
    PDIRENT *ent = (PDIRENT *) dirent;
    free(ent->fname);
#ifdef _DEBUG
    memset(ent, 0, sizeof(PDIRENT));
#endif
    free(ent);
}
```

AFILE Interface

See Table 57A for an exemplary AFILE API.

TABLE 57A

AFILE
Description

This is the abstract file interface. These are created by an ADIRENT.
Prototype

```
struct AFILE
{
        size_t (*pRead)(AFILE *fp, void *ptr, size_t size);
        size_t (*pWrite)(AFILE *fp, const void *ptr, size_t size);
        long (*pTell)(AFILE *fp);
        long (*pSeek)(AFILE *fp, long offset, int whence);
        int (*pEof)(AFILE *fp);
        int (*pError)(AFILE *fp);
        int (*pSetSize)(AFILE *fp, long offset);
        int (*pSetMode)(AFILE *fp, AFILE_MODE mode);
        int (*pClose)(AFILE *fp);
};
```
Example Internally, the following data structure provides extra information for the implementation:
```
typedef struct
{
    /* public members: */
    AFILE afile;
    /* private members: */
    FILE *fp;
    char *fname;
} PFILE;
```
The open_std_file( ) function is used by ADIRENT to allocate and initialize the AFILE structure.
```
AFILE *open_std_file(const char *fname, AFILE_MODE mode)
{
    PFILE *file = malloc(sizeof(PFILE));
    if(file != NULL)
        {
            char *file_mode = get_file_mode(mode);
            file->fname = strdup(fname);
            file->fp = fopen(fname, file_mode);
            if(file->fname != NULL && file->fp != NULL)
                {
                    file->afile.pRead = file_read;
                    file->afile.pWrite = file_write;
                    file->afile.pSeek = file_seek;
                    file->afile.pTell = file_tell;
                    file->afile.pClose = file_close;
                    file->afile.pEof = file_eof;
                    file->afile.pError = file_error;
                    file->afile.pSetSize = file_setsize;
                    return (AFILE *) file;
                }
            if(file->fname)
                free(file->fname);
            if(file->fp)
                fclose(file->fp);
            else
                perror("file error");
            free(file);
            file = NULL;
        }
    return (AFILE *) file;
}
static char *get_file_mode(AFILE_MODE mode)
{
    char *file_mode = NULL;
    switch(mode)
        {
        case AFILE_READ_ONLY:
            file_mode = "rb";
            break;
        case AFILE_WRITE_ONLY:
            file_mode = "wb";
            break;
        case AFILE_READ_WRITE:
            file_mode = "r"b";
```

TABLE 57A-continued

```
            break;
        default:
            assert(0);
            break;
        }
    return file_mode;
}
```
pRead
Description Read bytes from the given file. Returns the number of bytes actually read. It may be less than size due to reaching the end of file or an error.
Use pEof( ) and pError( ) to detect if at end of the file or whether an error occurred.
Example

```
static size_t file_read(AFILE *afile, void *pfr, size_t size)
{
    PFILE *file = (PFILE *) afile;
    return fread(ptr, size, 1, file->fp);
}
```
pWrite
Description Write bytes to the given file. Returns the number of bytes actually written. If the return value is less than the number of bytes requested, then an error has occurred.
Example

```
static size_t file_write(
AFILE *afile,
const void *ptr,
size_t size)
{
    PFILE *file = (PFILE *) afile;
    return fwrite(ptr, size, 1, file->fp);
}
```
pTell
Description Return the current offset into the file. This value can be used with seek( ) to return to the file offset.
Prototype long AFILE.tell(AFILE *fp)
Example

```
static long file_tell(AFILE *afile)
{
    PFILE *file = (PFILE *) afile;
    return ftell(file->fp);
}
```
pSeek
Description Seeks to a new location in the file. Set whence to SEEK_CUR, SEEK_POS, or SEEK_END.
Synopsis long AFILE.seek(AFILE *fp, long offset, int whence)
Example

```
static int file_seek(AFILE *afile, long offset, int whence)
{
    PFILE *file = (PFILE *) afile;
    return fseek(file->fp, offset, whence);
}
```
pEof
Description This returns one if at the end of the file. Otherwise, returns zero.
Prototype int AFILE.pEof(AFILE *fp)
Example

```
static int file_eof(AFILE *afile)
{
    PFILE *file = (PFILE *) afile;
```

TABLE 57A-continued

```
    return feof(file->fp);
}
```
pError
Description

This returns zero if no errors have occurred. Otherwise, returns a non-zero value.
Example

```
static int file_error(AFILE *afile)
{
    PFILE *file = (PFILE *) afile;
    return ferror(file->fp);
}
```
pSetSize
Description Sets the new size of the file. This is intended for truncating the file.
pSetMode
Description Changes the read / write access mode to the file.
pClose
Description De-allocates resources used for the file.
Example

```
static int file_close(AFILE *afile)
{
    PFILE *file = (PFILE *) afile;
    int ret = fclose(file->fp);
    file->fp = NULL;
    if(file->fname)
        {
            free(file->fname);
            file->fname = NULL;
        }
    return ret;
}
```

Configuration Settings

A configurations settings object manages all configuration settings. This object is use to set and retrieve information in permanent storage. The inner logic of this object manages the way information is stored and accessed. The component manager instantiates this object and passes a configuration settings handle to all other subsystems so they can access their options. Note is that there are no structures involved and each configuration setting is referenced by a symbolic name. As long as the symbolic name is known it can be accessed. Each subsystem uses a prefix to clearly identify its configuration settings.

The following are advantages to this configuration management system, as indicated in Table 57B.

TABLE 57B

The logic of how to access information is contained within one object. If the storage method would need to be changed for some reason, it is only one objects implementation that changes and none of the other subsystems get affected.
Information is stored in a way that does not allow for user access.
If the persistent storage object is not found, default preconfigured values are returned. This way system security is not jeopardized.

Table 57C shows a summary of all configuration settings object interfaces are:

TABLE 57C

ScnOptsCreate( )
ScnOptsDestroy( )
ScnOptsGetInt( )
ScnOptsSetInt( )
ScnOptsGetString( )
ScnOptsSetString( )

Following in Table 57D is a detailed description of each API.

TABLE 57D

ScnOptsCreate( )
Description

The ScnOptsCreate( ) function creates a configuration settings object instance. The handle that is returned by this function call should be passed to all subsequent calls to configuration settings family of functions.
Prototype HVSOPTS ScnOptsCreate( void ); // Creates configuration settings
Parameters No parameters are required.
Return Values If NULL value is returned then this function call failed. To find out the reason why this call failed call the ErrGet( ) function. This function is thoroughly documented in the platform abstraction layer. If the function succeeds it may be a valid handle that should be freed up using the ScnOptsDestroy( ) function when it is not needed anymore.
See Also ScnOptsDestroy ( )
ScnOptsDestroy( )
Description The ScnOptsDestroy( ) function destroys a configuration settings object instance. The handle passed to it is what was returned from ScnOptsCreate( ) function.
uz,1/5 Prototype
int ScnOptsDestroy( HVSOPTS hOpts ); // Destroys configuration settings TABLE 57D-continued Parameters hOpts
Handle to a configuration settings object that was obtained from a call to ScnOptsCreate( ).
Return Values Zero is returned to indicate success. −1 is returned to indicate error To find out the reason why
this call failed called the ErrGet( ) function. This function is thoroughly documented in the
platform abstraction layer.
See Also ScnOptsCreate ( )
ScnOptsGetInt( )
Description The ScnOptsGetInt( ) function retrieves an integer type of value from the configuration settings
object.
Prototype

```
int ScnOptsGetInt(
      HVSOPTS    hOpts,         //[in] handle to configuration settings
      text_t * pszSymName,      //[in] symbolic name of int value
      int      * pIntVal        //[out] integer value.
      );
```
Parameters hOpts
Handle to a configuration settings object that was obtained from a call to ScnOptsCreate( ).
pszSymName
A null terminated symbolic name representing the value that should be retrieved.
pIntVal
Pointer to an integer value where the requested setting is placed.
Return Values Zero is returned to indicate success. Success is that the specified value was found and it was
returned in pIntVal. −1 is returned to indicate error. An error is most likely because the value was
not found, or the specified symbolic name corresponds to a string type and not to an integer type.
See Also ScnOptsSetInt( ), ScnOptsSetString( ), ScnOptsGetString( )
ScnOptsGetString( )
Description The ScnOptsGetString( ) function retrieves an string type of value from the configuration settings
object.
Prototype

```
int ScnOptsGetString( )
      HVSOPTS    hOpts,         //[in] handle to configuration settings
      text_t * pszSymName,      //[in] symbolic name of int value
      text_t * pCharVal,        //[out] string value
      size_t * pCharLen         //[in][out] size of pCharVal on entry.
      );
```
Parameters hOpts
Handle to a configuration settings object that was obtained from a call to ScnOptsCreate( ).
pszSymName
A null terminated symbolic name representing the value that should be set.
pCharVal
Pointer to a string value where the requested configuration setting is placed.
pCharLen
Upon entry this parameter must contain the maximum number of characters that pCharVal can
hold. Upon exit this variable may contain the number of characters placed in this buffer.
Return Values Zero is returned to indicate success. Success is that the specified value was found and it was
returned in pIntVal. −1 is returned to indicate error. An error is most likely because the value was
not found, or the specified symbolic name corresponds to a string type and not to an integer type.
See Also ScnOptsSetInt( ), ScnOptsGetInt( ), ScnOptsSetString( )
ScnOptsSetInt( )
Description The ScnOptsSetInt( ) function associates an integer value with the specified symbolic name.

TABLE 57D-continued

Prototype

```
int ScnoptsSetInt(
    HVSOPTS   hOpts,         //[in] handle to configuration settings
    text_t * pszSymName,     //[in] symbolic name of int value
    int       iIntVal        //[in] integer value.
    );
```
Parameters hOpts
Handle to a configuration settings object that was obtained from a call to ScnOptsCreate( ).
pszSymName
A null terminated symbolic name representing the value that should be set.
iIntVal
An integer value that is associated with the above symbolic value.
Return Values Zero is returned to indicate success. Success is that the specified value was associated with the mentioned symbolic name. −1 is returned to indicate error.
See Also ScnOptsGetInt( ), ScnOptsSetString( ), ScnOptsGetString( )
ScnOptsSetString( )
Description The ScnOptsSetString( ) function sets an string type of value to the configuration settings object.
Prototype

```
int ScnOptsSetString(
    HVSOPTS   hOpts,         //[in] handle to configuration settings
    text_t * pszSymName,     //[in] symbolic name of int value
    text_t * pCharVal,       //[in] string value
    size_t   iCharLen        //[in] size of pCharVal on entry.
    );
```
Parameters hOpts
Handle to a configuration settings object that was obtained from a call to ScnOptsCreate( ).
pszSymName
A null terminated symbolic name representing the value that should be retrieved.
pCharVal
Pointer to a string value that is associated with the above mentioned symbolic name.
iCharLen
This parameter contains the number of characters in pCharVal to save.
Return Values Zero is returned to indicate success. Success is that the specified value was associated with the specified symbolic name. −1 is returned to indicate error.
See Also ScnOptsSetInt( ), ScnOptsGetInt( ), ScnOptsGetString( )

Configuration Settings Storage Definition

Configuration settings are stored in a text file in XML format. A sample configuration settings file is described in Table 58.

TABLE 58

```
< Wireless Settings>
<ScanAllFiles=0>
<ScanExtensions=SIS,APP,EXE>
<LogMaxFileSize=5120>
</ Wireless Settings>
```

ScanAllFiles is the symbolic name for the scan settings that tells whether all files should be scanned or just the files with the specified file extension. Because the value is made up entirely of numbers it should be accessed as a variable type integer.

ScanExtensions is the symbolic name for the scan settings that tells one what file types should be checked for malware in case ScanAllFiles is set to zero. Because the value is made up of alphanumeric values it should be accessed as a string.

Return Codes

The anti-malware scanner core technology architecture returns a common return code. This return code architecture is designed so clear identification can be made between error return codes and simple casual notification return codes. When interfacing with the component manager several other subsystems are involved in protecting the computer systems. From the return code itself it is possible to determine what subsystem is reporting a certain return code and the reason that subsystem decided to report it. This makes problem identification very trivial and notification messages are detailed.

The anti-malware scanner return code is a 32-bit value where each bit position has a meaning. The high order bit, 0x80000000 is set for error return codes only. If this bit is not set then the return code in question corresponds to a notification return code. Each the anti-malware scanner core component has its unique bit position within the return code. Bits positions reserved for subsystem have a range from 0x00100000 to 0x7FF0000 and this allows for detailed debugging and reporting because it is possible to track what subsystems an event traversed through before it was reported. The scanner subsystems use the following bit positions within a return code shown in Table 59.

TABLE 59

| | |
|---|---|
| VSWSTATUS_SS_CMGR | 0x00100000 Component manager |
| VSWSTATUS_SS_OA | 0x00200000 On-access scanner |
| VSWSTATUS_SS_OD | 0x00400000 On-demand scanner |
| VSWSTATUS_SS_ALOG | 0x00800000 Activity log. |
| VSWSTATUS_SS_AGT | 0x01000000 Service agent. |

This methodology allows for 0xFFFFF possible error codes when combined with the high order bit, and 0xFFFFF notifications when not combined with the high order bit per subsystem.

All return codes that the anti-malware scanner returns can be found in the McStatus.h include file. This include file also contains several helper macros that facilitates return code dissecting. Among these macros are ISSTATUSOK and ISSTATUSERROR that are used for quick determination whether a function call succeeded or not.

More information relating to an illustrative abstract library will be set forth in

APPENDIX A.

Back-End Architecture

The back-end architecture provides the following functionality in Table 60.

TABLE 60

Provisioning - Wireless service configuration.
Reporting - usage and statistical information from uploaded device information.
Communication - device-to-server data communication via HTTP/HTTPS.
Database Transaction - device information logging, status update, package selection.
Component Update - device-specific component update package preparation and distribution.
Server-side scanning (optional) - SMTP, SMS, phone-to-phone information content scanning Architecture The design goal of the anti-malware scanner back-end infrastructure is to provide a high level of reliability and scalability by distributing the workload to multiple servers. The back-end infrastructure consists of the following components set forth in Table 61

TABLE 61

HTTP server CGI program (kcgi) for client request handling
Database transaction server application (pdbserver) for database access.
Database for client information storage.
Web-based provisioning and reporting system.

With reference again to FIG. 1, client/server communication is initiated by a HTTP POST request from a wireless device to a HTTP server running a CGI named kcgi, an executable invoked by a HTTP daemon to handle client-server communication. Once a HTTP server receives a device request, it connects to a transaction server and sends and receives client-specific data. The transaction server, PDB Server, makes database queries to store and retrieve information to/from a database system. The anti-malware client configuration information, usage information and component update packages are stored in the database. The service configuration and reporting may be accomplished via Web interfaces.

kcgi—HTTP/Web Server CGI

The core CGI engine is implemented through a HTTP/Web server module named kcgi. It has been designed to efficiently handle multiple HTTP requests from wireless devices. The CGI is invoked by a Web server daemon (e.g. Apache) when a wireless device connects and uploads data through an HTTP POST request. See Table 62.

TABLE 62

POST /cgi-bin/kcgi.fcg HTTP/1.0
Host: <BACK-END-HOST>
. . .

When the CGI receives client data in the payload section of the POST request, it selects a transaction server after a round-robin lookup of a transaction server listing stored in the database and then routes the data to the selected server. Description of the transaction server (pdbserver) and the communication protocol is given in the next section. As a result of the protocol handshaking between kcgi and the pdbserver, a package is either generated or read from a local cache and is sent to the wireless device as PART (data section) of the HTTP response. In case the transaction server returns an error (e.g. authentication failure), kcgi returns an HTTP error response to the HTTP POST request.

PDB Server—Transaction Server Application

The personal device database transaction server, pdbserver, is a server application designed to be situated in-between a HTTP/Web server running kcgi and a database server(s) containing device and vendor-specific status and information. The pdbserver is a single-threaded, single-process application designed to handle multiple connections.

Command Line Arguments

The pdbserver supports six command line arguments—IP number, process user id, log directory path, upload package directory path, server listener port number, and maximum client connection.

Table 63 illustrates an example.

TABLE 63

./pdbserver --ip 161.69.79.100 --user pdbd --pkg /pdbd/packages
--port 6179 --max-clients 256

The example command line instructs pdbserver to register with a database as a server with IP "161.69.79.100", execute as a user "pdb" process, find packages in the "/pdbd/packages" directory, listens to connections on port 6179 and allow up-to 256 simultaneous client connections at a give time.

By defaultpdbserver saves posted log files under the "./"+<ip>+":"+<port> directory. For the above example, pdbserver saves posted log files into the ". /161.69.79.100: 6179" directory. See Table 64 for exemplary pdbserver command-line arguments.

TABLE 64

| Argument | Req'd | Default | Example | Description |
| --- | --- | --- | --- | --- |
| --ip | √ | none | 161.69.79.100 | This is the IP address of the pdbserver saved to the database. The pdbserver binds to all interfaces of the system it is running on. |
| --port | | 6179 | 6188 | Server port number. |
| --user | √ | none | pdbd | pdbserver process user-id |
| --log | | <IP>:<PORT> | ./161.69.79.100:6179 | Where to save posted log data |
| --pkg | √ | none | /pdbd/packages | Where to locate packages to be downloaded to clients. |
| --max-clients | | 64 | 256 | Maximum number clients. |

Architecture

The pdbserver is a single-process, single-threaded server application designed to serve multiple client connections simultaneously. Communication with clients is done using custom protocol over TCP/IP. The application code consists of three parts: initialization, service loop and cleanup.

Initialization

The initialization code consists of three parts: database connection/login, registration, and network/socket initialization.

Database Login

The current pdbserver implementation uses an Oracle user id "mdb", password "tigard", and connection string "lara" to log onto a remote PDB server. The Oracle connection string "lara" is used to reference a remote Oracle database server and must be defined in Oracle client network configuration file tnsnames.ora. Table 65 illustrates an example tnsnames.ora for an Oracle server running on the computer at pdb00.dev.mcafeelabs.com listening to port 1521. See Table 65 for an exemplary sample tnsnames.ora configuration.

TABLE 65

```
LARA.DEV.MCAFEELABS.COM =
    (DESCRIPTION =
        (ADDRESS_LIST =
            (ADDRESS = (PROTOCOL = TCP) (HOST =
            pdb00.dev.mcafeelabs.com) (PORT = 1521))
        )
        (CONNECT_DATA =
            (SERVICE_NAME = pdb00.dev.mcafeelabs.com)
        )
    )
```

Registration

Once a database connection is established, the pdbserver registers itself with the database. The back-end database keeps a list of pdbserver information for load-balancing purpose. The stored information can be obtained by a kcgi instance using the query-servers command.

Socket Initialization

The server's listener socket is initialized with no-delay mode, and the listener port is set to a user specified port number. The reason for setting the server socket in no-delay mode is to service clients without having to wait for read/write completion.

Service Loop

The pdbserver's main loop consists of accepting a connection to the listener socket, polling each client connection for I/O status updates, servicing each client's request, and removing clients who have timed out. The client network I/O status (read-ready, write-ready, error condition) is obtained using the poll API function. After each client's I/O status is updated, the server handles I/O requests for those clients whose I/O status is set for read/write and executes clients' commands when they are ready to execute.

Protocol

The kcgi/pdbserver communication protocol consists of a command and response sets. Each command/response is made up of a minimum of 8 bytes—the first 4 bytes for command/response code and the next 4 bytes for command/response data length. The command/response code and data length information are encoded in network-byte order. Command/response data is given if the length specified is not zero. See Table 66 for an exemplary command/response format.

TABLE 66

<command/response:4 bytes> <data-length:4 bytes>

[data:data-length bytes]

Figure 20:
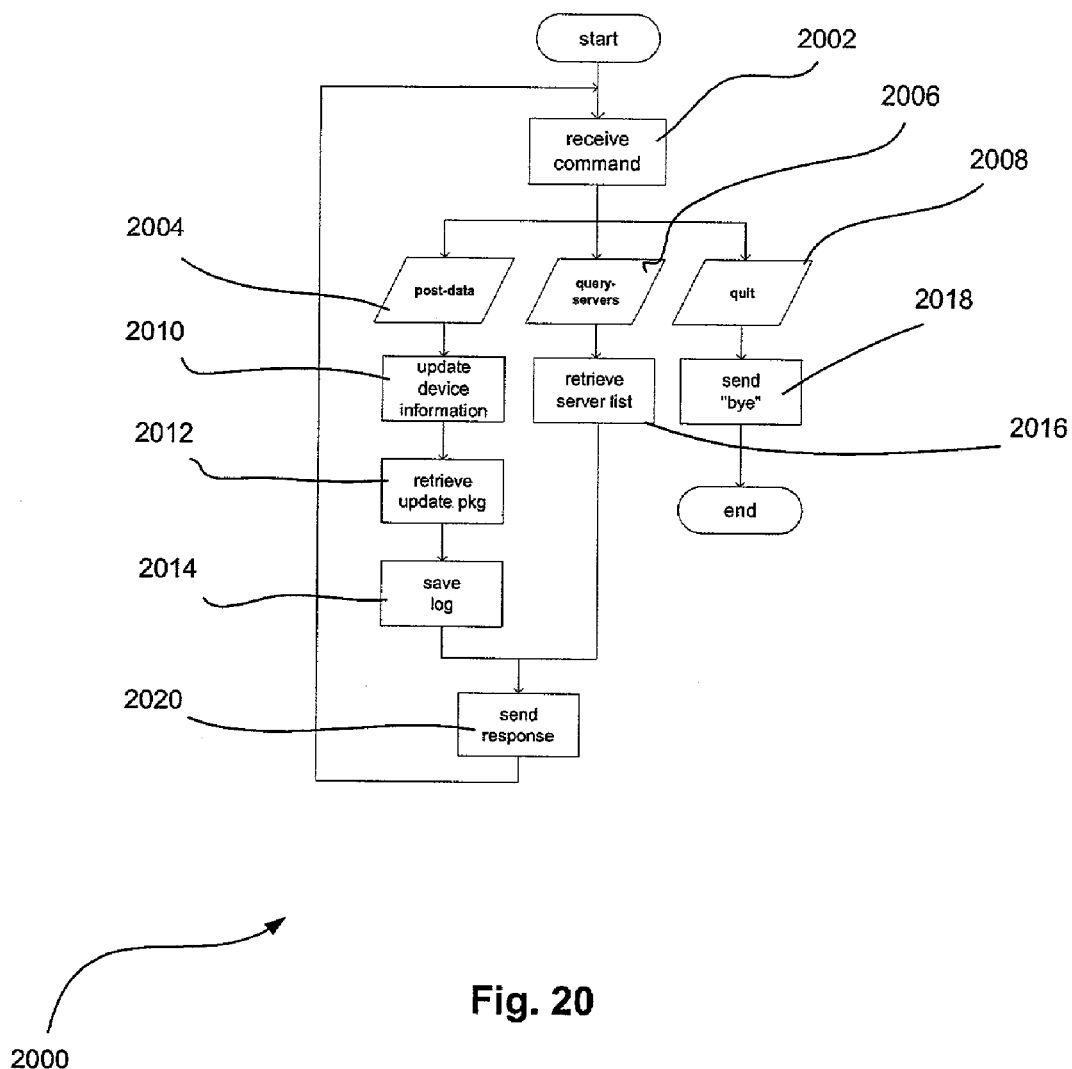
FIG. 20 illustrates a transaction server command process flow, in accordance with one embodiment.

FIG. 20 illustrates a transaction server command process flow 2000, in accordance with one embodiment. As shown, a command is received in operation 2002, after which it is identified as a post data command 2004, a query server command 2006, or a quit command 2008. If the command received is a post data command 2004, device information is updated in operation 2010, an update package is retrieved in operation 2012, a log is saved in operation 2014, and the response is sent in operation 2020. Further, if the command received is a query server command 2006, a server list is retrieved in operation 2016, and the response is sent in operation 2020. Further, the quit command 2008 prompts a bye operation. See operation 2018. More information regarding such commands will now be set forth.

Commands

The pdbserver accepts three commands from kcgi: post-data, query-servers and quit. Each command consists of a 4-byte command code followed by a 4-byte command argument length and data. See Table 67 for an exemplary PDB Server Command List.

TABLE 67

| Command | Value | Description |
|---|---|---|
| post-data | 0x0001 | Uploads device log file. |
| query-servers | 0x0002 | retrieves the file version number of the latest device-specific virus signature file stored in database. |
| quit | 0x0004 | ends client connection to the pdbserver. |

Post-data

One of the main functionalities of the pdbserver is to verify and update individual device's status on the back-end database. The post-data command is used by kcgi to upload (or post) data sent by a wireless device using HTTP POST. Contained in the uploaded client data is a wireless component catalogue containing version information and event log. The catalogue information is used in selecting an update package to download to the device, and the log data is stored in the database for reporting. At the very beginning of the HTTP POST data is a device identification number used to authenticate the device. Both the catalogue and the log information received are in XML format. Refer to the service agent section of the anti-malware scanner Design Specification document for the catalogue and event log format.

Query-servers

This command is used by kcgi in selecting a pdbserver, and returns a list of active PDB server IP's, port assignment, and number of clients connected to each server.

Return Code

For each command issued by a client, the pdbserver responds with a 4-byte response code followed by a 4-byte data length. Table 68A lists the current pdbserver response codes.

TABLE 68A

| Response | Value | Description |
|---|---|---|
| success | 0x0000 | command executed successfully. |
| cmd-failed | 0x8001 | failed to execute command |
| unknown-cmd | 0x8002 | unknown command issued |
| invalid-arg | 0x8003 | invalid command argument given |
| timeout | 0x8004 | client failed to issue command on time |
| not-impl | 0x8005 | issued command not implemented |
| invalid-data | 0x8006 | same as invalid-arg; client data contains invalid argument data |
| no-record | 0x8007 | failed to locate requested (or required) data from database |
| db-failure | 0x8008 | database transaction failure |
| db-unavail | 0x8009 | failed to connect to database |
| insuf-res | 0xCFFE | insufficient internal resource to execute requested command |
| internal-err | 0xCFFF | unknown internal error |

Configuration and Reporting

The anti-malware scanner run-time configuration is setup through a web interface and maintained in the database. New configuration settings in XML format are downloaded to each device as a part of the HTTP POST return data. Each device entry in the unit information table has a group id used to reference the configuration for a given wireless device. Currently identified configuration settings are those set forth in Table 68B.

TABLE 68B

Service-interval time - how often wireless devices contact the back-end to upload/download data from the back-end
Scan action - virus scanner action (clean/repair, delete, ignore)

Usage and statistical reports are generated using a Web interface from database records gathered from device logs uploaded by the service agent on the device. Two types of reports are available, as indicated by Table 68C.

TABLE 68C

Virus detection reports — statistical information on the virus names, types, actions taken.
System activity reports — compilation of system errors and warnings used to diagnose and troubleshoot.

Database Schema

Figure 21:
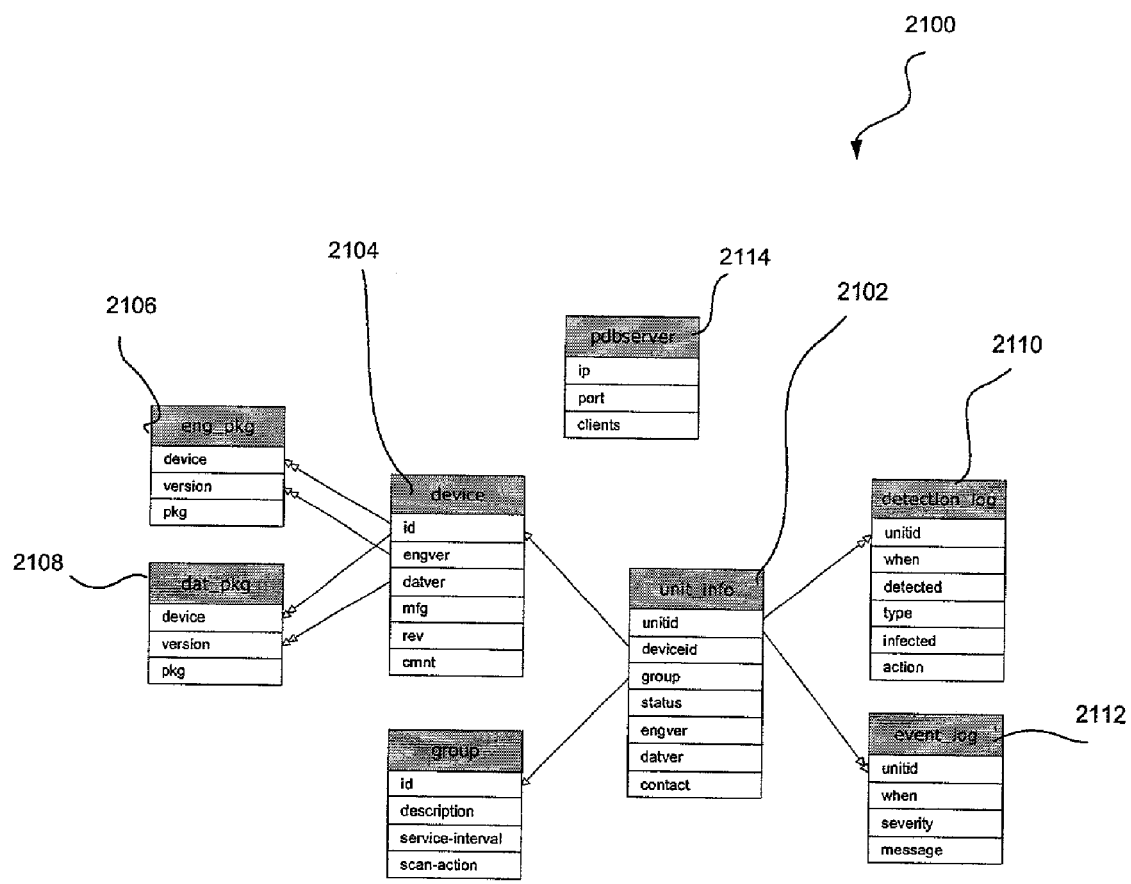
FIG. 21 illustrates a plurality of personal device database table relationships, in accordance with one embodiment.

FIG. 21 illustrates the personal device database table relationships 2100, in accordance with one embodiment. The personal device database (PDB) is a relational database made up of six tables: unit_info (2102), device (2104), eng_pkg (2106), dat_pkg (2108), detection_log (2110), event_log (2112) and pdbserver (2114). The information contained in the relational database tables are used by a pdbserver to retrieve individual devices' engine and PD information, detection and event log records, and to list available pdbserver's for kcgi.

Device Information Table (2104 of FIG. 21)

Device-specific latest engine and DAT version information is kept in the device table. See Table 69 for an exemplary device information table.

TABLE 69

| | | device | | |
|---|---|---|---|---|
| column | type | key | example | description |
| id | varchar (16) | √ | MOT10A | device identification number |
| engver | varchar (10) | | EM10A.5.2.1 | latest AV engine version number for the device 'id' |
| datver | varchar (10) | | DM10A.5.2.1 | latest AV signature database version for the device 'id' |
| mfg | varchar (32) | | Motorola | device manufacture name |
| rev | varchar (16) | | A | device revision number |
| cmnt | varchar (128) | | Motorola Model 10 A for Verizon | device comment/ remark text |

Engine Package Table (2106 of FIG. 21)

Engine package filename for a specific device type and version is stored in the eng_pkg table. See Table 70 for exemplary device-specific engine package information.

TABLE 70

| | | eng_pkg | | |
|---|---|---|---|---|
| column | type | key | example | description |
| device | varchar (16) | √ | MOT10A | device identification number |

TABLE 70-continued eng_pkg

| column | type | key | example | description |
|---|---|---|---|---|
| version | varchar (10) | √ | EM10A.5.2.0 | latest AV engine version number for the device |
| pkg | varchar (64) | | eng.m10a.050200.pkg | AV engine package name |

DAT Package Table (2108 of FIG. 21)

The DAT package table (dat_pkg) contains device and version specific DAT package name information. See Table 71 for exemplary device-specific DAT package information.

TABLE 71 dat_pkg

| column | type | key | example | description |
|---|---|---|---|---|
| device | varchar (16) | √ | MOT10A | device identification number |
| version | varchar (10) | √ | EM10A.5.2 0 | latest AV signature database version number for the device |
| pkg | varchar (64) | | dat.m10a.5.2.0.pkg | signature package name |

Unit Information Table (2102 of FIG. 21)

Every personal device has an entry in the unit_info table. Stored in this table are: 16-character fixed-length unit identification number, device identification number that specifies the device type, unit-group identification code that provides group association of a particular unit and virus scan data files and engine version numbers on the device. See Table 72 for an exemplary unit information table.

TABLE 72 unit_info

| column | type | key | example | description |
|---|---|---|---|---|
| unitid | char (16) | √ | C000A100008001234 | personal device unit identification number |
| deviceid | varchar (16) | | MOT10A | device identification number |
| group | char (8) | | VZ200 | unit group identification number |
| status | int | | 1 | unit activation status |
| engver | varchar (10) | | EM10A.5.2.1 | AV engine version on the unit |
| datver | varchar (10) | | DM10A.5.2.1 | AV signature version on the unit |
| contact | char (14) | | 20011224161525 | last log upload timestamp (UTC); YYYY + MM + DD + hh + mm + ss |

Detection Log (2110 of FIG. 21)

Virus/malware detection log entries posted by a device are kept in the detection log. Each log entry has unit identification number, timestamp, what was detected, and action taken by the scanner. See Table 73 for an exemplary malware detection log table.

TABLE 73 detection_log

| column | type | key | example | description |
|---|---|---|---|---|
| unitid | char (16) | | C000A100008001234 | personal device unit identification number |
| when | char (14) | | 20011224161030 | reported detection timestamp (UTC) |
| detected | varchar (32) | | abc@mm | malware name |
| type | varchar (16) | | worm | malware type |
| infected | varchar (128) | | system.dll | object (e.g. file) infected |
| action | int | | 1 | AV scanner action |

Event Log (2112 of FIG. 21)

System log information upload by devices are kept in the event log. Each log entry consists of unit id, log entry time, severity of the event, and event description. See Table 74A for an exemplary event log table.

TABLE 74A event_log

| column | type | key | example | description |
|---|---|---|---|---|
| unitid | char (16) | | C000A10000800123 4 | personal device unit identification number |
| when | char (14) | | 20011224161025 | reported detection timestamp (UTC) |
| severity | int | | 1 | severity-level of the reported event |
| message | varchar (160) | | DAT updated successfully | event description |

PDB Server Table (2114 of FIG. 21)

PDB server table lists active pdbserver instances and the number of clients each server is servicing. As a part of initialization process, each pdbserver registers its IP and port to the table, and maintains a client counter in the table. See Table 74B.

TABLE 74B pdbserver

| column | type | key | description |
|---|---|---|---|
| ip | varchar (15) | √ | PDB Server IP number |
| port | int | √ | PDB server port number |
| clients | int | | number of clients being served by IP:port |

PDB Logger

The PDB Logger (pdblogger) is a separate application designed to process posted device log data as an off-line process. The system event and detection log information stored in a log directory is processed and recorded onto the event and detection tables by this application.

Figure 22:
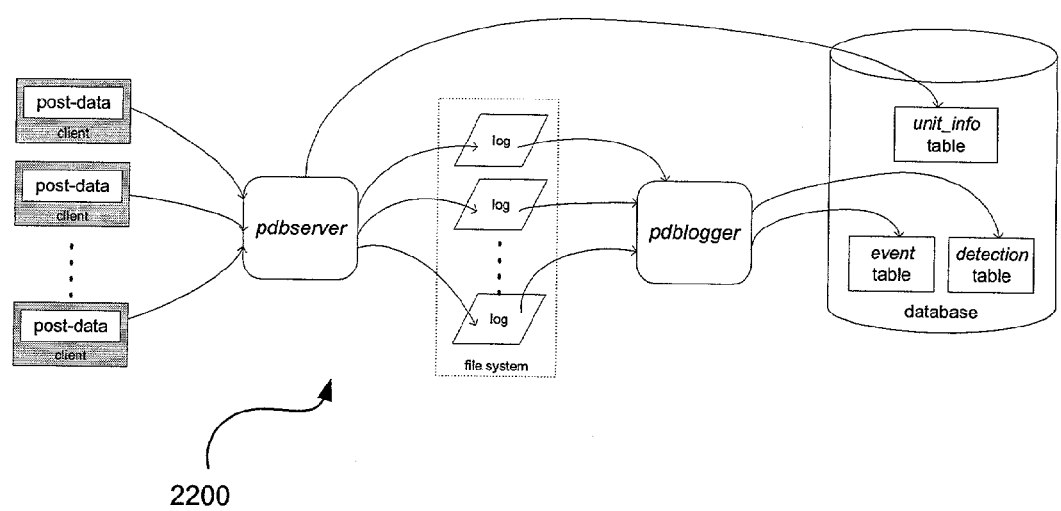
FIG. 22 shows an exemplary client information flow, in accordance with one embodiment.

FIG. 22 shows an exemplary client information flow 2200, in accordance with one embodiment.

APPENDIX A

Abstract Library

The design goal of the wireless abstraction library is to shield the application from platform-specific implementation details while providing consistent interfaces to the following subsystems in Table 75.

TABLE 75 dynamic memory allocation
process enumeration and control
threading and thread synchronization
storage I/O
network socket I/O
string conversion
system event handling Initialization An application using the API Library is required to make a call to the AlInitLibrary function before calling any other API functions. Also the user application is required to call the AlCleanupLibrary before terminating to release any system resources internal to the library. See Table 76.

TABLE 76

Initialization API

| Name | Arguments | Returns | Description |
|---|---|---|---|
| AlInitLibrary | void | int | initialize library |
| AlCleanupLibrary | void | int | release system resource used |

Errors Functions

The absttaction library provides two functions to set and retrieve the last-error code for the calling thread. See Table 77.

TABLE 78

Error API

| Name | Arguments | Returns | Description |
|---|---|---|---|
| AlErrGetLast | void | AlErrorCode | retrieves the last-error code |
| AlErrSetLast | AlErrorCode | void | sets the last-error code |

System Information API

See Table 79.

TABLE 79

Child Process API

| Name | Arguments | Returns | Description |
|---|---|---|---|
| AlGetDeviceID | text_t* pId, int iSize | int | retrieves the system identification string |

Process API

The abstraction library provides a set of functions for a child process execution, process list enumeration and process termination.

See Table 80.

TABLE 80

Process API

| Name | Arguments | Returns | Description |
|---|---|---|---|
| AlExec | text_t const* pProg, text_t const* pCmdLine | int | loads and executes a new process |
| AlProGetList | AlPID* pPIDs, int iMaxPIDs | int | retrieves system process list |
| AlProFreeList | AlPID* pPIDs, int iPIDs | int | releases memory used to store process list |
| AlProOpen | AlPID pid | AL_PROCESS_HANDLE | converts process id to process handle |
| AlProClose | AL_PROCESS_HANDLE hProcess | int | release process handle returned by the AlProOpen function |
| AlProKill | AL_PROCESS_HANDLE hProcess | int | force terminates a given process |

Dynamic Memory API

The abstraction library provides two sets of dynamic memory allocation methods for multi-threaded applications. Under operating systems like Unix/Linux and Windows NT (Win32), a block of memory allocated from one thread using the malloc( ) function can be de-allocated in another thread, but under systems like Symbian 6.x, memory de-allocation must be preformed by the thread that created it. The AlMemSAlloc and AlMemSFree functions are provided to allocate/deallocate dynamic memory from the process thread, and the AlMemAlloc and the AlMemFree functions are provided for thread-specific memory allocation/de-allocation. Under Unix/Linux and Win32, both AlMemSAlloc and AlMemALloc are mapped to the POSIX malloc. See Table 81.

| Dynamic Memory API | | | |
|---|---|---|---|
| Name | Arguments | Returns | Description |
| AlMemSAlloc | unsigned int uSize | void* | allocate memory from the parent thread's heap |
| AlMemSFree | void* ptr | void | free memory allocated using the AlMemSAlloc function. |

| Dynamic Memory API | | | |
|---|---|---|---|
| Name | Arguments | Returns | Description |
| AlMemAlloc | unsigned int uSize | void* | allocate memory from the calling thread's heap |
| AlMemFree | void* ptr | void | free memory allocated using the AlMemAlloc function. |

Thread API

The library provides thread creation and termination functions. The AlCreateThread creates a new thread, the AlWaitThread provides thread termination waiting function, and the AlCloseThread is used to release system resource associated with a thread.

See Table 82.

TABLE 83

| Thread API | | | |
|---|---|---|---|
| Name | Arguments | Returns | Description |
| AlCreateThread | int (*pThreadProc)(void *), void *pData, int iStackSize = −1, int iMinHeap = −1, int iMaxHeap = −1 | AL_THREAD_HANDLE | create a new thread |
| AlWaitThread | AL_THREAD_HANDLE hThread, int iMsTimeout | int | wait for thread to terminate |
| AlCloseThread | AL_THREAD_HANDLE hThread | void | close and release thread resource |
| AlGetTls | void | void* | returns the pointer thread-local storage |
| AlSetTls | void | void* | sets the pointer thread-local storage |
| AlSleep | int | int | suspends the calling thread |

Synchronization API

The abstraction library provides three types of thread synchronization objects: mutex, semaphore and critical section; Both unnamed and named mutex and semaphore objects are supported. See Table 84.

TABLE 84

Synchronization API

| Name | Arguments | Returns | Description |
|---|---|---|---|
| AlCreateMutex | text_t const *pName | AL_MUTEX_HANDLE | create a new mutex |
| AlOpenMutex | text_t const *pName | AL_MUTEX_HANDLE | get handle to an existing mutex |
| AlGetMutex | AL_MUTEX_HANDLE hMutex | int | lock a given mutex |
| AlReleaseMutex | AL_MUTEX_HANDLE hMutex | int | unlock a given mutex |
| AlCloseMutex | AL_MUTEX_HANDLE hMutex | void | close and release mutex resource |
| AlCreateSemaphore | text_t const *pName, int iCount | AL_SEMAPHORE_HANDLE | create a new semaphore |
| AlOpenSemaphore | text_t const *pName | AL_SEMAPHORE_HANDLE | open an existing semaphore |
| AlGetSemaphore | AL_SEMAPHORE_HANDLE hSemaphore | int | wait on the specified semaphore |
| AlReleaseSemaphore | AL_SEMAPHORE_HANDLE hSemaphore, int iCount | int | increase the count of the specified semaphore by a given amount |
| AlCloseSemaphore | AL_SEMAPHORE_HANDLE hSemaphore, int iCount | void | close and release semaphore |
| AlCreateCritsec | void | AL_CRITSEC_HANDLE | create a critical section |
| AlGetCritsec | AL_CRITSEC_HANDLE hCritsec | int | wait for ownership of a specified critical section |
| AlReleaseCritsec | AL_CRITSEC_HANDLE hCritsec | int | release the ownership of a critical section |
| AlCloseCritsec | AL_CRITSEC_HANDLE hCritsec | void | close and release the specified critical section and its resource |

Storage I/O

The Storage I/O API is used by the anti-malware scanner to access and modify data objects (or files) stored on a non-volatile storage device (e.g. flash memory, hard disk) and managed by a file system or file system like storage and retrieval system. The API is divided into three categories: 1) I/O routines for reading/writing data to/from single object or file, 2) calls used to copy, move and delete a stored object, 3) and routines that provides directory object enumeration. See Table 85.

TABLE 85

Storage I/O API

| Name | Arguments | Returns | Description |
|---|---|---|---|
| AlFsFileOpen | text_t const *pFName, unsigned int uMode | AL_FILE_HANDLE | open a file for reading/writing and returns file handle |
| AlFsFileClose | AL_FILE_HANDLE hFile | int | release and close file handle |
| AlFsFileRead | AL_FIL_HANDLE hFile, unsigned char* buffer, int nSize | int | read file data |
| AlFsFileWrite | AL_FILE_HANDLE hFile, unsigned char const* buffer, int iSize | int | write data to file |
| AlFsFileSeek | AL_FIL_HANDLE hFile, long offset, int iWhence | long | reposition read/write file offset |

TABLE 85-continued

Storage I/O API

| Name | Arguments | Returns | Description |
| --- | --- | --- | --- |
| AlFsFileTell | AL_FIL_HANDLE hFile | long | obtain read/write file offset |
| AlFsFileSetSize | AL_FIL_HANDLE hFile, long lNewSize | long | change file size |
| AlFsFileDelete | text_t const* pFName | int | delete file |
| AlFsFileRename | text_t const* pOFName, text_t const* pNFName); | int | rename a file or directory |
| AlFsFileCopy | text_t const* pSFName, text_t const* pSFName); | int | copy a file |
| AlFsFileStat | text_t const* pFName, struct AlFileStat* pFStat | int | obtain a file or directory information |
| AlSetFileMode | text_t const* pFName, unsigned long ulMode | int | set a file or directory attribute |
| AlFsBuildPath | text_t const* pDName, text_t const* pFName | text_t* | construct a path from directory and file paths |
| AlFsGetRoots | text_t **pRoots, int iMaxRoots | int | obtain a lists of roots. |
| AlFsDirOpen | text_t const *pDName | AL_DIR_HANDLE | open a directory |
| AlFsDirClose | AL_DIR_HANDLE hDir | int | close directory handle |
| AlFsDirNext | AL_DIR_HANDLE hDir, struct AlDirEntry* pDE | int | obtain a directory entry |
| AlFsIsDir | AlFAtt attrib | int | test for directory |
| AlFsGetTemp | text_t* const pDirectory | text_t* | returns a full path for a temporary file |

Network Sockets API

Both standard and secure (SSL) socket API's for developing client/server applications are provided in the abstraction library. See Table 86.

TABLE 86

Socket API

| Name | Arguments | Returns | Description |
| --- | --- | --- | --- |
| AlSockCreate | int iDomain, int iType, int iProtocol | AL_SOCKET_HANDLE | creates and returns a handle to a socket object |
| AlSockClose | AL_SOCKET_HANDLE hSock | int | closes a socket handle |
| AlSockBind | AL_SOCKET_HANDLE hSock, AlSockAddr *pAddr | int | binds a network address to a socket |
| AlSockAccept | AL_SOCKET_HANDLE hSock, int iMsTimeout | int | accepts a connection to a socket |
| AlSockConnect | AL_SOCKET_HANDLE hSock, AlSockAddr *pAddr, int iMsTimeout | int | establishes a connection to a peer |
| AlSockRecv | AL_SOCKET_HANDLE hSock, unsigned char *Buffer, int iSize, int iMsTimeout | int | receives data from a socket connection |

TABLE 86-continued

Socket API

| Name | Arguments | Returns | Description |
|---|---|---|---|
| AlSockSend | AL_SOCKET_HANDLE hSock, unsigned char const *Buffer, int iSize, int iMsTimeout | int | sends data on a connected socket |
| AlSockAddrBuild | text_t const *pHName, int iPort, AlSockAddr *pAddr | int | converts a hostname and port into a socket address |

See Table 87 for a secure socket API.

TABLE 87

Secure Socket API

| Name | Arguments | Returns | Description |
|---|---|---|---|
| AlSSockOpen | AL_SOCKET_HANDLE hSock | int | converts non-secure socket into a secure socket object for SSL communication |
| AlSSockClose | AL_SSOCKET_HANDLE hSSock | int | closes SSL socket |
| AlSSockBind | AL_SSOCKET_HANDLE hSSock, AlSockAddr *pAddr | int | SSL version of AlSockBind |
| AlSSockAccept | AL_SSOCKET_HANDLE hSSock, int iMsTimeout | int | SSL version of AlSockAccept |
| AlSSockConnect | AL_SSOCKET_HANDLE hSSock, AlSockAddr *pAddr, int iMsTimeout | int | SSL version of AlSockConnect |
| AlSSockRecv | AL_SSOCKET_HANDLE hSSock, unsigned char *Buffer, int iSize, int iMsTimeout | int | SSL version of AlSockRecv |
| AlSSockSend | AL_SSOCKET_HANDLE hSSock, unsigned char const *Buffer, int iSize, int iMsTimeout | int | SSL version of AlSockSend |

String Functions

The string functions in the Platform Abstraction Library provide a platform-specific string type to/from an UTF8 string conversions and string type-specific allocation functions. See Table 88.

TABLE 88

String API

| Name | Arguments | Returns | Description |
|---|---|---|---|
| AlStrCpyFromTStr | char* pDest, text_t const* pSrc | char* | copy and convert platform-specific string type to an UTF8 string |
| AlTStrCpyFromStr | text_t* pDest, char const* pSrc | text_t* | copy and convert a UTF8 string to a platform-specific string |
| AlStrAlloc | unsigned int uSize | char* | create a buffer for a single-byte zero-terminated string |
| AlStrDup | char const* pStr | char* | duplicate given single-byte zero-terminated string |
| AlStrTrans | text_t const* pTStr | char* | convert a platform-specific string to an UTF8 string |
| AlStrFree | char* pStr | void | release memory allocated by the AlStrAlloc, AlStrDup and AlStrTrans functions |
| AlStrIStr | char const* pString, char const* pPattern | char* | locate 'pPattern' in 'pString' and return a pointer the beginning of the found string |
| AlTStrAlloc | unsigned int uSize | text_t* | allocate and return a pointer to a buffer large enough to hold 'uSize' long text_t string |
| AlTStrDup | text_t const* pString | text_t* | duplicate a platform-specific string and return a pointer to the duplicated string |

TABLE 88-continued

String API

| Name | Arguments | Returns | Description |
|---|---|---|---|
| AlTStrTrans | char const* pString | text_t* | convert a UTF8 string to a platform-specific string |
| AlTStrFree | text_t* pString | void | release memory allocated to hold a text_t string by the AlTStrAlloc, AlStrDup and the AlTStrTrans functions |
| AlTStrLen | text_t* pString | int | return length of a platform-specific string |

System Event Functions

The system event functions provides an application with a methods to install and event handler for a given system event. See Table 89.

System Event API

| Name | Arguments | Returns | Description |
|---|---|---|---|
| AlEventGetHandler | int event, AL_EVENT_CBFUNC* pCbFunc | int | obtain existing event handler for specified event |
| AlEventSetHandler | int event, AL_EVENT_CBFUNC cbFunc | int | set a callback handler for specified event |

API Reference

See Table 90 for an exemplary API reference.

TABLE 90

AlInitLibrary

Description

Initializes the abstraction library. This function must be successfully executed before any other abstraction layer API's are called.
Prototype int AlFsFileOpen(void);
Parameters none
Return value zero (= 0) on success. Non-zero value if error.
See also AlCleanupLibrary

AlCleanupLibrary

Description

Releases system resources allocated by the AlInitLibrary. This function must be called before terminating an application that uses the abstraction library.
Prototype int AlCleanupLibrary(void);
Parameters none
Return value zero (= 0) on success. Non-zero value if error.

TABLE 90-continued

See also

AlInitLibrary

AlErrGetLast

Description

Returns the calling thread's last-error code set using the AlErrSetLast function.
Prototype AlErrorCode AlErrGetLast(void);
Parameters none
Return value The calling thread's last-error code value.
See also AlErrSetLast

AlErrSetLast

Description

Sets the calling threads last-error code value.
Prototype void AlErrSetLast(AlErrorCode errCode);
Parameters errCode    [in] The last-error code value
Return value none.
See also AlErrGetLast

AlGetDeviceId

Description

Retrieves a zero-terminated system identification string.
Prototype int AlExec(text_t* pId, int iSize);
Parameters pId    [in] Pointer to a string buffer.
    iSize    [in] The size of the buffer in bytes.
Return value 0 if successful, −1 otherwise.
See also

AlExec

Description

Loads and executes a child process. The caller (parent process) continues execution after the child process is spawned.
Prototype int AlExec(text const* pProgram, text const* pCmdLine);
Parameters pProgram    [in] Path of file to be executed
    pCmdLine    [in] Command line arguments to be passed to the program.
Return value 0 if successful, −1 otherwise.
See also

AlProGetList

Description

Retrieves the process identifiers for process running on the system. The process list returned must be released using the AlProFreeList function.

TABLE 90-continued

Prototype int AlProGetList(AlPID* pPIDs, int iMaxPIDs);
Parameters pPIDs          [in] Pointer to a PID list.
    int iMaxPIDs     [in] The length of the list.
Return value none.
See also AlProFreeList
Example A1PID 1PID[10];
        int n = AlProGetList ( 1PID, 10 );
    .
    .
    .
    AlProFreeList( 1PID, n );

AlProFreeList

Description

Releases the system resource allocated by the AlProGetList function.
Prototype int AlProFreeList(AlPID* pPIDs, int iPIDs);
Parameters pPIDs        [in] Pointer to a PID list obtained using the AlProGetList function.
    iPIDs         [in] The number of PID's stored in the process list.
Return value 0 always.
See also AlProGetList

AlProOpen

Description

Obtains a process handler to specified process identifier.
Prototype

AL_PROCESS_HANDLE AlProOpen(AlPID pid);
Parameters pid          [in] Process identifier.
Return value A process handle corresponding to the specified process identifier. NULL if error.
See also AlProGetList, AlProFreeList, AlProClose, AlProKill

AlProClose

Description

Closes process handle returned by the AlProOpen function.
Prototype int AlProClose(AL_PROCESS_HANDLE hProcess);
Parameters hProcess      [in] Process handle
Return value 0 always.
See also AlProGetList, AlProFreeList, AlProKill

AlProKill

Description

Force terminates specified process.
Prototype int AlProKill(AL_PROCESS_HANDLE hProcess);
Parameters hProcess      [in] Process handle.
Return value 0 if successful, −1 otherwise.
See also AlProGetList, AlProFreeList, AlProClose

AlCreateThread

Description

Creates a executes a new thread.
Prototype

AL_THREAD_HANDLE AlCreateThread(int (* pThreadProc)(void *),
    void* pData,
    int iStackSize = −1,
    int iMinHeap = −1,
        int iMaxHeap = −1
    );
Parameters pThreadProc    [in] Thread function to be executed.
    pData          [in] Thread function parameter pointer.
    iStackSize     [in] Stack size. −1 for default value.
    iMinHeap      [in] Minimum heap size required. −1 for default value.
    iMaxHeap      [in] Maximum heap size. −1 for default value.
Return value A thread handle to the created thread. NULL if error.
See also AlWaitThread, AlCloseThread

AlWaitThread

Description

Waits for thread termination. The caller is suspended until the specified thread is terminated or when the time-out interval elapses.
Prototype int AlWaitThread(AL_THREAD_HANDLE hThread, int iMsTimeOut);
Parameters hThread       [in] A thread handle.
    iMsTimeOut    [in]Time-out in milliseconds.
Return value 0 if the specified thread terminates within the specified time. −1 otherwise.
See also AlCreateThread, AlCloseThread

AlCloseThread

Description

Closes thread handle.
Prototype int AlCloseThread(AL_THREAD_HANDLE hThread);
Parameters hThread       [in] Thread handle to close
Return value none

TABLE 90-continued

See also

AlCreateThread, AlCloseThread

AlGetTls

Description

Returns the pointer to the calling thread's thread-local storage (TLS).
Prototype void* AlGetTls(void);
Parameters none
Return value The pointer set by AlSetTls( ).
See also AlSetTls

AlSetTls

Description

Sets the calling thread's thread-local storage (TLS).
Prototype void* AlGetTls(void* pData);
Parameters pData    [in] A pointer to an allocated memory to be used as thread-local storage.
Return value The pointer to a previous set TLS memory.
See also AlGetTls

AlSleep

Description

Suspends the execution of the calling thread for specified amount of time.
Prototype int AlSleep(int iMSec)
Parameters iMSec    [in] Specifies the time, in milliseconds, the calling thread should be suspended.
Return value zeror(= 0) always.

AlCreateMutex

Description

Creates a named or unnamed mutex.
Prototype

AL_MUTEX_HANDLE AlCreateMutex(text_t const* pName);
Parameters pName    [in] The name of the created mutex. NULL for unnamed mutex.
Return value A mutex handle if successful. NULL if error.
Remarks Under Symbian 6.1, a name mutex is created as a global object that can be referenced across processes. An unnamed mutex is created as a local object and can be accessed within the process that created it and cannot be shared among processes. A local mutex is more efficient than a global mutex.

See also

AlOpenMutex, AlGetMutex, AlReleaseMutex, AlCloseMutex

AlOpenMutex

Description

Returns a mutex handle to an existing named mutex.
Prototype

AL_MUTEX_HANDLE AlOpenMutex(text_t const* pName);
Parameters pName    [in] Mutex name.
Return value A mutex handle if successful. NULL if error.
See also AlCreateMutex, AlGetMutex, AlReleaseMutex, AlCloseMutex

AlGetMutex

Description

Waits for the specified mutex to be released and returns its handle.
Prototype int AlGetMutex(AL_MUTEX_HANDLE hMutex);
Parameters hMutex    [in] Mutex handle.
Return value Always returns zero (= 0).
See also AlCreateMutex, AlOpenMutex, AllReleaseMutex, AlCloseMutex

AlReleaseMutex

Description

Releases ownership of the locked mutex obtained using the AlGetMutex function.
Prototype int AlGetMutex(AL_MUTEX_HANDLE hMutex);
Parameters hMutex    [in] Handle to a mutex to be released.
Return value Always returns zero (= 0).
See also AlCreateMutex, AlOpenMutex, AlCloseMutex

AlCloseMutex

Description

Closes a mutex handle. Mutex is destroyed if there is no open reference to it.
Prototype void AlCloseMutex(AL_MUTEX_HANDLE hMutex);
Parameters hMutex    [in] Mutex to be closed
Return value none
See also AlCreateMutex, AlOpenMutex, AlGetMutex, AlReleaseMutex

TABLE 90-continued

AlCreateSemaphore

Description

Creates a named or unnamed semaphore object.
Prototype

AL_Semaphore_HANDLE AlCreateMutex(text_t const* pName, int iCount);
Parameters pName    [in] The name of the created mutex. NULL for unnamed mutex.
    iCount    [in] The initial value of the semaphore count.
Return value The handle to the created semaphore if successful. NULL if error.
Remarks Under Symbian 6.1, a name semaphore is created as a global object that can be referenced across processes. An unnamed semaphore is created as a local object and can be accessed within the process that created it and cannot be shared amount processes. A local semaphore is more efficient than a global semaphore.
See also AlOpenSemaphore, AlGetSemaphore, AlReleaseSemaphore, AlCloseSemaphore

AlOpenSemaphore

Description

Returns a handle to a named semaphore.
Prototype

AL_MUTEX_HANDLE AlOpenMutex(text_t const* pName);
Parameters pName    [in] Mutex name.
Return value A semaphore handle to a specified semaphore object. NULL if error.
See also AlCreateSemaphore, AlGetSemaphore, AlReleaseSemaphore, AlCloseSemaphore

AlGetSemaphore

Description

Waits on the semaphore. The semaphore count is decremented by one and returned immediately if its zero or positive.
Prototype int AlGetSemaphore(AL_SEMAPHORE_HANDLE hSemaphore);
Parameters hSemaphore    [in] A handle to a semaphore object
Return value Always returns zero (= 0).
See also AlCreateSemaphore, AlOpenSemaphore, AlReleaseSemaphore, AlCloseSemaphore

AlReleaseSemaphore

Description

Increases the count of the specified semaphore object by a specified count.
Prototype int AlReleaseSemaphore(AL_SEMAPHORE_HANDLE hSemaphore, int iCount);
Parameters hMutex    [in] Handle to a mutex to be released.
Return value Always returns zero (= 0).
See also AlCreateSemaphore, AlOpenSemaphore, AlGetSemaphore, AlCloseSemaphore

AlCloseSemaphore

Description

Closes the semaphore object. The object is destroyed if there is no open reference to it.
Prototype void AlCloseSemaphore(AL_SEMAPHORE_HANDLE hSemaphore);
Parameters hSemaphore    [in] A semaphore object handle.
Return value none
See also AlCreateSemaphore, AlOpenSemaphore, ALGetSemaphore, AlReleaseSemaphore

AlCreateCritsec

Description

Creates and returns a new critical section object.
Prototype

AL_CRITSEC_HANDLE AlCreateCritsec(void);
Parameters none
Return value

The handle to the created critical section object if successful. NULL if error.
See also AlGetCritsec, AlReleaseCritsec, AlCloseCritsec

AlGetCritsec

Description

Waits for access to the critical section.
Prototype int AlGetCritsec(AL_CRITSEC_HANDLE hCritsec);
Parameters hCritsec    [in] A handle to a critical section to access.
Return value Always returns zero (= 0).
See also AlCreateCritsec, AlReleaseCritsec, AlCloseCritsec

AlReleaseCritsec

Description

Signals exit from the critical section.
Prototype int AlReleaseCritsec(AL_CRITSEC_HANDLE hCritsec);
Parameters hCritsec    [in] A handle to a critical section.
Return value Always returns zero (= 0).
See also AlCreateCritsec, AlGetCritsec, AlCloseCritsec

TABLE 90-continued

AlCloseCritsec

Description

Closes the critical section object.
Prototype void AlCloseCritsec(AL_CRITSEC_HANDLE hCritsec);
Parameters hCritsec    [in] A critical section object handle.
Return value none
See also AlCreateCritsec, AlGetCritsec, AlReleaseCritsec

AlMemSAlloc

Description

Allocates dynamic memory.
Under Symbian/EPOC, the memory is allocated from the process thread's heap, and the returned pointer is required to be freed using the AlMemSFree ( ) function.
Under Unix/Linux and Win32, this function is mapped to the POSIX malloc function.
Prototype void* AlMemSAlloc(unsigned int uSize);
Parameters uSize    [in] specifies the amount of memory to allocate in bytes
Return value A pointer to the allocated memory. NULL if error.
See also AlMemSFree, AlMemAlloc

AlMemSFree

Description

Release/deallocates dynamic memory obtained using the AlMemSAlloc function.
Under Symbian/EPOC, the memory is released to the process thread's heap.
Under Unix/Linux and Win32, this function is mapped to the POSIX free function.
Prototype void AlMemSFree(void* ptr);
Parameters ptr    [in] dynamic memory pointer returned by the AlMemSAlloc function
Return value none
See also AlMemSAlloc, AlMemFree

AlMemAlloc

Description

Allocates dynamic memory.
Under Symbian/EPOC, the memory is allocated from the calling thread's heap, and the returned pointer is required to be freed using the AlMemFree ( ) function.
Under Unix/Linux and Win32, this function is mapped to the POSIX malloc function.
Prototype void* AlMemAlloc(unsigned int uSize);
Parameters uSize    [in] specifies the amount of memory to allocate in bytes Return value A pointer to the allocated memory. NULL if error.
See also AlMemSAlloc, AlMemFree

AlMemFree

Description

Release/deallocates dynamic memory obtained using the AlMemAlloc function.
Under Symbian/EPOC, the memory is released to the calling thread's heap. Exception/panic is raised if this call is made from a thread other than the one who allocated it,
Function is mapped to the POSIX free function in Unix/Linux and Win32 implementations.
Prototype void AlMemFree(void* ptr);
Parameters ptr    [in] dynamic memory pointer returned by the AlMemAlloc function
Return value none
See also AlMemSFree, AlMemAlloc

AlFsFileOpen

Description

The AlFsFileOpen( ) is used to open a file for reading and/or writing.
Prototype AL_FILE_HANDLE AlFsFileOpen(text_t const *pFName, unsigned int uMode);
Parameters pFName    [in] Specifies file path for reading/writing
    uMode    [in] Specifies the desired file I/O operation.
        FMODE_READ    Open an existing file for reading
        FMODE_WRITE    Open the specified file for writing. If the file does not exist it may be created.
        FMODE_READ|
        FMODE_WRITE    Open for both reading and writing.
Return value Returns a file handle, or NULL if an error occurred.
See also AlFsFileClose, AlFsFileRead, AlFsFileWrite

AlFsFileClose

Description

AlFsFileClose closes the file referenced by a file handle returned by the AlFsFileOpen( ) function and releases associated system resources.
Prototype int AlFsFileClose(AL_FIL_HANDLE hFile);
Parameters hFile    [in] File handle obtained using the AlFsFileOpen( ) API.
Return value Always returns zero (= 0).
See also AlFsFileOpen

TABLE 90-continued

AlFsFileRead

Description

AlFsFileRead reads file data into a specified buffer.
Prototype int AlFsFileRead(AL_FIL_HANDLE hFile, unsigned char* buffer, int nSize);
Parameters hFile     [in] File handle returned by AlFsFileOpen( ).
    buffer     [in] Where to store read data.
    nSize     [in] Maximum number of bytes to read from the file handle.

Return value

Number bytes read from the file specified.
See also

AlFsFileOpen, AlFsFileWrite

AlFsFileWrite

Description

AlFsFileWrite writes application data to a file handle.
Prototype int AlFsFileWrite( AL_FIL_HANDLE hFile,
    unsigned char const* buffer,
    int iSize
);
Parameters hFile     [in] File handle returned by AlFsFileOpen( ) with FMODE_WRITE mode.
    buffer     [out] Data to write.
    iSize     [in] Number of bytes to write.

Return value

Number bytes actually written to the file handle.
See also

AlFsFileOpen, AlFsFileRead

AlFsFileSeek

Description

AlFsFileSeek repositions read/write file offset.
Prototype long AlFsFileSeek(AL_FIL_HANDLE hFile, long offset, int iWhence);
Parameters hFile     [in] File handle.
    offset     [in] File offset relative to the iWhence directive.
    iWhence     [in]
        F_SEEK_SET     The offset parameter specifies the absolute file offset. In other words, offset from the beginning of the file.
        F_SEEK_CUR     Specifies relative offset - the offset parameter specifies file offset from the current file offset.
        F_SEEK_END     Specifies file offset from the end of the file.

Return value

Resulting file location from the beginning of the file. −1 is returned to indicate an error.
See also AlFsFileTell

AlFsFileTell

Description

Returns current open file position.
Prototype long AlFsFileTell(AL_FIL_HANDLE hFile);
Parameters hFile     [in] File handle.

Return value

File location from the beginning of the file. −1 if error.
See also

AlFsFileSeek

AlFsFileSetSize

Description

Changes file size and returns the new size. If the specifies size is less than the current file size, data is lost from the end of the file.
Prototype long AlFsFileSetSize(AL_FIL_HANDLE hFile, long lNewSize);
Parameters hFile     [in] File handle.
    lNewSize     [in] The new file size in bytes.

Return value

Specified file size if successful, −1 otherwise.
See also

AlFsFileDelete

Description

Deletes the specified file from storage.
Prototype int AlFsFileDelete(text_t const* pFName);
Parameters pFName     [in] File path.

Return value 0 if successful, −1 otherwise.
See also

AlFsFileRename, AlFsFileCopy

AlFsFileRename

Description

Renames a single file or directory and can be used to move a file or directory to a different directory. Overwriting of existing file or directory and moving to a different drive (or device) is not permitted.
Prototype int AlFsFileRename(text_t const*pOFName, text_t const* pNFName);
Parameters pOFName     [in] File or directory to be renamed.
    pNFName     [in] New file name with optional destination directory path. Must specify existing directory path if given.

Return value 0 if successful, −1 otherwise.
See also

AlFsFileRename, AlFsFileCopy

AlFsFileCopy

Description

Copies a single file to a different name or directory. If the target file exists, it is overwritten.
Prototype int AlFsFileCopy(text_t const* pSFName, text_t const* pSFName);

TABLE 90-continued

Parameters pSFName    [in] Source file path.
    pDFName    [in] Destination file path.

Return value 0 if successful, −1 otherwise.

See also

AlFsFileDelete, AlFsFileRename

AlFileStat

Description

Retrieves a file or directory information from system.

Prototype int AlFileStat(text_t const* pFName, struct AlFileStat* pFStat);
struct AlFileStat
{
    AlFileSize Size;
    AlTime ModTime;
    AlFAtt Att;
};

Parameters pFName    [in] File or directory path.
    pFStat    [out] Pointer to a file status information Return value 0 if successful, −1 otherwise.

See also

AlSetFileMode

AlSetFileMode

Description

Sets a file attribute.

Prototype int AlSetFileMode(text_t const* pFName, unsigned long ulMode);

Parameters pFName    [in] File or directory path.
    ulMode    [in] File attribute flag. Currently supported attributes are:
        FAMODE_NORMAL
        FAMODE_READ_ONLY Return value 0 if successful, −1 otherwise.

See also

AlFileStat

AlFsBuildPath

Description

Constructs a file path from a directory path and file name. The returned file path pointer is created using the AlMemAlloc ( ) function. It must be freed using the AlMemFree ( ) call.

Prototype text_t* AlFsBuildPath(text_t const* pDName, text_t const* pFName);

Parameters pDName    [in] Directory path.
    pFName    [in] File name

Return value

Pointer to a file path. NULL if error.

See also

AlFsGetRoots

AlFsGetRoots

Description

Obtains a list of available system roots. Application provides a list of un-initialized path pointers on entry. AlFsGetRoots ( ) sets the pointer list and returns up to iMaxRoots long system roots. The AlMemAlloc ( ) is used to allocate memory for each root path. The caller must used the AlMemFree ( ) function to release the allocated memory.

Prototype int AlFsGetRoots(text_t **pRoots, int iMaxRoots);

Parameters pRoots    [in] Pointer to a iMaxRoots long list of un-initialized root paths.
                [out] Pointer to a list of root paths obtained from system.
    iMaxRoots    [in] Maximum number file system roots to be returned in the pRoots list.

Return value

Number of file system roots (or drives) found. −1 if error.

See also

AlFsBuildPath

AlFsGetRoots

Description

Obtains a list of available system roots. Application provides a list of un-initialized path pointers on entry. AlFsGetRoots ( ) sets the pointer list and returns up to iMaxRoots long system roots. The AlMemAlloc ( ) is used to allocate memory for each root path. The caller must used the AlMemFree ( ) function to release the allocated memory.

Prototype int AlFsGetRoots(text_t **pRoots, int iMaxRoots);

Parameters pRoots    [in] Pointer to a iMaxRoots long list of un-initialized root paths.
                [out] Pointer to a list of root paths obtained from system.
    iMaxRoots    [in] Maximum number file system roots to be returned in the pRoots list.

Return value

Number of file system roots (or drives) found. −1 if error.

See also

AlFsBuildPath

AlFsDirOpen

Description

Returns a directory handle to the specified directory path.

Prototype

AL_DIR_HANDLE AlFsDirOpen(text_t const *pDName);

Parameters pDName    [in] Directory path

Return value

Directory handle. NULL if error.

See also

AlFsDirClose, AlFsDirNext

AlFsDirClose

Description

Closes a directory handle returned by a call to the AlFsDirOpen( ).

Prototype int AlFsDirClose(AL_DIR_HANDLE hDir);

TABLE 90-continued

Parameters hDir    [in] Directory handle

Return value

Directory handle. NULL if error.

See also

AlFsDirClose, AlFsDirNext

AlFsDirClose

Description

Closes a directory handle returned by a call to the AlFsDirOpen( ).

Prototype int AlFsDirClose(AL_DIR_HANDLE hDir);

Parameters hDir    [in] Directory handle

Return value

Always returns zero(= 0).

See also

AlFsDirOpen, AlFsDirNext

AlFsDirNext

Description

Obtains and returns a directory entry. The AlFsDirNext function is provided for directory enumeration.

Prototype int AlFsDirNext(AL_DIR_HANDLE hDir, struct AlDirEntry* pDE);

Parameters hDir    [in] Directory handle
    pDE    [out] pointer to a directory entry structure AlDirEntry.
    struct AlDirEntry
    {
    text_t Name[AL_MAX_PATH];
    AlFileSize Size;
    AlTime ModTime;
    AlFAtt Att;
    };

Return value 0 if successful, −1 otherwise.

See also

AlFsDirOpen, AlFsDirClose, AlFsIsDir

AlFsIsDir

Description

The AlFsDirNext is used to test if a directory entry is a directory or file.

Prototype int AlFsIsDir(AlFAtt attrib);

Parameters attrib    [in] directory entry attribute

Return value 1 if directory, 0 otherwise.

See also

AlFsDirOpen, AlFsDirClose, AlFsDirNext

AlFsTemp

Description

Creates a full file path for a temporary file. The pointer to the path must be freed using the AlMemFree function.

Prototype text_t* AlFsTemp(text_t const* pTempDir);

TABLE 90-continued

Parameters pTempDir    [in] Caller specified temporary directory path.
    If set to NULL, the system default temporary
    directory is used.

Return value

Full temporary file path if successful, NULL otherwise.

See also

AlSockCreate

Description

Creates and returns a handle to a socket object

Prototype

AL_SOCKET_HANDLE AlSockCreate(int iFamily,
    int iType,
    int iProtocol,
    );

Parameters iDomain    [in] Address family specification.
    iType    [in] Socket type for a specified protocol.
    iProtocol    [in] Protocol to be used with the socket Return value Socket handle if successful, otherwise NULL.

See also

AlSockClose, AlSockBind, AlSockAccept, AlSockConnect, AlSockRecv, AlSockSend, AlSockAddrBuild

AlSockClose

Description

Closes a socket. A connected socket is closed, and associated resources are released.

Prototype int AlSockClose(AL_SOCKET_HANDEL hSocket);

Parameters hSocket    [in] Socket handle to close

Return value zero (= 0) always.

See also

AlSockCreate, AlSockBind, AlSockAccept, AlSockConnect, AlSockRecv, AlSockSend, AlSockAddrBuild

AlSockBind

Description

Binds a name to a socket by setting the local address of a socket.

Prototype int AlSockClose(AL_SOCKET_HANDEL hSocket, AlSockAddr* pAddr);

Parameters hSocket    [in] Unbound socket handle.
    pAddr    [in] Address to assign to the specified socket.

Return value zero (= 0) if successful, otherwise −1.

See also

AlSockCreate, AlSockClose, AlSockAccept, AlSockConnect, AlSockRecv, AlSockSend, AlSockAddrBuild

AlSockAccept

Description

Accepts a connection on a socket.

TABLE 90-continued

Prototype

AL_SOCKET_HANDLE AlSockAccept(AL_SOCKET_HANDEL hSocket, int iTimeout);
Parameters hSocket    [in] Socket handle that has been placed in a listening state with the AlSockListen function.
    pAddr    [in] Address to assign to the specified socket.
    iTimeout    [in] Timeout value in milliseconds
Return value A handle for the socket on which the connection is made. NULL if error.
See also AlSockCreate, AlSockClose, AlSockBind, AlSockConnect, AlSockRecv, AlSockSend, AlSockAddrBuild

AlSockConnect

Description

Establishes a connection to a remote host.
Prototype int AlSockAccept(AL_SOCKET_HANDEL hSocket,
    AlSockAddr* pAddr,
    int iTimeout
);
Parameters hSocket    [in]Unconnected socket handle
    pAddr    [in]Address of remote host.
    iTimeout    [in]Timeout value in milliseconds
Return value zero if successful, −1 if error.
See also AlSockCreate, AlSockClose, AlSockBind, AlSockAccept, AlSockRecv, AlSockSend, AlSockAddrBuild

AlSockRecv

Description

Receives data from connected socket.
Prototype int AlSockRecv(AL_SOCKET_HANDEL hSocket,
    void* buffer,
    int iSize,
    int iTimeout
);
Parameters hSocket    [in] Connected socket handle.
    buffer    [in] Buffer to hold received data.
    iSize    [in] The length of the buffer in bytes.
    iTimeout    [in] Timeout value in milliseconds
Return value Number of bytes received and stored, −1 if error.
See also AlSockCreate, AlSockClose, AlSockBind, AlSockAccept, AlSockConnect, AlSockSend, AlSockAddrBuild

AlSockSend

Description

Sends data to a connected socket.
Prototype int AlSockSend(AL_SOCKET_HANDEL hSocket,
    void* buffer,
    int iSize,
    int iTimeout
);

Parameters hSocket    [in] Connected socket handle.
    buffer    [in] Buffer holding data to send.
    iSize    [in] The number of bytes to send.
    iTimeout    [in] Timeout value in milliseconds
Return value The number of bytes transmitted, −1 if error.
See also AlSockCreate, AlSockClose, AlSockBind, AlSockAccept, AlSockConnect, AlSockRecv, AlSockAddrBuild

AlSockAddrBuild

Description

Constructs a platform-specific address structure from the caller supplied hostname and port number.
Prototype int AlSockAddrBuild(text_t const* hostname, int iPort, AlSockAddr* pAddr);
Parameters hostname    [in] Remote hostname
    iPort    [in] Connection port (TCP port).
    pAddr    [in] Pointer to platform-specific address structure
Return value 0 if successful, −1 otherwise.
See also AlSockCreate, AlSockClose, AlSockBind, AlSockAccept, AlSockConnect, AlSockRecv, AlSockSend

AlSSockOpen

Description

Converts a normal socket handle to a secure socket handle for SSL communication. Once a socket has been converted using the AlSSockOpen it must be closed using the AlSSockClose instead of the AlSockClose function.
Prototype AL_SSOCKET_HANDLE AlSSockCreate(AL_SOCKET_HANDLE hSocket);
Parameters iSocket    [in] Unconnected socket handle returned by the AlSockCreate function.
Return value Socket handle for SSL communication if successful, NULL otherwise.
See also AlSSockClose, AlSSockBind, AlSSockAccept, AlSSockConnect, AlSSockRecv, AlSSockSend, AlSSockAddrBuild

AlSSockClose

Description

Closes a SSL socket obtained by the AlSSockOpen function.
Prototype int AlSSockClose(AL_SSOCKET_HANDEL hSocket);
Parameters hSocket    [in] SSL socket handle to close
Return value zero (= 0) always.
See also AlSSockOpen, AlSSockBind, AlSSockAccept, AlSSockConnect, AlSSockRecv, AlSSockSend, AlSSockAddrBuild

TABLE 90-continued

AlSSockBind

Description

Binds a name to a secure socket by setting the lcoal address of the socket.
Prototype int AlSSockBind(AL_SSOCKET_HANDEL hSocket, AlSSockAddr* pAddr);
Parameters hSocket    [in] Unbound SSL socket handle.
    pAddr    [in] Address to assign to the specified socket.
Return value zero (= 0) if successful, otherwise –1.
See also AlSSockCreate, AlSSockClose, AlSSockAccept, AlSSockConnect, AlSSockRecv, AlSSockSend, AlSSockAddrBuild

AlSSockAccept

Description

Accepts a SSL connection on a socket.
Prototype

AL_SSOCKET_HANDLE AlSSockAccept(AL_SSOCKET_HANDEL hSocket, int iTimeout);
Parameters hSocket    [in] Secure socket handle that has been placed in a listening state with the AlSSockListen function.
    pAddr    [in] Address to assign to the specified socket.
    iTimeout    [in] Timeout value in milliseconds
Return value A handle for the socket on which the SSL connection is made. NULL if error.
See also AlSSockCreate, AlSSockClose, AlSSockBind, AlSSockConnect, AlSSockRecv, AlSSockSend, AlSSockAddrBuild

AlSSockConnect

Description

Establishes a secure connection to a remote host.
Prototype int AlSSockAccept(AL_SSOCKET_HANDEL hSocket,
    AlSSockAddr* pAddr,
    int iTimeout
);
Parameters hSocket    [in] Unconnected SSL socket handle.
    pAddr    [in] Address of remote host.
    iTimeout    [in] Timeout value in milliseconds
Return value zero if successful, –1 if error.
See also AlSSockCreate, AlSSockClose, AlSSockBind, AlSSockAccept, AlSSockRecv, AlSSockSend, AlSSockAddrBuild

AlSSockRecv

Description

Receives data from a SSL connection.
Prototype int AlSSockRecv(AL_SSOCKET_HANDEL hSocket,
    void* buffer,
    int iSize,
    int iTimeout
);

Parameters hSocket    [in] Connected secure socket handle.
    buffer    [in] Buffer to hold received data.
    iSize    [in] The length of the buffer in bytes.
    iTimeout    [in] Timeout value in milliseconds
Return value Number of bytes received and stored, –1 if error.
See also AlSSockCreate, AlSSockClose, AlSSockBind, AlSSockAccept, AlSSockConnect, AlSSockSend

AlSSockSend

Description

Sends data to a connected socket through secure channel.
Prototype int AlSSockSend(AL_SSOCKET_HANDEL hSocket,
    void* buffer,
    int iSize,
    int iTimeout
);
Parameters hSocket    [in] Connected SSL socket handle.
    buffer    [in] Buffer holding data to send.
    iSize    [in] The number of bytes to send.
    iTimeout    [in] Timeout value in milliseconds
Return value The number of bytes transmitted, –1 if error.
See also AlSSockCreate, AlSSockClose, AlSSockBind, AlSSockAccept, AlSSockConnect, AlSSockRecv, AlSSockAddrBuild

AlStrCpyFromTStr

Description

Converts and copies platform-specific string to an UTF8 string. The caller should ensure the destination buffer is large enough to hold the converted string.
Prototype char* AlStrCpyFromTStr(char* pDest, text_t const* pSrc);
Parameters pDest    [in] A pointer to an 8-bit character buffer.
    pSrc    [in] A pointer to a platform-specific string.
Return value A pointer to a converted UTF8 string.
See also AlStrAlloc, AlStrTrans, AlStrFree, AlTStrLen

AlTStrCpyFromStr

Description

Converts and copies an UTF8 string to a platform-specific string. The caller should ensure the destination buffer is large enough to hold the converted string.
Prototype text_t* AlTStrCpyFromStr(text_t* pDest, char const* pSrc);
Parameters pSrc    [in] A pointer to an 8-bit character string.
    pDest    [in] A pointer to a platform-specific string.
Return value A pointer to a converted platform-specific string.
See also AlTStrAlloc, AlTStrTrans, AlTStrFree, AlTStrLen TABLE 90-continued

AlStrAlloc

Description

Allocates and returns a zero-terminated 8-bit string buffer large enough to hold specified length. The buffer returned should be released using the AlStrFree function.
Prototype char* AlStrAlloc(unsigned int uLength);
Parameters uLength    [in] String length
Return value A pointer to a buffer that can hold up to 'uLength' long 8-bit string if successful, NULL otherwise.
See also AlStrDup, AlStrTrans, AlStrFree

AlStrDup

Description

Duplicates specified 8-bit string. The duplicated string returned should be released using the AlStrFree function.
Prototype char* AlStrDup(char const* pStr);
Parameters pStr    [in] Pointer to an 8-bit string buffer.
Return value A pointer to duplicated string if successful, NULL otherwise.
See also AlStrAlloc, AlStrTrans, AlTStrFree, AlTStrLen

AlStrTrans

Description

Translates a platform-specific string into an 8-bit per character string. The memory used to hold the translated string should be released using the AlStrFree function.
Prototype char* AlStrTrans(text_t const* pStr);
Parameters pStr    [in] Pointer to a platform-specific string.
Return value A pointer to translated 8-bit string if successful, NULL otherwise.
See also AlStrAlloc, AlStrTrans, AlTStrFree, AlTStrLen

AlStrFree

Description

Releases memory returned by the AlStrAlloc, AlStrDup and AlStrTrans functions.
Prototype void AlStrFree(char* pStr);
Parameters pStr    [in] Pointer to an 8-bit string.
Return value none.
See also AlStrAlloc, AlStrDup, AlTStrTrans, AlTStrLen

AlStrIStr

Description

Locates and returns a pointer to the first occurrence of a string within another string. The string comparison is case insensitive.
Prototype int AlStrIStr(char const* pString, char const* pPattern);
Parameters pStr    [in] Pointer to a string.
    pPattern    [in] String to locate within the 'pStr'
Return value Pointer to the first occurrence of 'pPattern' within the 'pStr' if the search is successful, NULL otherwise.
See also

AlStrTLen

Description

Returns string length of a platform-specific.
Prototype int AlStrTLen(text_t const* pStr);
Parameters pStr    [in] Pointer to a platform-specific string.
Return value The length of the string.
See also

AlTStrAlloc

Description

Allocates and returns a platform-specific string buffer large enough to hold specified length. The buffer returned should be released using the AlTStrFree function.
Prototype text_t* AlTStrAlloc(unsigned int uLength);
Parameters uLength    [in] String length
Return value Pointer to a string buffer if successful, NULL otherwise.
See also AlTStrDup, AlTStrTrans, AlTStrFree, AlTStrLen

AlTStrDup

Description

Duplicates specified platform-specific string. The duplicated string returned should be released using the AlTStrFree function.
Prototype text_t* AlTStrDup(text_t const* pStr);
Parameters pStr    [in] String to duplicate.
Return value Pointer to duplicated string if successful, NULL otherwise.
See also AlTStrAlloc, AlTStrTrans, AlTStrFree, AlTStrLen

AlTStrTrans

Description

Translates an 8-bit string to a platform-specific string. The memory used to hold the translated string should be released using the AlTStrFree function.

TABLE 90-continued

Prototype text_t* AlTStrTrans(char const* pStr);
Parameters pStr    [in] 8-bit per character string
Return value Pointer to a translated string if successful, NULL otherwise.
See also AlTStrAlloc, AlTStrDup, AlTStrFree, AlTStrLen

AlTStrFree

Description

Releases memory returned by the AlTStrAlloc, AlTStrDup and AlTStrTrans functions.
Prototype void AlTStrFree(text_t* pStr);
Parameters pStr    [in] Platform-specific string.
Return value none
See also AlTStrAlloc, AlTStrDup, AlTStrTrans, AlTStrLen

AlEventGetHandler

Description

Obtains existing event handler for specified system event number
Prototype int AlEventGetHandler(int event, AL_EVENT_CBFUNC* pCbFunc);
Parameters

| | |
|---|---|
| int event | [in] System event number. |
| AL_EVENT_CBFUNC* pCbFunc | [out] Event handler for the specified event number. NULL is returned if there is no handler associated with the event specified. AL_EVENT_CBFUNC is defined as: typedef int (* AL_EVENT_CBFUNC)( void* ); |

Below table provides a list of possible system events and corresponding handlers. Actual implementation may be platform-specific.

System Events

| Event | Description |
|---|---|
| SYS_EVENT_FILE_OPEN | File open request event. Full file path is passed to registered callback function before the system/kernel opens the file. Access to the file is denied if the event handler returns −1. |
| SYS_EVENT_FILE_CLOSE | File close event notification. Full file path is passed to registered callback function after the system/kernel closes the file. |
| SYS_EVENT_FILE_RENAME | File rename event. Both source and destination file paths are passed to registered callback function before the file is renamed. Event handler returns −1 if the file rename is not accepted. |
| SYS_EVENT_FILE_COPY | File copy event. Both source and destination file paths are passed to registered callback function before the file is renamed. Event handler returns −1 if the file copy is not accepted. |
| SYS_EVENT_FILE_DELETE | File delete event. Full file path is passed on to event handler. −1 is returned if the callback function rejects the operation. |
| SYS_EVENT_MSG_RECV | SMS/MMS message receive event. The message's storage path is passed on to registered callback function. −1 is returned if the message is not to be opened. |
| SYS_EVENT_MSG_SEND | SMS/MMS message ready to send. The message's storage path is passed on to registered callback function. −1 is returned if the message is not to be transmitted. |

Return value 0 if successful, −1 otherwise.
See also

AlEventSetHandler

AlEventSetHandler

Description

Specifies an event handler for a given system event.
Prototype int AlEventSetHandler(int event, AL_EVENT_CBFUNC cbFunc);
Parameters

| | |
|---|---|
| int event | [in] System event number. |
| AL_EVENT_CBFUNC pCbFunc | [in] Application provided event handler for the specified event number. |

Return value 0 if successful, −1 otherwise.
See also

AlEventGetHandler

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for scanning a plurality of mobile wireless devices for malware, comprising:
    receiving a request to update an anti-malware scanner installed on a mobile wireless device over a wireless network;
    preparing an update tailored for the mobile wireless device using a back-end infrastructure; and
    transmitting the tailored update from the back-end infrastructure to the mobile wireless device over the wireless network;

wherein the request is received from a user utilizing a graphical user interface of the mobile wireless device;

wherein the mobile wireless device is updated on a schedule that is coordinated with a plurality of other mobile wireless devices for maintaining the performance of the wireless network;

wherein data to be scanned by the anti-malware scanner is accessed utilizing an abstract file system interface.

2. The method as recited in claim 1, wherein the request includes data specific to the mobile wireless device.

3. The method as recited in claim 2, wherein the update is tailored for the mobile wireless device based on the data.

4. The method as recited in claim 2, wherein the data includes a media access control (MAC) address.

5. The method as recited in claim 2, wherein a plurality of updates are pre-fabricated for a plurality of types of the mobile wireless devices.

6. The method as recited in claim 5, wherein the back-end infrastructure selects the updates based on the data.

7. The method as recited in claim 5, wherein the updates include different malware signatures pertinent to the associated mobile wireless device.

8. The method as recited in claim 1, wherein the back-end infrastructure includes components selected from the group consisting of a hypertext transfer protocol (HTTP) server, a database transaction server, a client information storage database, and a web-based provisioning and reporting system.

9. The method as recited in claim 1, wherein the back-end infrastructure includes a hypertext transfer protocol (HTTP) server, a database transaction server, a client information storage database, and a web-based provisioning and reporting system.

10. A computer program product embodied on a computer readable medium for scanning a plurality of mobile wireless devices for malware, comprising:

computer code for receiving a request to update an anti-malware scanner installed on a mobile wireless device over a wireless network;

computer code for preparing on update tailored for the mobile wireless device using a back-end infrastructure; and computer code for transmitting the tailored update from the back-end infrastructure to the mobile wireless device over the wireless network;

wherein the request is received from a user utilizing a graphical user interface of the mobile wireless device;

wherein the mobile wireless device is updated on a schedule that is coordinated with a plurality of other mobile wireless devices for maintaining the performance of the wireless network;

wherein data to be scanned by the anti-malware scanner is accessed utilizing an abstract file system interface.

11. The computer program product as recited in claim 10, wherein the request includes data specific to the mobile wireless device.

12. The computer program product as recited in claim 11, wherein the update is tailored for the mobile wireless device based on the data.

13. The computer program product as recited in claim 11, wherein the data includes a media access control (MAC) address.

14. The computer program product as recited in claim 11, wherein a plurality of updates is pre-fabricated for a plurality of types of the mobile wireless devices.

15. The computer program product as recited in claim 14, wherein the back-end infrastructure selects the updates based on the data.

16. The computer program product as recited in claim 15, wherein the updates include different malware signatures pertinent to the associated mobile wireless device.

17. The computer program product as recited in claim 10, wherein the back-end infrastructure includes components selected from the group consisting of a hypertext transfer protocol (HTTP) server, a database transaction server, a client information storage database, and a web-based provisioning and reporting system.

18. The computer program product as recited in claim 10, wherein the back-end infrastructure includes a hypertext transfer protocol (HTTP) server, a database transaction server, a client information storage database, and a web-based provisioning and reporting system.

19. A system for scanning a plurality of mobile wireless devices for malware, comprising:

logic for receiving a request to update an anti-malware scanner installed on a mobile wireless device over a wireless network;

logic for preparing an update tailored for the mobile wireless device using a back-end infrastructure; and logic for transmitting the tailored update from the back-end infrastructure to the mobile wireless device over the wireless network;

wherein the request is received from a user utilizing a graphical user interface of the mobile wireless device;

wherein the mobile wireless device is updated on a schedule that is coordinated with a plurality of other mobile wireless devices for maintaining the performance of the wireless network;

wherein data to be scanned by the anti-malware scanner is accessed utilizing an abstract file system interface.

20. A system for scanning a plurality of mobile wireless devices for malware, comprising:

means for receiving a request to update an anti-malware scanner installed on a mobile wireless device over a wireless network;

means for preparing an update tailored for the mobile wireless device using a back-end infrastructure; and means for transmitting the tailored update from the back-end infrastructure to the mobile wireless device over the wireless network;

wherein the request is received from a user utilizing a graphical user interface of the mobile wireless device;

wherein the mobile wireless device is updated on a schedule that is coordinated with a plurality of other mobile wireless devices for maintaining the performance of the wireless network;

wherein data to be scanned by the anti-malware scanner is accessed utilizing an abstract file system interface.

21. The method as recited in claim 1, wherein a version number of a last update is displayed utilizing the graphical user interface of the mobile wireless device.

22. The method as recited in claim 1, wherein a time of a last update is displayed utilizing the graphical user interface of the mobile wireless device.

23. The method as recited in claim 1, wherein the request to update is received upon the selection of an update icon displayed on the graphical user interface of the mobile wireless device.

24. The method as recited in claim 1, wherein the mobile wireless device is scanned utilizing the updated anti-malware scanner in response to a scan command from the user.

25. The method as recited in claim 24, wherein the scan command is received upon the selection of a scan icon displayed on the graphical user interface of the mobile wireless device.

26. The method as recited in claim 1, wherein the abstract file system interface is implemented for each class of data stored in persistent memory.

27. The method as recited in claim 1, wherein the abstract file system interface includes an abstract directory interface.

28. The method as recited in claim 1, wherein the abstract file system interface includes an abstract directory entry interface.

29. The method as recited in claim 1, wherein the abstract file system interface includes an abstract file interface.

30. The method as recited in claim 1, wherein the abstract file system interface includes data structures with call back functions.

31. The method as recited in claim 30, wherein the call back functions enumerate the data.

32. The method as recited in claim 30, wherein the call back functions manipulate the data.

* * * * *

UNITED STATES PATENT AND TRADEMARK OFFICE
CERTIFICATE OF CORRECTION

PATENT NO. : 7,171,690 B2  Page 1 of 1
APPLICATION NO. : 10/121374
DATED : January 30, 2007
INVENTOR(S) : Kouznetsov et al.

It is certified that error appears in the above-identified patent and that said Letters Patent is hereby corrected as shown below:

On Title Page:
(74) Replace "Christopher J. Hamety" with -- Christopher J. Hamaty --.

In the claims:
Col. 1, line 11, replace "under Ser. No. 10/121,087 under Ser. No. 10/121,087" with -- under Ser. No. 10/121,087 under attorney docket number NAI1P167/02.081.01 --.
Col. 113, line 40, replace "on" with -- an --.

Signed and Sealed this

Ninth Day of November, 2010

David J. Kappos
*Director of the United States Patent and Trademark Office*